US008668406B2

(12) United States Patent
Vidal et al.

(10) Patent No.: US 8,668,406 B2
(45) Date of Patent: Mar. 11, 2014

(54) SUBSEA CABLE INSTALLATION

(75) Inventors: Ronald J. Vidal, San Francisco, CA (US); Paul Alexander, Palmers Green (GB); Robert M. Kelly, Harlow (GB); David Bruton, Colchester (GB); Robert Todd, Harpenden (GB)

(73) Assignee: Level 3 Communications, LLC, Broomfield, CO (US)

( * ) Notice: Subject to any disclaimer, the term of this patent is extended or adjusted under 35 U.S.C. 154(b) by 2358 days.

(21) Appl. No.: 09/988,821

(22) Filed: Nov. 20, 2001
(Under 37 CFR 1.47)

(65) Prior Publication Data
US 2003/0026662 A1 Feb. 6, 2003

Related U.S. Application Data

(60) Provisional application No. 60/252,130, filed on Nov. 21, 2000.

(51) Int. Cl.
*F16L 1/16* (2006.01)

(52) U.S. Cl.
USPC .............. 405/171; 405/159; 405/178

(58) Field of Classification Search
USPC ............. 405/154.1, 158, 159, 171, 178
See application file for complete search history.

(56) References Cited

U.S. PATENT DOCUMENTS

| | | | |
|---|---|---|---|
| 3,813,477 A | 5/1974 | Fischer | |
| 3,927,535 A * | 12/1975 | Giblon | 405/203 |
| 4,302,291 A * | 11/1981 | Severs et al. | 405/195.1 |
| 4,749,308 A | 6/1988 | Izawa | 405/163 |
| 4,756,510 A | 7/1988 | Klamm et al. | 254/134.4 |
| 5,722,793 A | 3/1998 | Peterson | 405/164 |
| 6,164,872 A * | 12/2000 | Morishige | 405/210 |

FOREIGN PATENT DOCUMENTS

| | | |
|---|---|---|
| DE | 1 207 465 | 12/1965 |
| EP | 1 039 201 | 9/2000 |

(Continued)

OTHER PUBLICATIONS

"Prevention and Control of Highway Tunnel Fires"; U.S. Department of Transportation, (Federal Highway Administration), pp. 1-14 of website printout of publication No. FHWARD-83-032; 1982.*

*Primary Examiner* — Michael Safavi

(57) ABSTRACT

The invention facilitates provision of a point-to-point cable connection between first and second points separated by an extended span of water including a first region of shallow water and a second region of relatively deep water. A plurality of ducts are provided from the first point through the first region of the extended span to an offshore termination point between the first and second points. Preferably, the ducts are buried in the seabed to prevent damage. At least one first cable is placed in one of the plurality of ducts to provide a connection between the first point and the offshore termination point. A second cable from the second point is received at the offshore termination point. The first cable is connected to the second cable at the offshore termination point to create the point-to-point cable connection. In one embodiment, the offshore termination point is located on the continental shelf near the transition to deep water. Cable can be installed between the first point and the offshore termination point with relative ease by passing the cable through an available conduit. This eliminates the need for the time consuming and expensive permitting process typically associated with nearshore cable installation.

1 Claim, 53 Drawing Sheets

(56) References Cited

FOREIGN PATENT DOCUMENTS

| | | |
|---|---|---|
| GB | 2 054 280 | 2/1981 |
| GB | 2 089 140 | 6/1982 |
| GB | 2 122 367 A | 1/1984 |
| GB | 2 357 944 | 7/2001 |
| JP | 1 097 126 | 4/1989 |
| JP | 4 058 712 | 2/1992 |
| JP | 9 129 031 | 5/1997 |
| JP | 9 322 371 | 12/1997 |
| JP | 10 014 071 | 1/1998 |

* cited by examiner

| System Name | Pre-Repair Burial Status | Date of Fault | Seabed Type | Type of Fault | Water Depth | Type of Armour | Repair Ship |
|---|---|---|---|---|---|---|---|
| CANUS 1 | Surface Laid | 1-Mar-98 | Sand | Dredging | 65 ft | Double Armor | Sir Eric Sharp |
| TAT 7 | Surface Laid | 18-Apr-86 | Sand | Anchor | 90 ft | Unknown | Mercury |
| TAT 7 | Surface Laid | 10-Aug-89 | Sand | Fishing | 175 ft | Lightweight | C.S. Alert |
| TAT 7 | Unknown | 9-Aug-93 | Unknown | Repeater | 160 ft | Unknown | Global Mariner |
| TAT 8 | Postlay Buried | 10-Aug-93 | Unknown | Unknown | 90 ft | LWP | Global Marine |

*Fig. 35*

FIG. 48    PIPE RECOVERY TOOL

SUBSEA CABLE INSTALLATION

CROSS-REFERENCE TO RELATED APPLICATIONS

This application claims priority to U.S. Provisional Application No. 60/252,130, filed Nov. 21, 2000, the full text of which is incorporated herein by reference.

BACKGROUND OF THE INVENTION

1. Field of the Invention

The present invention relates to the installation of cables. The invention is primarily concerned with fibre optic communication cables but may be applied to other cables, for example co-axial or other communication or power cables. The invention is particularly concerned with providing a cable connection over an extended span, particularly over a sea or other water crossing and in a preferred application is concerned with providing a deep sea (for example transatlantic) cable crossing; however, aspects of the invention may be applied to land based or other applications.

2. Background Art

There are a variety of known techniques for laying cables, whether sub-sea or otherwise, each of which has associated problems.

Long distance sea-crossing cables, for example current transatlantic sub-sea cables, are often deployed by unreeling armoured cable from a cable carrying vessel. There are known techniques for suspending the cable at a distance below the surface, for burying cables in shallow waters and for armouring the cables to withstand various attacks. However, installation of such cables remains expensive and problematic and the cables are susceptible to damage.

Provision of a cable link over an extended span, particularly a sea crossing, is a major undertaking and it is normal practice to plan each link to provide excess cable capacity at the time the link is constructed to accommodate future traffic for a given period until the next cable link is planned; this reduces repetition of the expensive time-consuming and hazardous work involved in installing a cable on the sea bed. The intention is normally that, once laid, the cable(s) will require minimal maintenance or disturbance underwater. The landing stations are well defined, growth in demand can be predicted, and it is likely that the cable will have a finite life so will need to replaced at some point. Therefore, despite the large cost of creating a link, it is usual to provide a link in the expectation that a new link will be needed in a few years. Indeed, because of the risk of damage to an individual link, it is considered desirable that new links over new routes are added over time.

By way of additional background, in urban cable networks, in contrast to point-to-point long-distance links, it is likely that new individual connections will be needed frequently, but the precise routing and connection points cannot necessarily be predicted. The urban environment is, of course, far more accessible and less hostile than the sea bed. It is therefore known to provide multiple empty ducts under roadways with regular access points, enabling new cables to be pulled through the relatively short distances between access points when a new connection is required. Installation of the ducts is, in comparison to installation of sub sea cables, a relatively straightforward task, involving merely digging up a section of roadway and is routinely performed by general road construction contractors; the techniques employed on such projects would not normally be considered applicable to the engineering challenges of a major sub sea link.

BRIEF SUMMARY OF THE INVENTION

In a first aspect, the present invention provides a method of facilitating provision of a point to point cable connection between first and second points separated by an extended span, the method comprising providing multiple ducting from the first point through a first region of the extended span to a termination point intermediate the first and second points.

This aspect may enable a simplified cable installation, whereby for part of the connection, one or more cables may be subsequently introduced into an existing duct, without the expense or problems associated with installing individual cables afresh and without requiring multiple ducts across the entire span. Indeed, for an extended span, the provision of multiple initially empty ducts may not only be prohibitively expensive but counter productive as difficulties may be encountered in passing cables through such lengthy ducts. The term "extended span" as used herein, as will be understood by one skilled in the art, is intended to exclude short-range networks and preferably implies a distance of at least about 5 km and/or including a region of troublesome terrain or water, typically a span of at least about 10 km. This aspect offers particular advantages when the span is at least tens of kilometers, often at least about 100 km or hundreds of kilometers or (for example in the case of a transatlantic crossing) even at least 1000 km. However, in certain embodiments or modified implementations, which may be provided independently, advantages may be obtained when spans of the order of a few hundred meters are traversed, for example in the case of a river crossing, particularly in the case of a festoon as described herein.

The term "duct" or "ducting" as used herein is intended to encompass any construction capable of directing a cable across a route; it will normally comprise a sealed (or substantially sealed) pipe through which the cable passes. In preferred implementations, the multiple ducting will comprise an outer duct having a plurality of sub-ducts defined therein. However, in alternative embodiments, references to multiple ducts or multiple ducting may imply multiple independent ducts or a single duct which is capable of directing more than one cable (at separate installation times). Thus, whilst the multiple duct may have sub-ducts within which separate cables can be laid, alternative embodiments are possible provided the duct is suitable for more than one cable passing operation.

The setting up of a cable connection often involves installation across a region presenting a particular difficulty or delay. An example of one such region is an area of water to be traversed. Thus an implementation of this aspect is provided between connection points separated by an expanse of water, such as a lake, sea or ocean, the first point being on or adjacent to the shore or at or near a cable landing station, the first region being in the shore area. A particular problem with installing cable across a region of water is that usually the cable will have to be laid on the bed below the water. At least a part of a new cable connection can be made without the need to repeat the underwater laying process in the vicinity of the shore, as the new cable(s) can be installed in the existing multiple ducts.

An embodiment of this aspect provides the termination point at a distance relatively close to the first connection point. This may provide easy access to the termination point from the shore or bank of the water region.

Location of Termination Points

Pursuant to the invention it has been appreciated that a large amount of disruption and expense can be avoided by providing, in the case of a lake or sea installation, the termination point at a distance of preferably at least about 2 kilometers from the first point, more preferably at least about 5 km. A large amount of construction work is required in landing a cable, and, in the case of coastal installations, permits are required to land a cable and new cables must often be laid in place of old in the same route. The landing site area also suffers significant disruption, as the usual fishing, dredging and other shipping activities may have to be halted temporarily and the habitats of local marine life may be disturbed; even as close as 100 m to the first point, the provision of a termination point coupled by multiple ducting can significantly reduce the overall technical effort required to provide a subsequent long distance cable link. Even for a route covering thousands of kilometers, analysis according to the invention has found that a surprising increase in efficiency of the overall process may be achieved by provision of multiple ducting over as little as 2 kilometers of route, in the vicinity of the shore end of the route. Although the termination point will normally be subsea, a termination or access point may be provided at an offshore platform, preferably a pre-existing offshore platform; this facilitates subsequent access and splicing of cables. The termination point, whether sub sea, floating or on an offshore platform is preferably located out to sea (or otherwise away from the shore in the case of a lake) in the case of a route traversing water and the multiple ducting is preferably provided on or in the water bed. In alternative embodiments, particularly in the case of a river crossing or festoon as described herein, the distance may be less, in some cases for example the distance may only be of the order of a hundred meters or so although such embodiments may not offer the advantages associated with the considerably greater distances preferred (of the order of at least 2 km).

Placing the termination point at about 10 kilometers from the shore can provide a remarkable benefit in reduction of disruption when a subsequent cable is to be laid and it is surprising that, for example in the case of a cable crossing of many hundreds or even thousands of kilometers, provision of multiple ducting over a relatively small proportion of the distance can potentially significantly reduce expense and complication of subsequent cable installation operations. Benefits of having a relatively short distance to the termination point include reduced cost of multiple ducting and that the termination point remains relatively easily accessible.

However, in other embodiments, the termination point is placed at a greater distance, typically more than about 10 kilometers, typically tens of kilometers or even about 100 km or more from the first point. At such great distances from the shore, the disruption associated with shoreline installation may be significantly reduced. Analysis pursuant to the invention shows a surprising advantage in terms of overall technical effort for a route and reliability of cable installation may be obtained with a termination point between 10 km and 100 km.

Although reference is made to termination "points" it will be appreciated that the term "point" is of course not used in the mathematical sense but is intended to connote a region. The region will generally be relatively localised in comparison to the size of the extended span but may nonetheless have sub-features spread over an appreciable area. For example, the termination point may comprise multiple cable exits spread over several hundred meters or even an area of the order of a square kilometer.

The location of the termination point is preferably chosen based on the water depth (or, for example in the case of land based systems to which variants of the invention may be applied, based on other features of the terrain; for example, a cable across a rocky and desert region may have multiple ducts through the rocky region, where installation is more problematic than through the desert region). The termination point is preferably at a minimum depth of at least about 10 m; at lesser depths the advantages diminish as subsequent installations will still require significant disruption, but this possibility is not excluded and may offer advantages in certain cases. However, to facilitate access, the termination point is in a relatively shallow water region, preferably at a depth of about 300 m or less, preferably 200 m or less, more preferably of the order of about 100 m. This allows the termination point to be more accessible (for example by divers) allowing safer and more efficient installation of cables. In a most preferred embodiment, the termination point is located a substantial distance from the shore (for example many tens or even hundreds of kilometers, typically at least about 100 km) on a continental shelf, preferably adjacent (for example at least half way to, typically within about 10 km of, preferably within about 1 km of) a transition to deeper water. Provision of a termination point adjacent the edge of a continental shelf may have the advantage that a cable leaving the termination point may not require burying in the shelf bed or at least not for an appreciable distance. Where the termination point is provided a substantial distance from the shore, repeaters or intermediate access points or intermediate termination points may be provided between the connection point and a final termination point, to facilitate cable installation and/or servicing and/or to enable signals to be transmitted reliably over longer distances. If repeaters are provided, these may be arranged to be upgradeable; this feature may be provided independently.

In the case of a deep sea crossing, there may be a second termination point and a second region of multiple ducting from the second termination point to the second point. For example, in the most preferred implementation, the invention may provide a method of facilitating provision of a point to point cable connection between first and second points separated by an extended span including a region of deep water, the method comprising providing first multiple ducting from the first point through a first relatively shallow water (for example continental shelf) region of the extended span to a first termination point intermediate the first and second points (preferably at least about 2 km from the first point, more preferably at least about 10 km from the first point, preferably adjacent a transition to deep water), providing second multiple ducting from the second point through relatively shallow water (for example continental shelf) to a second termination point (preferably at least about 2 km from the second point, more preferably at least about 10 km from the second point, preferably adjacent a transition to deep water), the first and second termination points being separated by said region of deep water. In the case of a method of facilitating a transatlantic cable crossing, the first and second points are located in the US and UK or Europe respectively or vice versa and the first and second termination points are located in the respective continental shelves, the Atlantic ocean comprising the region of deep water.

The ducting can be pre-fabricated onshore, and subsequently transported to the laying site by one or more vessels. In an aspect, the invention provides a method of facilitating provision of an underwater cable connection comprising fabricating a length of multiple ducting at a first point and transporting the length to a submerged lay site at a second underwater point. This allows for longer lengths of the ducting to be installed at one time. Typically, the section of ducting is towed between two vessels, and laid at the correct site.

Another aspect of the invention provides a section of conduit for a plurality of underwater cables, the conduit comprising an elongate (preferably substantially rigid) outer pipe having first and second ends and defining an inner space, a plurality of inner ducts positioned within the inner space and extending between the first and second ends, each inner duct defining a cable-directing inner channel extending substantially from the first end of the pipe to the second end of the pipe, wherein a seal is established at each of the first and second ends to trap a region of air in the inner space. This region of air can thus be partially or completely flooded to alter the buoyancy. Preferably the conduit has an inlet to facilitate flooding of the inner space. Similarly the invention provides a method of facilitating provision of a cable connection comprising fabricating a length of multiple ducting at a first point and transporting the length to a submerged lay site at a second underwater point, wherein the multiple ducting comprises a (preferably substantially rigid) sealed outer pipe and an arrangement comprising a plurality of ducts each adapted to receive a cable, wherein a seal is established between the outer pipe and the ducts at either end of the conduit to form a region of air trapped between the outer pipe, the insert and the seals, providing hydrostatic buoyancy, and comprising transporting the ducting to a submerged point above the lay site, breaking one or more of the seals, thereby flooding the region of trapped air, and laying the ducting at the lay site.

The termination point will normally be provided on the sea bed. However, as an alternative, the termination point may be brought to the surface. Providing the termination point at the surface has the advantage that connection of cables is simplified, but requires suitable anchoring for the termination point, and provision of suitably robust ducting. In addition, the requirement for the cable to climb from the sea bed, which may be at a depth of 100 m or more to the termination point may complicate installation of cable (although in such cases, the cable may be inserted from the termination point).

To install cables into ducts, flow methods are known, as discussed further herein, and these are suitable for installing cables into a continuous run of duct up to about 10 km. Where the termination point is located substantially further than this from the first point, there are a number of options.

Intermediate access points may be provided at intervals at which the cable can be installed without problem and the cable may be installed in stages, for example propelled to a first access point, pulled through then propelled to the next access point or separate cables may be installed and spliced or coupled (optionally via a repeater) at the intermediate points.

Alternatively, by careful selection of parameters (for example cable jacket/duct friction coefficient, stiffness etc, duct and cable diameter, buoyancy), the useful installation length may be extended.

As a further alternative, pull cords may be provided in the multiple ducting at installation and used to pull cable through the ducting.

As a yet further alternative, to avoid having to drag the cable through the duct, particularly for larger ducts, the cable may be unreeled from within the duct.

A splicing point may be provided intermediate the first point and first termination point, for example at a depth of about 10 m or less, under a beach. The splicing point may be coupled to a cable landing station by means of a multiple duct, optionally installed by means of a directional drill. Cables may be pulled through to this splicing point, which is relatively easily accessible and joined to a long distance cable which is propelled through further multiple ducting to the first termination point.

For relatively short routes, for example across a river, estuary or channel, such as the English Channel, for example up to 50 km and particularly but not exclusively where unrepeated lengths are possible, multiple ducting may be provided across the whole route. In a related aspect, the invention provides a method of facilitating a cable connection between first and second points separated by an expanse of water, the method comprising providing multiple ducting from the first point across the expanse of water, preferably buried in the bed of the expanse of water, to the second point. In this way, a plurality of cables can be installed from the first point to the second point, preferably in separate operations without having to repeat the "wet" work. Preferably the first and second points are located on shore and the multiple ducting provides multiple routes for cable to traverse from shore to shore. The invention further provides a method of providing multiple shore to shore cable connections across an expanse of water, the method comprising providing multiple ducting from the first point across the expanse of water, preferably buried in the bed of the expanse of water, to the second point and subsequently installing a plurality of cables from the first point to the second point.

Duct Dimensions

The duct dimensions and configuration may vary considerably depending on the environment and degree of resistance, the route length and the cable type and the invention is not limited to any particular duct configuration for the multiple ducting. The ducts need not be circular (although this is preferred for manufacture, duct installation and cable installation); references to diameter below should be construed as applying to the effective cross-sectional width in the case of polygonal or irregular shapes.

A greatly preferred configuration is for the multiple ducting to comprise a relatively environmentally resistant and preferably relatively rigid outer shell, preferably of metal, preferably steel or reinforced with steel with a plurality, preferably at least four, most preferably at least eight sub-ducts of lesser environmental resistance through which cables can be inserted. The sub ducts are advantageously formed from plastics material and HDPE (high density poly ethene) has particularly advantageous properties for sub sea applications, particularly in terms of environmental resistance, extrudability and rigidity. In a most preferred arrangement, the outer shell has a diameter of at least about 15 cm, more preferably at least about 30 cm often at least about 50 cm and the inner sub-ducts preferably have an internal diameter of at least about 2.5 cm, more preferably at least about 5 cm. If the internal diameter is at least 10 cm, preferably at least 15 cm, particularly for longer lengths, installation of cables is greatly facilitated, although this of course requires a larger outer duct and increases the cost of installation.

In the case of a single duct into which multiple cables are installed, the diameter is preferably at least 15 cm, more preferably at least 30 cm and with ducts having an internal diameter of 50 cm or more, a greatly increased number of cables can be accommodated. The duct preferably has a minimum internal diameter (or minimum dimension through which cable can pass in the case of a non-circular section duct) of at least about 10 cm, more preferably at least about 20 cm.

Point to Point Installation Overview and Variants

To provide a cable connection, cable is passed through the multiple ducting to the first termination point (or alternatively but less preferably vice versa) and from the termination point to the second point. In the typical case where there is a second termination point, passing the cable from the first termination point comprises providing cable between the first and second termination points and passing cable through the multiple ducting between the second point and second termination point. Normally, the cable passed through the ducting will be relatively thin lightweight cable, the ducting providing protection from the environment. In contrast, the cable extending from the termination point (or between the first and second termination points) will normally be heavily armoured cable designed to be lain on the sea bed over the deep water region. Thus the deepwater cable will normally be spliced at the termination points to the cable provided within the multiple ducting. However, this need not necessarily be the case and a single cable of suitable constitution may be used. If one or more intermediate splicing points are provided, the cable will be spliced (or connected, optionally with a repeater) at such points and different cable types may be used for different sections. The invention extends to provision of a cable link.

In a second aspect, the invention provides a method of providing a point to point cable connection between first and second points separated by an extended span, the method comprising passing a first cable through multiple ducting from the first point through a first region of the extended span to a termination point intermediate the first and second points and providing a second cable from the termination point to the second point.

The multiple ducting is preferably provided according to the first aspect and preferred features of the first aspect apply to this aspect and vice versa.

The first cable may comprise a relatively lightweight cable, preferably having a diameter of less than about 5 cm, more preferably less than about 1 cm. Providing the second cable may include providing an armoured section of cable on the sea bed of a deepwater region. The armoured section of cable preferably has an armour layer including metal, typically steel, preferably braid or wires if not a continuous layer and the armoured section may have a diameter of greater than 1 cm. Where a second termination point is provided, providing the second cable may comprise passing a section of second cable through multiple ducting from the second point to the second termination point and providing said armoured section of cable between the termination points.

Typically, the ducts according to the implementations above are buried, and where they are submerged, a trench is preferably dug (or jetted) in the underwater bed for this purpose. Thus damage to the ducts from either surface or waterborne hazards may be avoided.

In one implementation, the ducts are provided in a channel drilled from a connection point to a termination point, protecting the ducts more effectively, as they can be laid further underground.

An aspect of the invention provides a conduit installation comprising a connection point and multiple ducting between the connection point and a termination point in an at least partially submerged region.

This provides an infrastructure for multiple cable connections with less expense and disruption than a multiple of individual connections.

To minimise risk of catastrophic simultaneous damage to multiple cables, preferably the termination point comprises multiple cable exits over an extended region so that cables can exit the multiple ducting at spaced apart locations. Preferred implementations of this are discussed below. In a preferred implementation, the termination point comprises a termination structure providing at least two cable exits spaced apart by at least 5 m, more preferably at least 10 m and in the case of a sea crossing preferably at least 50 m. Analysis pursuant to the invention shows that a spacing of at least 50 m in a sea-crossing cable can dramatically increase reliability of the multiple connections. The termination structure preferably provides protection, most preferably a protective duct or housing, between the cable exits and the (protective and/or suitably buried) multiple ducting. This is a particularly advantageous feature. The termination structure may be a branching sub-sea duct structure a part of which may optionally be recoverable to the surface to facilitate provision of new cables or repair or maintenance, an enlarged sea bed structure, a buoyant structure with protective cable risers or protective anchor chains or cables extending to the sea bed or an offshore platform structure with protective risers. The termination structure may include or be supplemented by protective elements such as concrete mattresses (as described herein) or other protective elements extending away from the multiple ducting and may be supplemented by or provided by excavations formed in the sea bed. The invention further provides a method of forming a subsea termination structure comprising providing a protective structure extending from a region of multiple ducting carrying at least two cables to at least two spaced apart cable exits, the exits preferably being spaced apart at least 50 m. A preferred spacing distance for the cables is of the order of at least about 1.5 times the water depth and the spacing is preferably at least equal to the water depth. Termination structures and methods of forming termination structures may be provided independently.

Splicing

A further aspect of the invention provides a cable splice box in an at least partially submerged region, comprising an enclosure and means for splicing cables. This allows for cables being laid in a submerged region to be spliced, thus avoiding, for example, shore line disruption caused by land based splice boxes.

In an implementation, the box is buried, protecting it from possible damage. Typically, at least two cables run from the box to a cable landing station in a shore area.

In a further aspect, the invention provides a method of facilitating cable servicing and splicing, comprising providing a first cable splice box in an at least partially submerged region, passing one or more cables from a connection point to the box, and providing service access to the cables at the box. This may provide for an easily accessible serviceable cable installation.

Upgradeability

Another problem with cable installations is the large cost involved when cables are replaced or upgraded. The present invention consists in a further aspect in a method of providing cable connections over an extended span comprising laying multiple ducts over a portion only of the extended span, passing at least one first cable having a first specification through a first duct to form a first cable connection, and subsequently after a period of time during which the first cable connection is operational passing at least one second cable, preferably having a second specification through a second duct to form a second cable connection.

This aspect thus provides for a readily and cheaply upgradeable cable system.

Typically, each duct is occupied by at least one cable, thereby maximising the data capacity of the set of conduits. However, in an implementation, one or more of the multiple ducts are left empty. This allows for ready upgrading when higher specification cable becomes economically viable.

Cable Landing Sites

An aspect of the invention consists in a method of providing a cable connection between primary and secondary points, comprising installing a cable from the primary point through one of multiple ducts to at least a first primary termination point, passing the or a further cable across a substantial distance and installing the cable at the secondary point.

In this manner, long distance cable may be installed. For example, a transatlantic cable installation may employ this method.

In an embodiment of the invention, one of the ends of the cable may be installed in an area where there are few restrictions, or where only a single cable connection is needed. Thus the multiple ducts required at one end, may not be required at the other, saving expense and time.

In an implementation of this aspect, the cable is passed across the substantial distance to at least a first secondary termination point, and installed through one of a multiple of ducts to the secondary point.

In another aspect there is provided a method of facilitating provision of a number of cable connections between a first point and a number of second points, comprising providing multiple ducts from the first point to a termination point intermediate the first and second points, and providing at least one cable connection point at each of the second points.

This provides that each of the multiple cables connected at the first connection may be connected to different connection points, for example a cable point in New York may be connected to the UK, to France and to Ireland.

In an implementation, there is provided a method comprising installing cables from the first point through the multiple ducts to the termination point, and passing the cables or further cables to at least two of the second points.

Typically, these methods are implemented in spanning a large expanse of water, such as a lake or ocean.

In an aspect, the invention provides a cable installation comprising: first and second connection points; multiple ducts between the first connection point and a first termination point; and at least one cable installed through one of the multiple ducts to the first termination point, across a substantial distance and to the second connection point.

This provides an installation to which additional and replacement cables may more easily be added.

In an implementation, cables are spliced at the first termination point.

In another implementation, the cable is installed to a second termination point relatively close to the second connection point, through at least one duct to the second connection point, thus providing similar advantages at the other end of the connection. Typically, there are multiple ducts between the second termination point and the second connection point.

Preferably, there are access or splicing points between the first termination point and the first connection point, and between the second termination point and the second connection point, allowing for service access to more areas of the installation.

In other implementations, there may be further connection points, with at least one further cable being installed from the first connection point to one of the further connection points.

Typically, the first and second (or further) connection points are separated by an expanse of water, such as a lake or ocean, thus providing, for example, a transatlantic cable installation.

There are known methods of introduction of a cable into an existing duct.

The invention may provide installing a cable inside an existing duct which is already occupied by one or more cables, and means for installing cables.
Protection of Cables A further problem faced is that of damage to the cable, which often results in failure of the transmission carried by it.

The present invention consists in another aspect in a method of laying a submarine cable (or duct for carrying cable) comprising using a variable burial depth profile based on anticipated hazards at differing depths. This aspect thus provides a method of cable laying which is less susceptible to damage, and thus can provide more reliable transmission.

In an implementation, the method comprises a first burial depth in a shallow water area, a second burial depth in a deep water area and optionally an intermediate burial depth in an intermediate depth water area. Typically, the shallow water area is in an anchor zone, the intermediate depth water area is in a dredging zone and the deep water area includes a deep sea fishing zone. The method may include planning depths based on coastal outlines/activity and/or distances from shore in addition to or instead of based on water depth.

This implementation provides for a cable laid to avoid the hazards most commonly found in the different regions, and save in expense in those areas where previous methods were excessive in burial depth.
A Typical Installation The invention provides, in a further aspect, a long distance cable installation between first and second coastal areas, comprising in the first area a cable landing station, at least one service point, multiple ducts through a first beach region between the landing station and a first splice box in a first shelf region, a second splice box at the boundary between the first shelf region and a deep water region, and a number of cables installed from the landing station, through the multiple ducts to the first splice box, through the shelf region to the second splice box and through the deep water region to the second, substantially distant coastal area.

Typically, the second coastal area has a similar cable installation to the first coastal area. Preferably, in the shelf and deep water regions, the cables are buried according to a particular variable depth profile, in order to avoid damage.

In a still further aspect, the invention provides a method of facilitating transmission of data across a network spanning a large expanse of water, comprising installing a data transmission cable from a first connection point through a multiple of ducts in a first region to a first termination point, across a portion of the expanse of water to a second termination point, and through a multiple of ducts in a second region to a second connection point. This provides for a cheaper, more efficient, less disruptive and readily upgradeable data transmission system.

The invention extends to installed networks, planning tools, computer software used in planning such methods, data packets transmitted by the installed cables and apparatus adapted for use in the methods of the invention. The invention is particularly suitable for building an upgradeable, particularly IP (Internet protocol) data network and the invention extends to an IP data packet transmitted across an expanse of water through a region of multiple ducting.

Further independent aspects and/or preferred features are discussed below and/or set out in the claims.

The invention will now be described in detail by way of example, with reference to the accompanying drawings, in which:

BRIEF DESCRIPTION OF THE DRAWINGS/FIGURES

FIG. 1 is a diagram illustrating a known arrangement for laying a sub-sea cable;

FIG. 2*a* is a diagram illustrating the arrangement of the sub-sea cable according to an embodiment of the invention;

FIG. 2*b* is a diagram illustrating an arrangement for laying a sub-sea cable according to an embodiment of the invention;

FIG. 35 is a table illustrating the depths of recent faults in sub-sea cables, and their various causes;

DETAILED DESCRIPTION OF THE INVENTION

Figure 1:
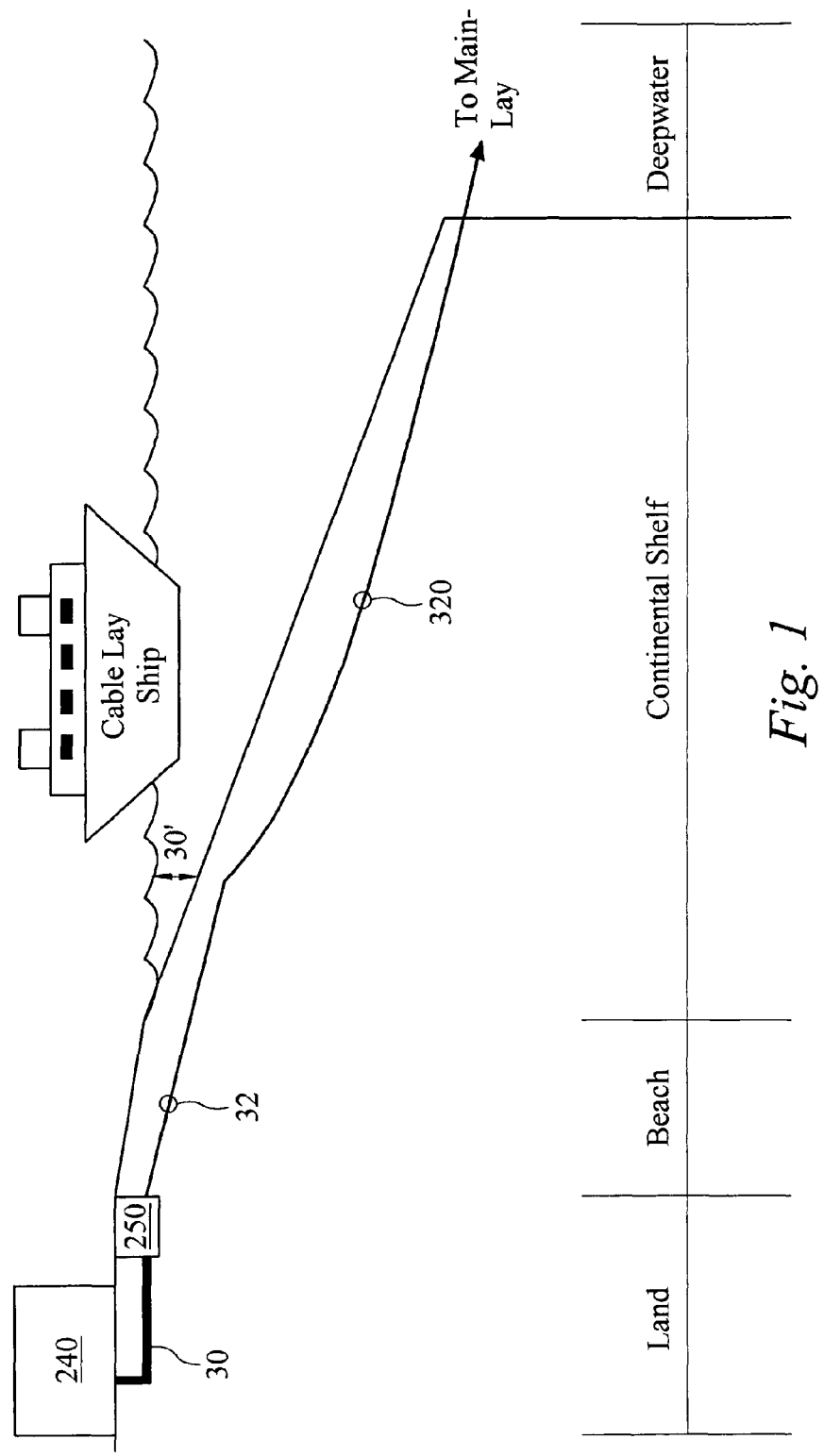

FIG. 1 is a diagram illustrating an arrangement for laying a sub-sea cable. Here, a conduit 30 is laid from a cable landing station 240 to a service site 250 at the beach front. From here, a single channel 32 is bored a certain distance out into the continental shelf, typically to a water depth of 30 feet. The cable 320 is drawn through this and is then laid on the shelf. The cable is armour-plated, typically double armoured and usually buried deeply in the shelf. At the end of the shelf, the cable is then laid across the ocean floor, often trenched, until the opposite continental shelf is met.

Figure 2A:
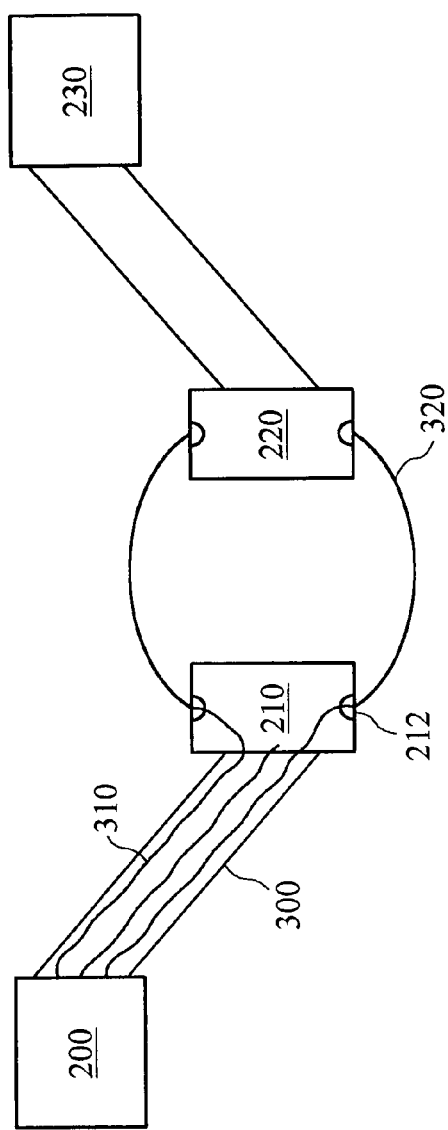

FIG. 2a is a diagram illustrating the arrangement of the sub-sea cable according to an embodiment of the invention. Multiple ducting 300 is laid from the junction point 200 to the termination point 210. The cables 310 split up in termination point 210 and exit the splice box or termination point 210 via cable exits 212 as armoured cables 320. The same apparatus is set up at the opposite end of the cables with a termination point 220 and service point 230. The armoured cables may be laid meters or even kilometers.

Figure 2B:
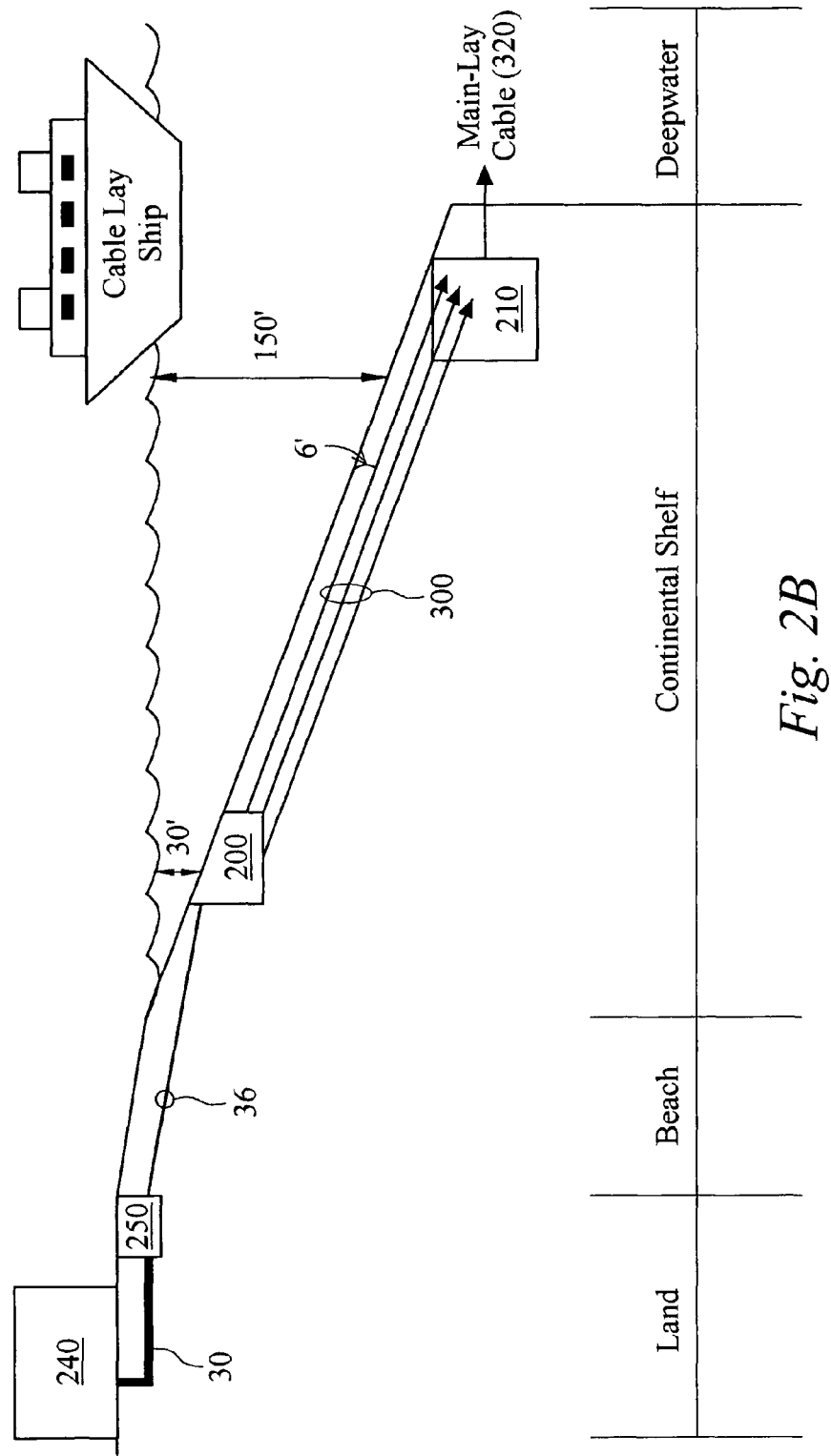

FIG. 2b is a diagram illustrating an arrangement for laying a sub-sea cable according to an embodiment of the invention. A conduit 30 is laid to the service point 250, but a bore hole 36 to the shelf is built to accommodate multiple ducting. Multiple cables can therefore be laid, and are either pulled or jetted to a junction box 200 at the top of the shelf. From here, multiple conduits 300 are laid in the same trench, and one or multiple cables 310 may be laid in a single conduit. These cables are then spliced at the splicing box 210 at the edge of the shelf, and the long distance ocean floor cable 320 is laid as usual. In other embodiments, the relative distances between the various stages are different. For example, the splicing box 210 may only be halfway to the edge of the continental shelf, with the long distance cable 320 being laid to the edge of the shelf. It may only be necessary to splice the cable at distances of around 100 feet offshore. The distance from the service point 250 to the junction box 200 (or splicing box 210) may also vary, though particular embodiments of the invention, described below, allow for a longer distance to be traversed by the multiple conduits, typically of the order of 10 to 20 kilometers.

In other embodiments, the cables or conduits are laid directly from the service point 250 to the splicing box 210. In further embodiments, there may be more service points, to enable easier access for repair or for insertion of repeaters. In one embodiment, described later, a duct is drilled directly from the land station 240 to the continental shelf bed. In certain embodiments, in the sections between stages, such as between junction box 200 and splicing box 210, there may be either a single conduit, capable of containing multiple cables, or multiple conduits or cables. These may be laid by a variety of methods, as described later.

Many problems faced in installing cables across expanses of water, such as lakes or seas, are involved with the shore landing site 240. The land installation involves great expense, as a large amount of construction work is required. In the case of coastal installations, permits are required to land a cable in most areas. Several coastal region agencies also require that new cables must be laid in place of old in the same route. The landing site also suffers significant disruption, as the usual fishing, dredging and other shipping activities may have to be halted temporarily and the habitats of local wildlife and marine life may be disturbed. For example, blackout periods for shellfish harvests and marine life spawning season may be incurred. Also, as cable routes restrict fishing grounds for around a mile on either side, the containment of large numbers of cables in a single route is advantageous.

This aspect of the invention, when implemented for a coastal installation, may provide multiple pathways for cables without requiring a new installation each time. This may greatly reduce the amount of construction work required and the disruption caused to shipping and ecosystems.

Cables usually have to be replaced due to simple wear and tear. Furthermore, the demand for increased bandwidth has increased rapidly in recent years along with the amount of traffic being handled by existing cable systems. Potential capacity of cables using new technological developments has also increased, but it is usually prohibitively expensive to replace cables regularly, due to the large costs involved. This aspect of the invention therefore allows simple and frequent replacement of the cables in the existing conduits, reducing costs and enabling greater bandwidth through more advanced cables.

Typical shore-end installation time scales are of the order of 18 months, whereas deepwater work usually takes around two months even though the distance traversed is much greater. There is therefore an enormous time saving to be made, not just by reducing the number of land site installations, but also by carrying out more of the work further out to sea, in deeper water regions.

Cable and Duct Laying Methods

Figure 3:
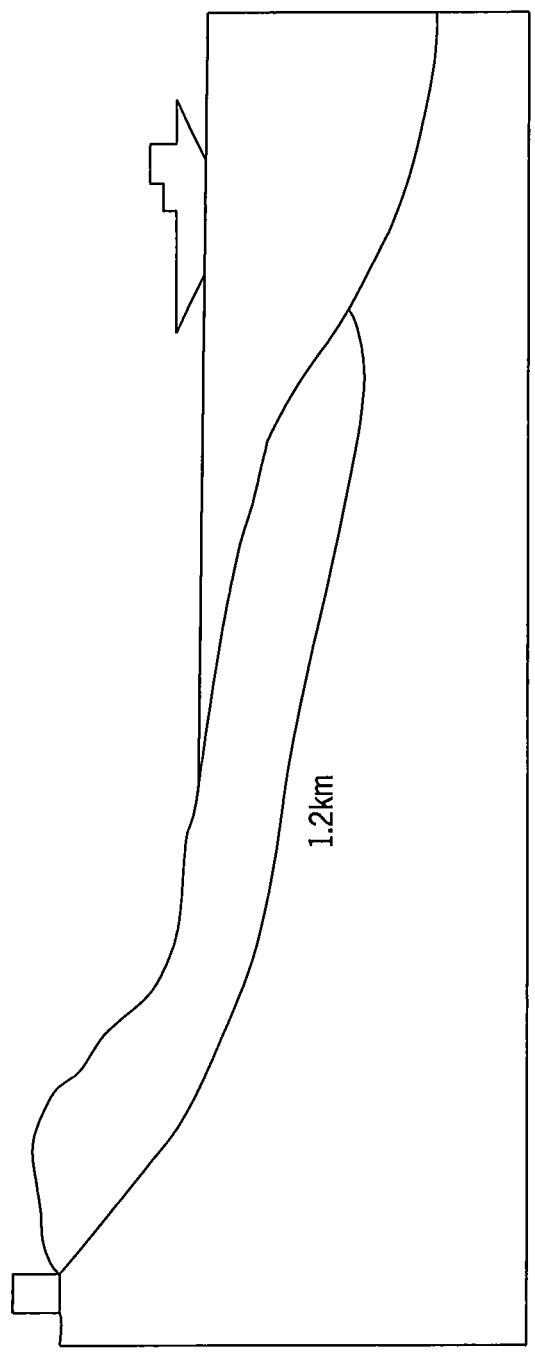
FIG. 3 is a diagram illustrating a method of providing a duct according to an embodiment of the invention.

The conduits, ducts and cables may be laid onto the continental shelf and beach floor by several methods. The channel into which the conduit or cable is be laid may be trenched. Here, a plough is dragged along the sea bed to establish a trench, and the cable is laid into it. The conduit or cable may be subsequently buried in the trench. FIG. 3 illustrates one method of duct installation according to one embodiment of the invention. A channel is drilled directly from the land station to the sea-bed. This method of drilling may be used for only a first section of the arrangement of FIG. 2b, to the junction box 200, or also for the section to the splicing box 210.

Once a conduit or duct has been established, a cable (or further conduits) may be introduced by several methods. One method according to an embodiment is to pull the cable through a conduit, simply by passing a drawing tether through the conduit, attaching this to the cable, and pulling it through the conduit. The cable may also be jetted, particularly using known flow methods as described later herein.

Figure 4:
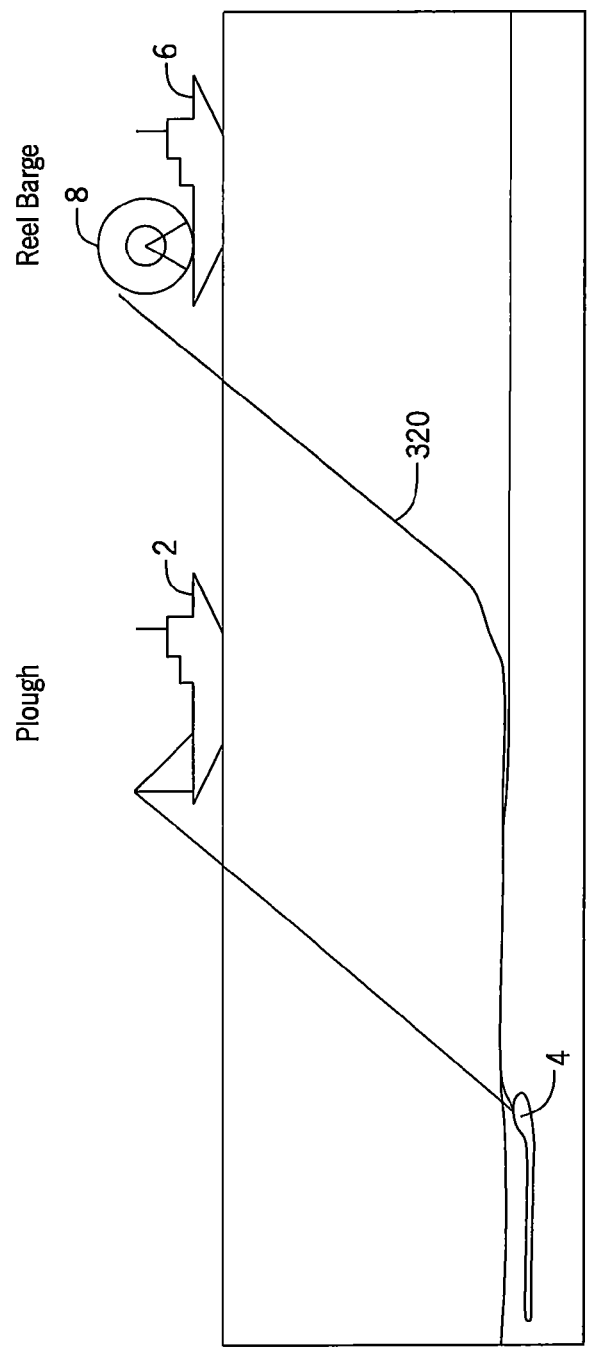
FIG. 4 is a diagram illustrating a method of laying a sub-sea cable according to an embodiment of the invention.

There are several methods available for the installation of the long-distance cable on the ocean floor. One such method, according to an embodiment, is illustrated in FIG. 4. A first vessel 2 drags a plough 4 along the sea bed, and another lays the cable 320 into the resulting trench by paying it out from a reel 8 mounted on the vessel 6. For this arrangement, the cable 320 is preferably flexible, to allow it to be reeled effectively. This method allows efficient laying of relatively long lengths of cable.

Figure 5:
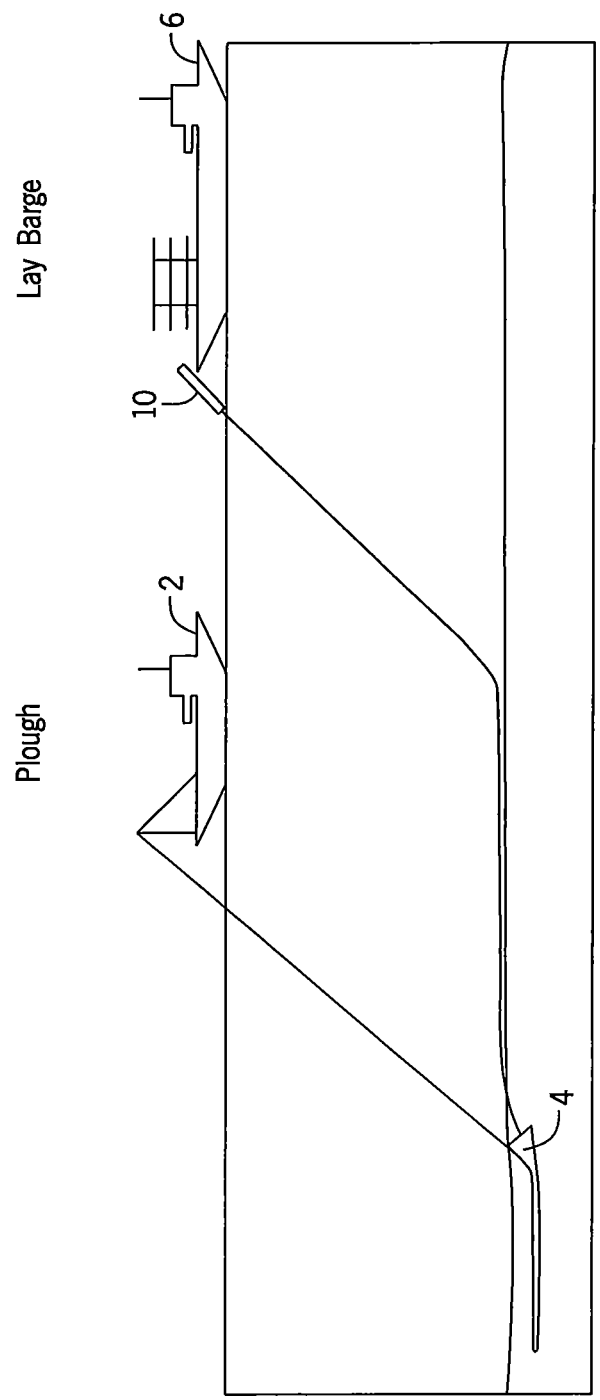
FIG. 5 is a diagram illustrating another method of laying a sub-sea cable according to an embodiment of the invention.

Another method is illustrated in FIG. 5. The pipe 10 containing the cable is fabricated on board the second ship 6, and is then laid in the trench. Here, the cable need not necessarily be flexible.

Figure 6:
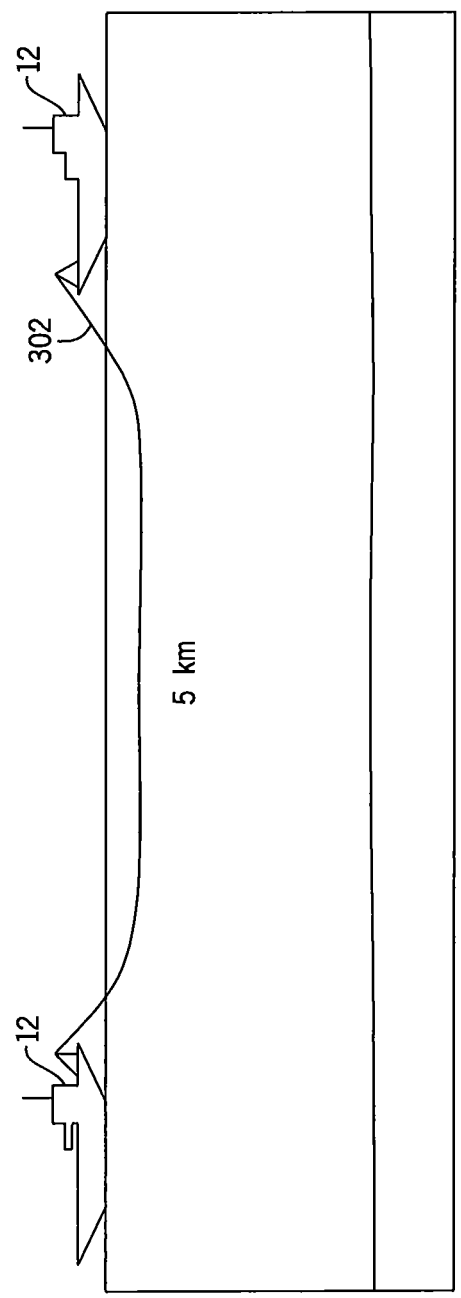
FIG. 6 is a diagram illustrating another method of laying a sub-sea cable according to an embodiment of the invention.
Figure 7:
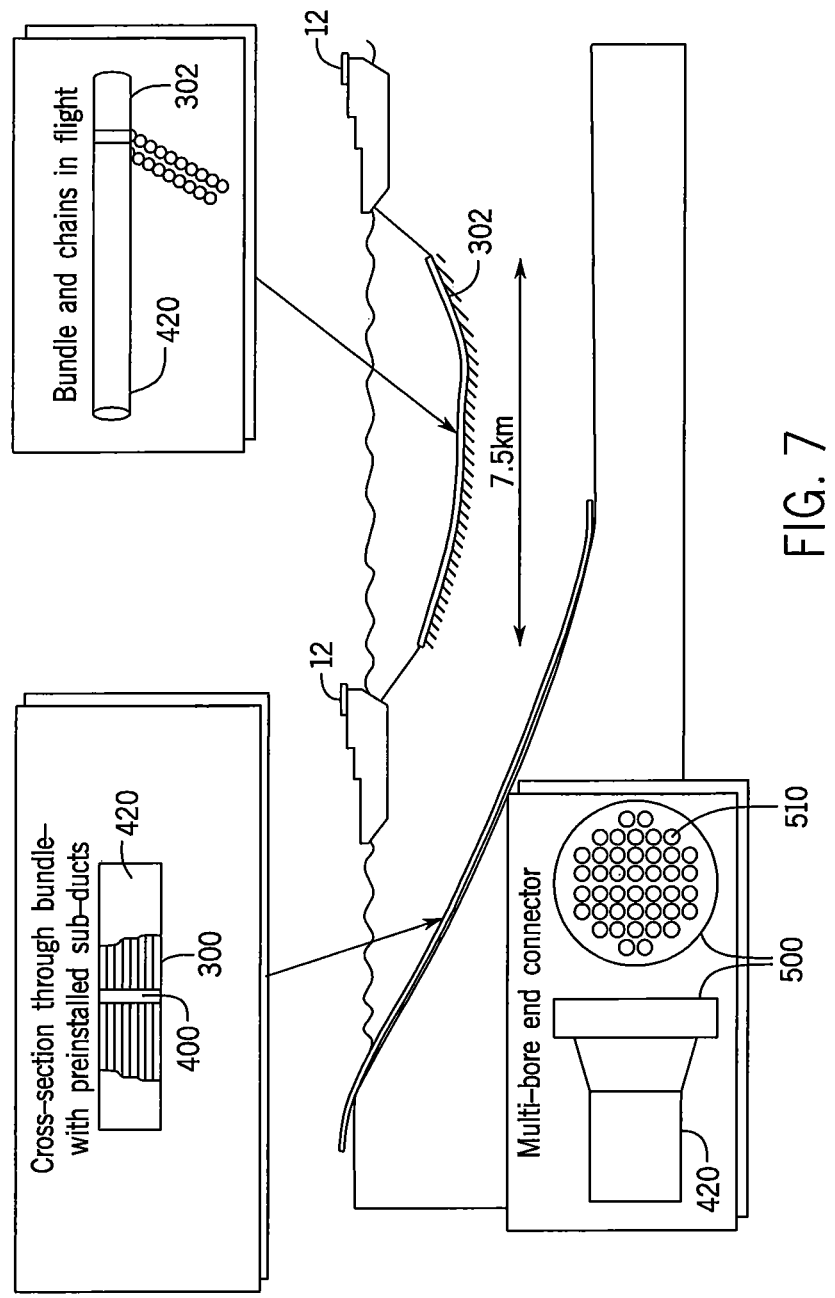
FIG. 7 is a diagram illustrating details of FIG. 6.

A further method is illustrated in FIGS. 6 and 7, wherein a relatively long duct 302 is towed to the laying site by two vessels 12. The duct is preferably pre-fabricated on shore, to lengths of up to around 7.5 km. The complete duct would consist of a steel jacket 420 with a plastic pipe insert, containing the multiple conduits 300. The pre-installed ducts are typically separated inside the pipe by spacers 400. The insert 410 may be pulled through the steel pipe 420 onshore, typically using a winch and a series of pulling blocks on the plastic pipe, and the ends of the plastic pipe may be sealed to the steel jacket, providing a water tight seal.

This would create a region of trapped air between the plastic pipe and the jacket, which would provide extra buoyancy while the duct is being towed. When the duct reaches the laying site, the air may be expelled, or the seal punctured, flooding the area between pipe and jacket, allowing the duct to sink to the shelf floor where it can be attached to the previously laid duct(s).

This method of laying may readily be used for depths of up to around 1000 m, and greater depths can be achieved. The duct diameter will typically be approximately in the range 1-inch to 3-inch over 5 to 10 km, or at least 6-inch and often 12-inch or more for longer lengths up to 100 km. The factors to consider are that a larger pipe obviously increases cost per unit length but can accommodate more cables and simplifies installation of those cables. The number of cables that can be accommodated increases rapidly and non-linearly, with outer duct diameter and so a larger duct is preferred. A diameter of the order of 24 inches can accommodate of the order of 25000 fibres and a diameter of the order of at least about 30 cm is preferred.

Figure 8:
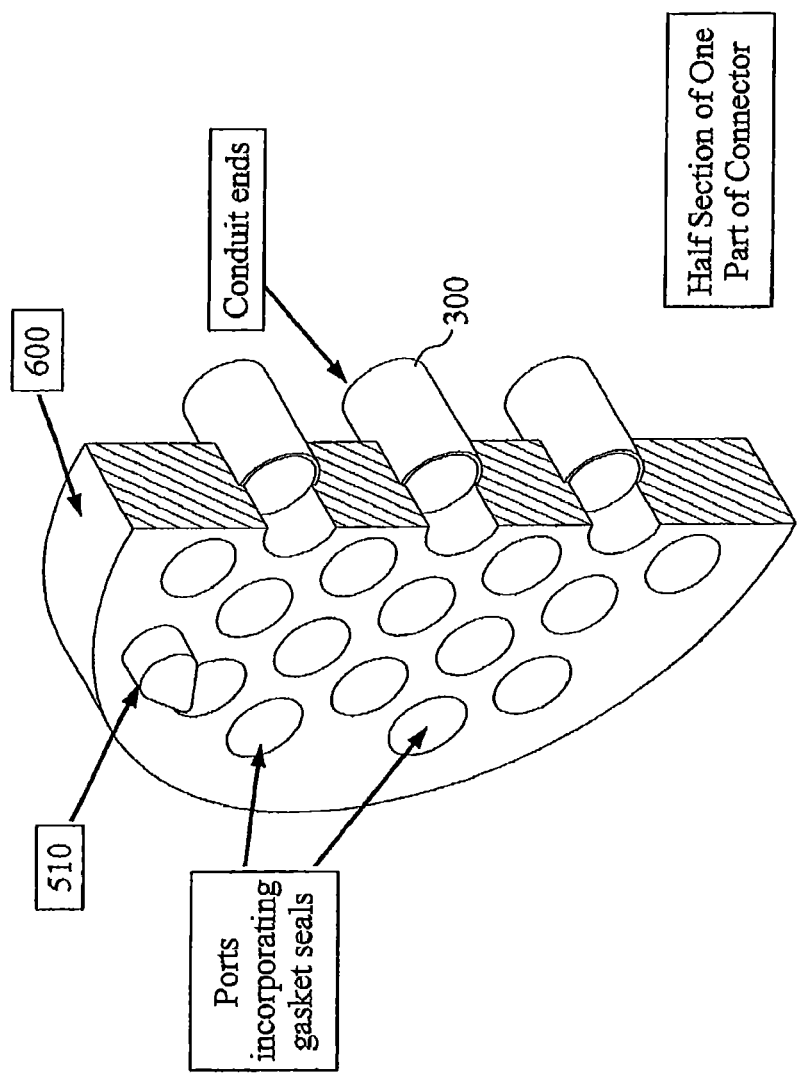
FIG. 8 is a diagram illustrating a stab-plate according to an embodiment of the invention.

The end of each section of pipe 420 houses a multi-bore connection plate 500, mounted in the end of the plastic tube sealed inside the pipe. This is preferably a stab-plate 600, as shown in FIG. 8, though other methods of connection of the sections of pipe may be employed. The array of alignment pins 510 allows the conduit ends to be married more easily.

Figure 9:
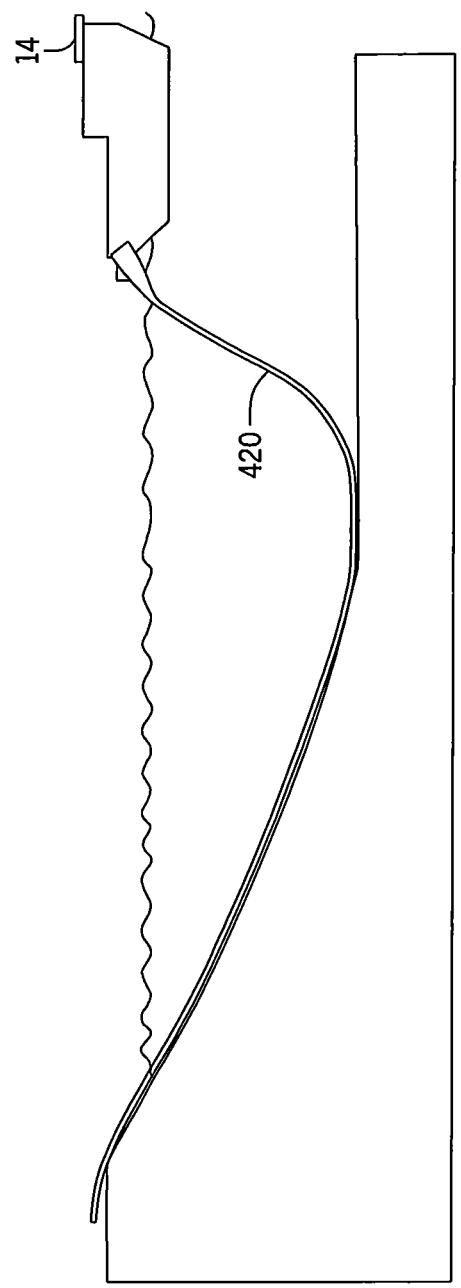
FIG. 9 is a diagram illustrating another method of laying a sub-sea cable according to an embodiment of the invention.
Figure 10:
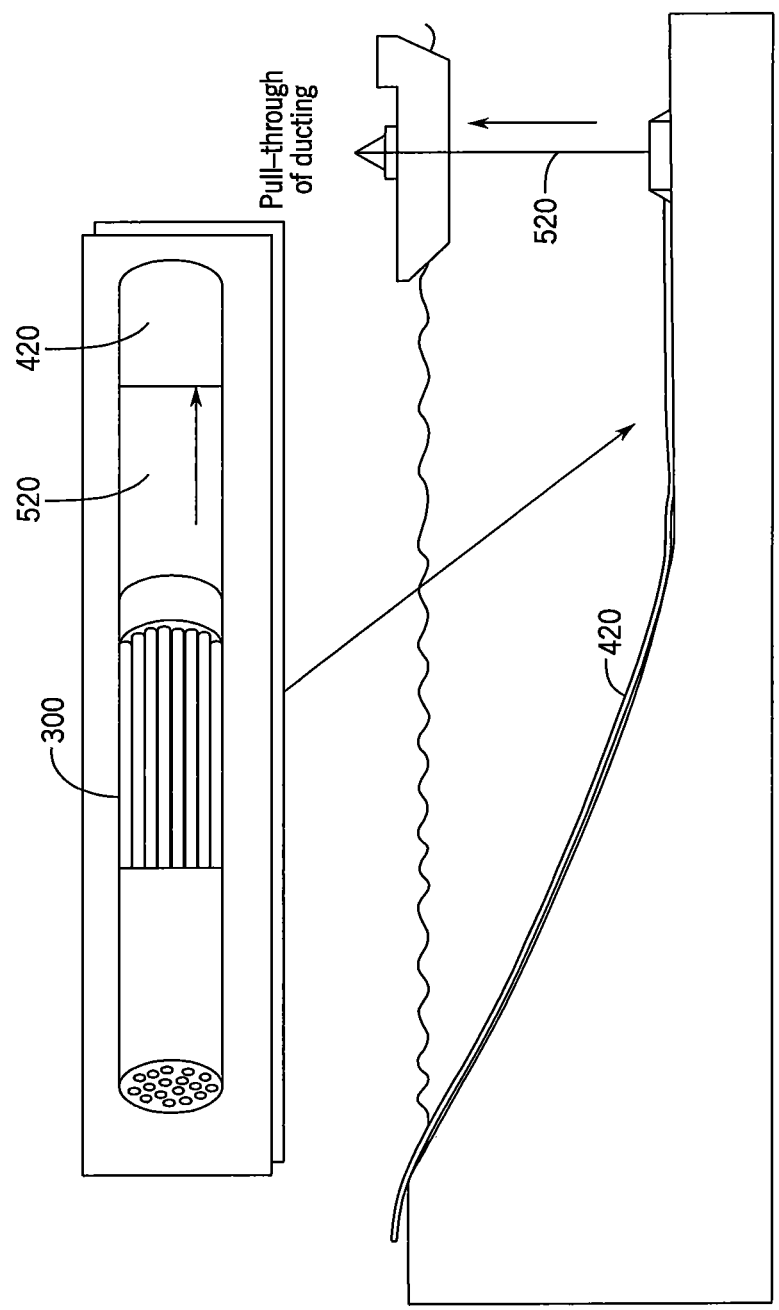
FIG. 10 is a diagram illustrating a facet of the method of laying a sub-sea cable illustrated in FIG. 9.

The ducting 302 may also be laid by a single vessel 14, with the multiple ducts 300 being introduced at a later stage. FIGS. 9 and 10 illustrate an implementation of this method. The vessel 14 pays out the pipeline 420 as it is fabricated on board. The ducts 300 are then pulled through the entire pipe 420 in a single operation, as shown in FIG. 10. To aid the pulling process, the pulling wire 520 may be attached to the ducts 300 at several points along its length, thereby distributing the tension load. The pulling wires 520 are preferably left inside the pipe after the installation. The pulling here benefits from the buoyancy of the plastic ducts 300 inside the submerged pipe 420, allowing friction to be minimized. The pulling wire 520 is typically installed into the pipe 420 using a pig. This method would allow a particularly fast installation, but may be limited to the distances of pipe it may be used for.

Figure 11:
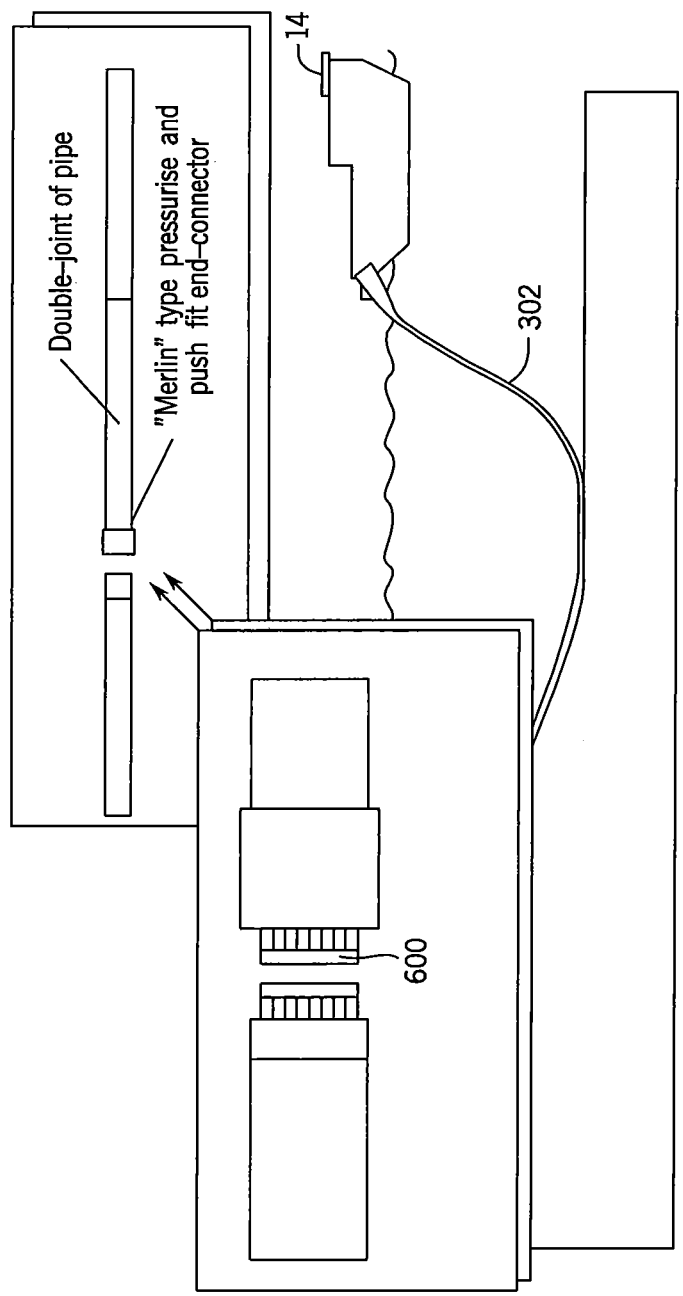
FIG. 11 is a diagram illustrating another method of laying a sub-sea cable according to an embodiment of the invention.

Another method, as depicted in FIG. 11, lays the pipe 420 in sections, installing each section of ducting 300 as each section is laid. This could either be employed using snap type connections 600 (as illustrated in FIG. 11) or welding to join the sections of pipe 420 and ducting 300. The advantage of this technique would be that there is theoretically no limit on the length of pipe which could be installed.

Figure 12:
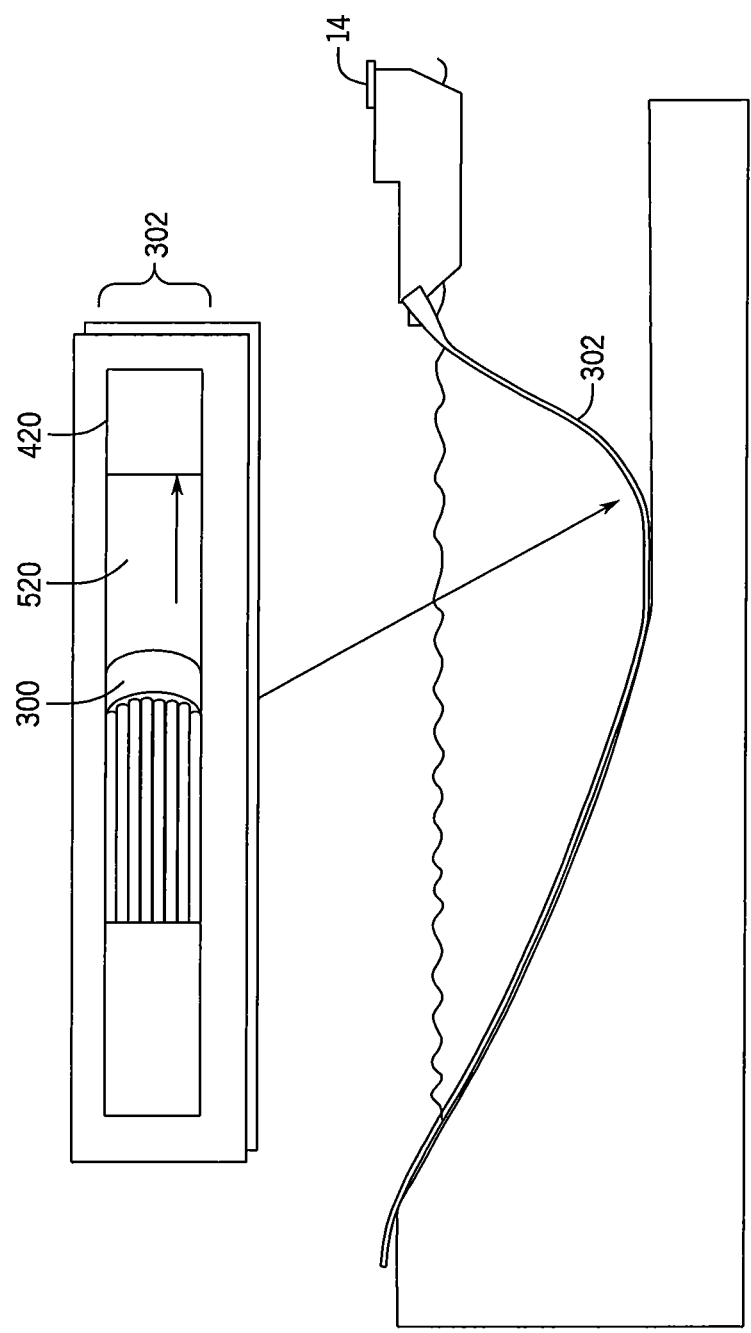
FIG. 12 is a diagram illustrating another method of laying a sub-sea cable according to an embodiment of the invention.

The ducting 300 could also be installed into a pipeline 420 as it is laid, as illustrated in FIG. 12. Difficulties arise here due to the pipe being flooded as it is laid, but provided these are overcome, installation can be relatively fast.

Cables 310 could also be laid inside a pipeline 420 already laid without separation by multiple ducting 300, such as an oil or gas pipeline. However, there may be problems with this type of installation if objects or obstacles exist within the pipeline.

As an alternative to a steel (or other metal—steel is preferred for cost and strength) for the outer casing 420, the casing could be formed from other material, particularly thermoplastics, most preferably HDPE. A major advantage of this is that the ducting can be formed by continuous extrusion, in particular an extrusion plant can be provided on a lay barge and raw material, such as resin or pellets supplied to the barge. The outer duct would of course have to be substantially thicker than a steel duct to provide similar protection and there may be a requirement to add ballast to overcome buoyancy but advantages may include flexibility and cost. Reinforcement, such as metal braid or wires may be included to add weight and to provide protection.

Termination Point Options

The joining or splicing of the cables at the splicing points may, according to embodiments of the invention, be carried out in several ways, and there are also various alternatives for the termination point(s) of the multiple ducting.

Figure 13:
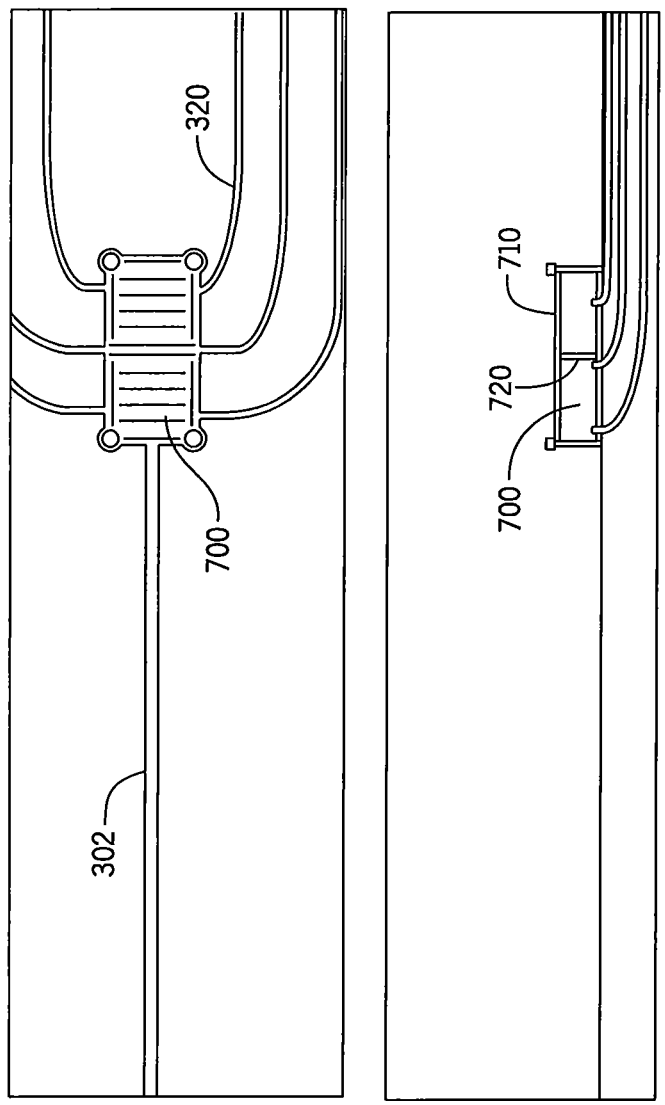
FIG. 13 is a diagram illustrating a termination point according to an embodiment of the invention.
Figure 14:
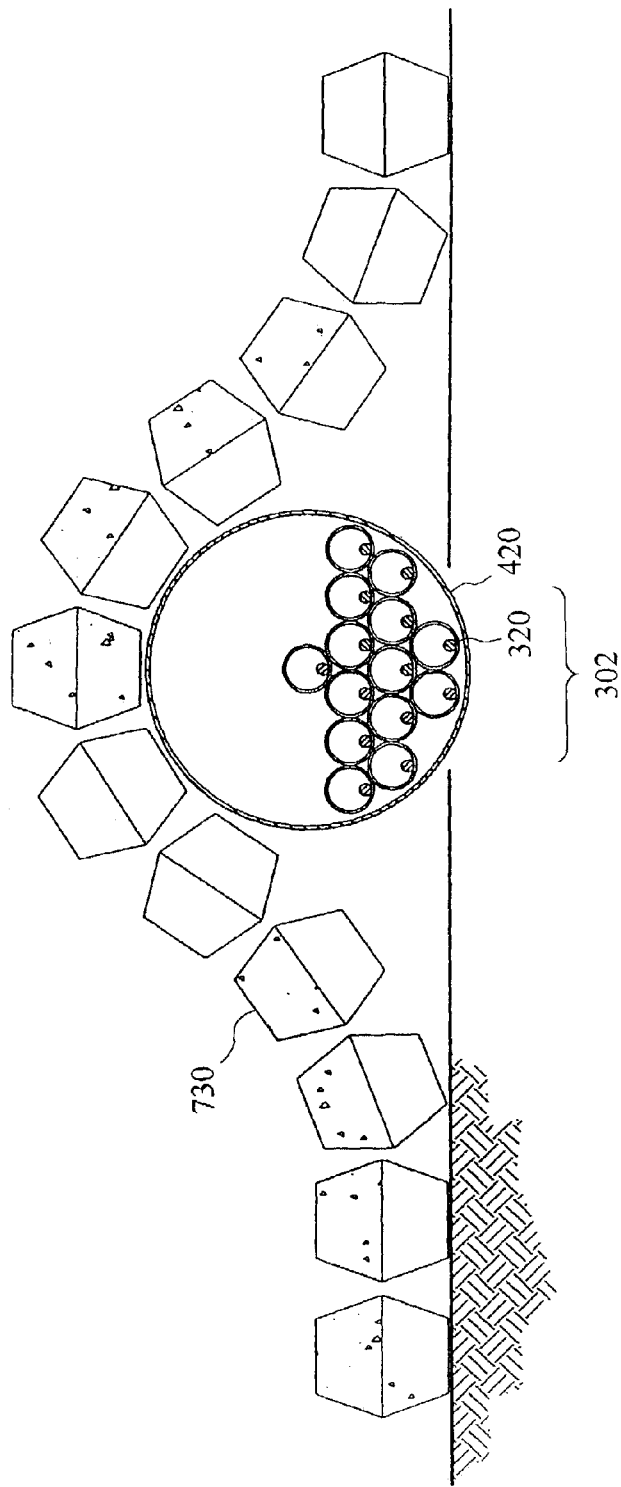
FIG. 14 is a diagram illustrating a method of protection of ducting according to an embodiment.
Figure 15:
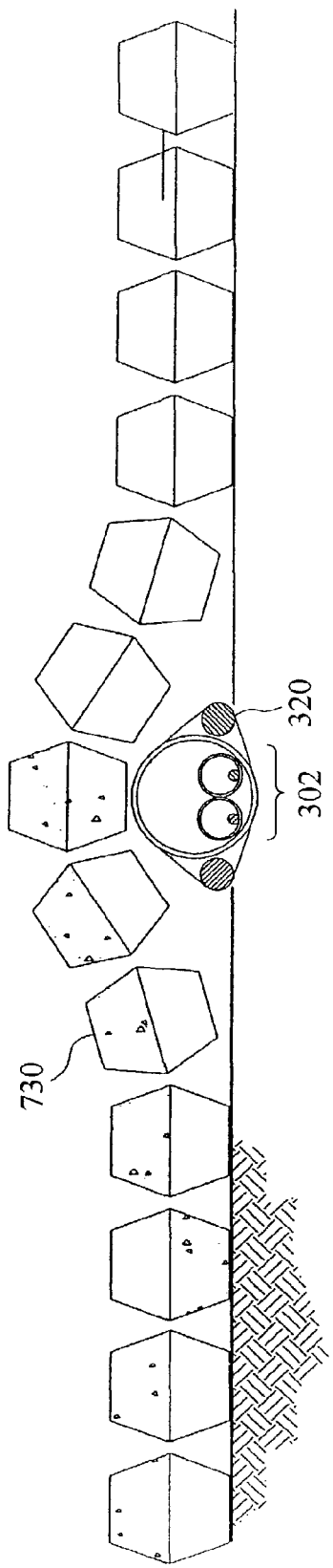
FIG. 15 is a diagram illustrating another method of protection of ducting according to an embodiment.

One method according to an embodiment of the invention would employ a Fixed Pipeline End Manifold (PLEM) 700, as shown in FIG. 13. A sub-sea steel box structure is fixed to the seabed, and connected to the bundle of multiple ducts 300 with porches 710 around the periphery where outgoing cables 320 can be pulled in and connected to a central distribution module 720. The structure 700 is piled to the seabed for greater stability, and is typically sloped to allow trawl-gear to pass over it more easily. This option can be employed in deep waters, though the depth may be limited by the diver intervention required for connecting the cables. An alternative may employ a remote system to connect the cables, allowing greater depths. The armoured cables 320 connected to the PLEM 700 will typically be protected in the immediate vicinity by concrete mattresses or "dog kennels" 730, illustrated in FIGS. 14 and 15.

In alternatives, the PLEM 700 can be a concrete structure, which may be cheaper than the above steel structure. It may also be a hyperbaric environment, which has the advantage of allowing dry cable connection rather than wet cable connection, which is often difficult and time-consuming. The installation of a hyperbaric chamber on the sea bed although expensive may offer advantages in terms of ease of repeat access.

Figure 16:
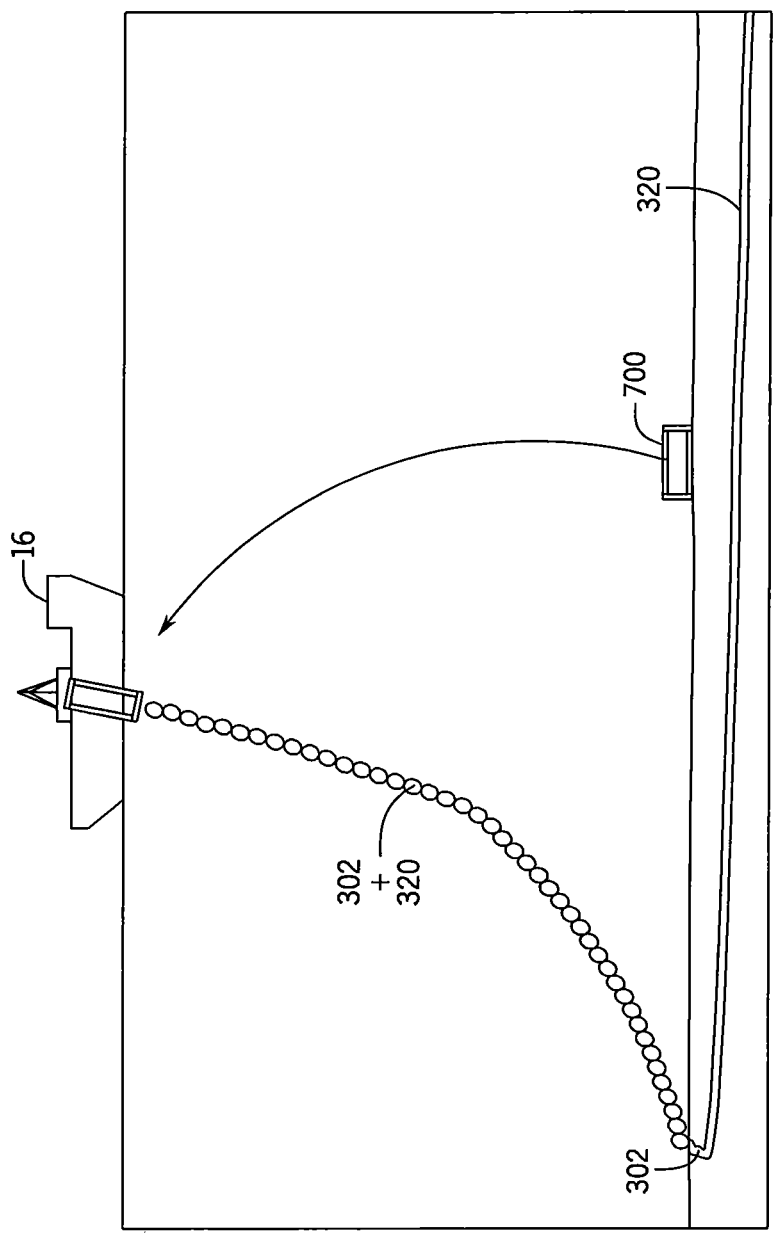
FIG. 16 is a diagram illustrating a termination point according to an embodiment of the invention.

Another method is illustrated in FIG. 16. The PLEM 700 would be designed to be lifted from the sea bed by a connection vessel 16. The armoured cables 320 may be doubled back along the length of the duct bundle 302, so that the PLEM 700 supports them during lifting. Here, the PLEM 700, the doubled-back cables and the cables 320 connected are all protected by concrete mattresses 730 or similar. The PLEMs 700 may be lifted using a DSV mounted crane or similar, in an similar procedure as that used for retrieving the end of an abandoned pipeline. The depths to which such a system could be laid may be limited to around 100 m, by the lifting apparatus, though specialist vessels may be able to lift the PLEM from greater depths. This system would allow the surface connection of cables, which would be far more practical than undersea connection, though it may involve extra cost in hoisting the PLEM from the sea bed. It would also allow the PLEM to be retrieved at any time, in order to repair or replace cables, or to attach new connections simply and efficiently.

Figure 17:
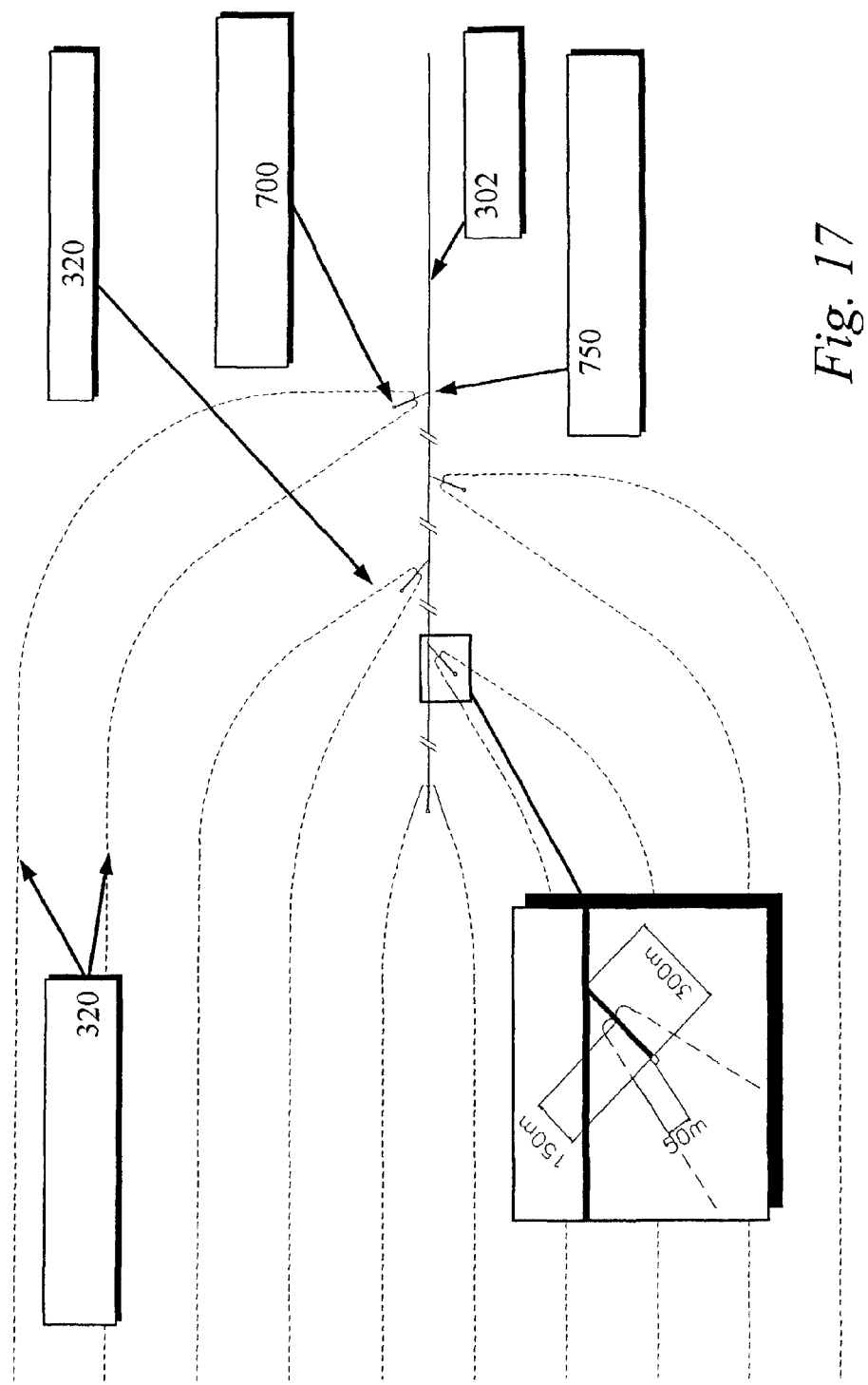
FIGS. 17 to 19 are diagrams illustrating another termination point according to an embodiment of the invention.
Figure 18:
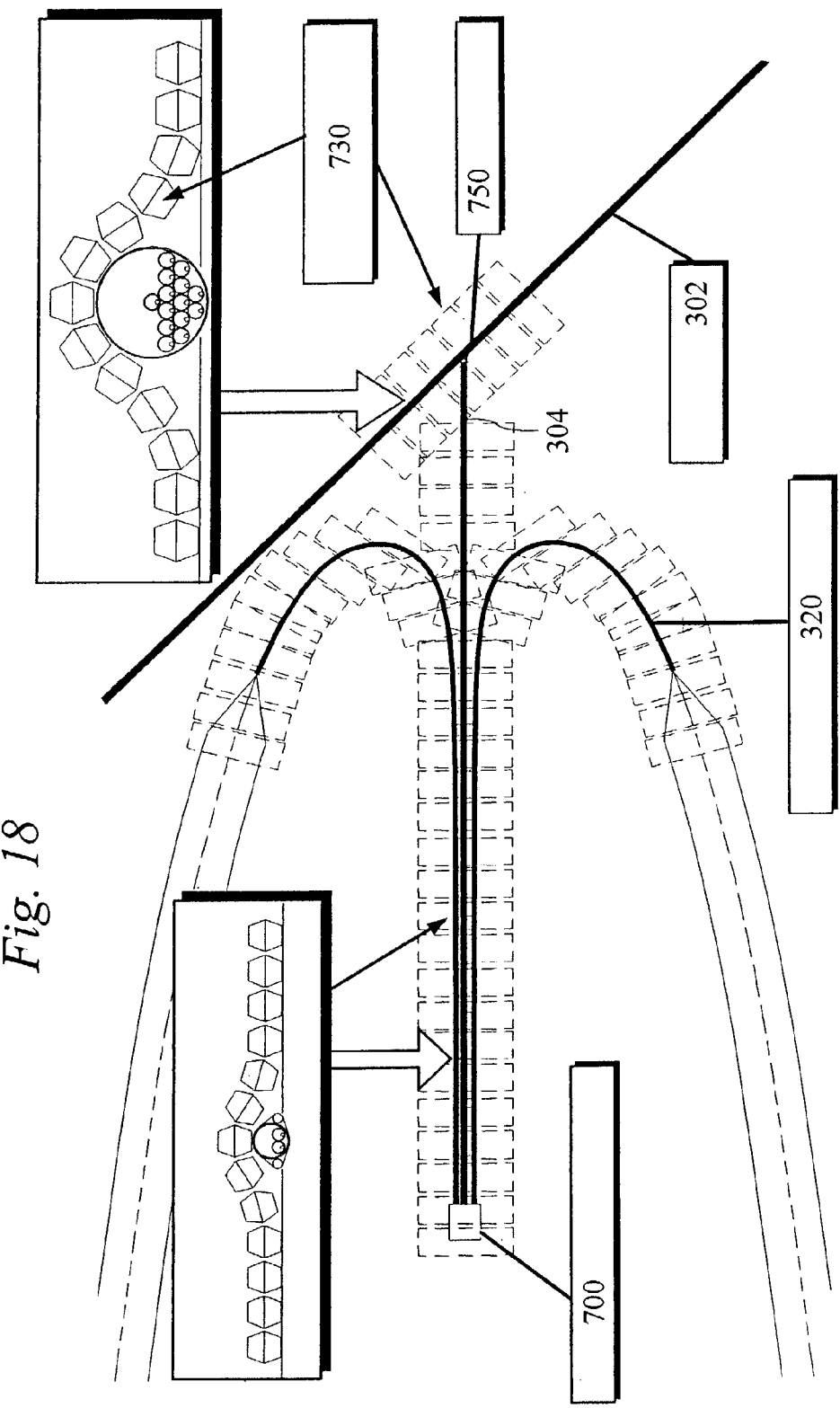
Figure 19:
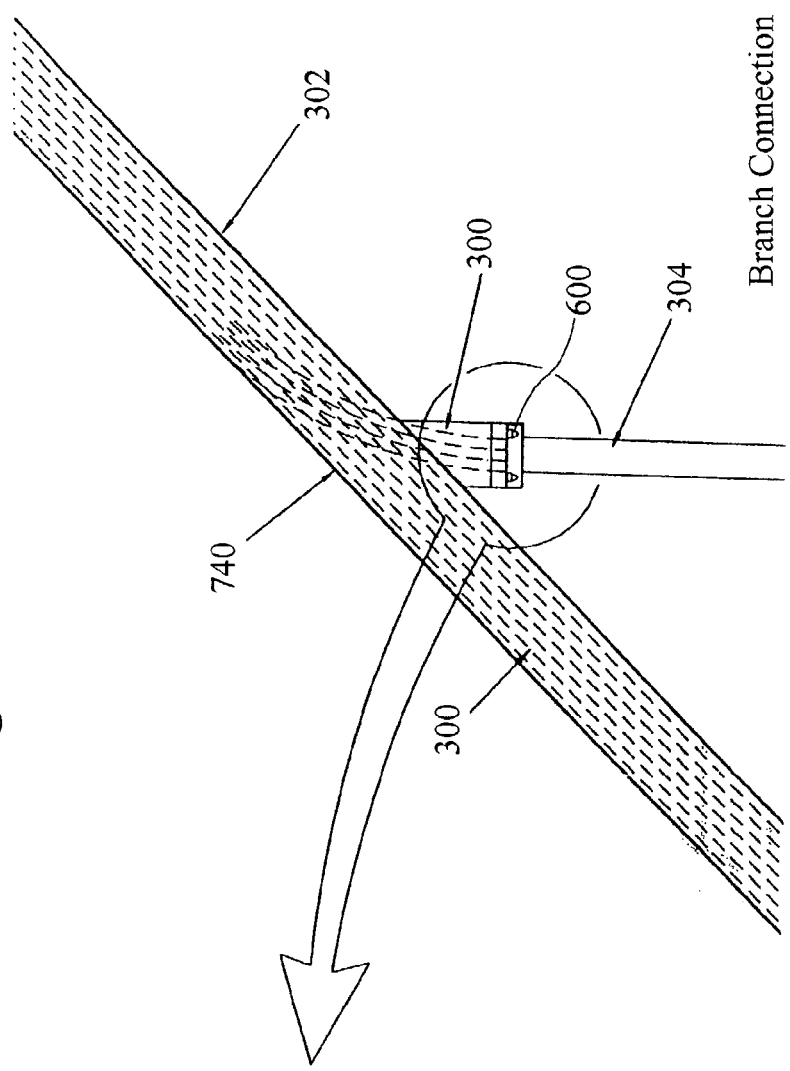

A possible disadvantage with the above methods is that the armoured cables 320 would typically fan out from a single connection point at the PLEM 700, and thus there may be a risk that if one is snagged by an anchor or trawler, the whole set will be dragged with it. Thus, in a preferred embodiment, the recoverable system of FIG. 16 is adapted to provide a daisy-chain of connections, as shown in FIGS. 17, 18 and 19. The final length of the main pipeline 302 with multiple ducting 300 is fitted with a series of "wye" connections 740 and a final integral pipeline end manifold (PLEM) 700 mounted on the laid-down end of the pipeline. The "wyes" 740 and final PLEM 700 are separated by distances sufficient to allow intervention at each location without the risk of collateral damage to the adjacent cables. After installation of the main pipeline 302 a series of side branch connections 750 (at 45° to 7° in the daisy chain layout are made to the "wyes" 710 in the main pipeline, one of which is illustrated in FIG. 18. These branches consist of smaller diameter pipelines 304 (typically 12-inch diameter for a 30-inch main pipeline). Each branch pipeline 304 allows connection of a single or twin armoured cable 320 to the main trunk bundle 302. This daisy-chain connection system would thus provide branches sufficiently separated to eliminate the risk of a total loss of the system, as if one cable is snagged, the others may be avoided.

At each branch connection 750 one or two conduits 304 are routed from the main bundle, to exit from the main pipeline through a side aperture in the pipeline wall. The conduits 304 are typically given a constant (typically 4 m) bend radius to minimize resistance/wear during the subsequent operation of installing the fibre-optics into the conduits. The exiting conduit ends are terminated in the multi-bore stab-plate 600 fashion described above on the outside of the main pipeline 302. As shown in FIG. 19, these stab-plates 600 thus mate-up with opposite stab-plates in the branch connection pipelines 304. The side connection pipelines run for a straight length and are themselves terminated in PLEMs 700. Installation of the branch connections would typically employ the subsea mating of the stab-plates 600 on the main 302 and branch 304 pipelines. This would be performed using a system of docking and alignment devices mounted on both the main and branch pipelines. Typically, the installation would be achieved in two stages, an initial rough docking to structurally locate the branch pipeline onto the main pipeline followed by a closing operation where fine tolerance locating pins would engage and align both sides of the conduit stab-plates. Within each PLEM, i.e. at the end of the main pipeline and at the branches, the conduits terminate in structures designed to allow splicing of the fibre-optics between the pipeline and the incoming armoured cables. To perform the splicing operation the PLEMs are lifted from the seabed to the surface as with the previous method, thereby allowing the operation to be performed under atmospheric conditions. Each PLEM is lifted to the surface where the suspended pipeline assumes a catenary shape down to its touchdown point on the seabed. The length of pipeline lifted would typically be 150% of the water depth at the PLEM.

As an alternative, a substantially rigid section of multiple ducting may be provided with a plurality of relatively less rigid extending branches or risers from which one or more cables can be deployed. The branches are preferably of sufficient length and flexibility to facilitate raising to the surface to attach an extending armoured cable to a cable passed through the multiple ducting and into the branch. The armoured cables may extend away from the main conduit in a similar manner to that depicted in FIG. 17. Alternatively, the cables may extend directly from the ends of the flexible branches, without being doubled back along the branches. Similar distance considerations apply to the spacing of the extended cables in this embodiment and that of FIG. 17. Protection for example with concrete mattresses may be deployed.

For example, the following outline gives a possible procedure of the splicing operation for connecting an armoured cable to a 300 m long branch pipeline in 100 m of water depth:

(1) Attach the armoured cable start-up head to a point on the branch pipeline close to its "wye" connection using a haul-down winch and lay away the cable staying approximately 50 m from the branch pipeline.
(2) Lay sufficient armoured cable on the seabed to allow the start-up head to be released by divers.
(3) Relocate the haul-down winch cable to the PLEM and haul the cable start-up head towards the PLEM, in effect doubling back the cable on itself for approximately 150 m. Release the haul-down wire from the PLEM.
(4) Lock the start-up head into the PLEM and attach the doubled-back length of cable to the side of the branch pipeline using diver installed piggy-back clamps.
(5) Lift the PLEM to the surface, using a lifting line attached to a hard point on the PLEM structure. During this lifting operation the armoured cable would remain attached to the branch pipeline and be fully supported along its 150 m long catenary shape.
(6) Perform the splicing operation between the armoured cable and pipeline fibre-optics and test the connection as necessary.
(7) Lower the PLEM to the seabed and release/recover the lifting line.
(8) Install flexible protection mattresses over the PLEM, branch pipeline and attached cable(s), untrenched regions of the armoured cables, and the "wye" branch connections at the main pipeline.
(9) Continue the cable laying and trenching operation.

Subsequent repair of the cable splice at the PLEM and/or connection of new cables to the branch connection would be performed using similar procedures.

Figure 20:
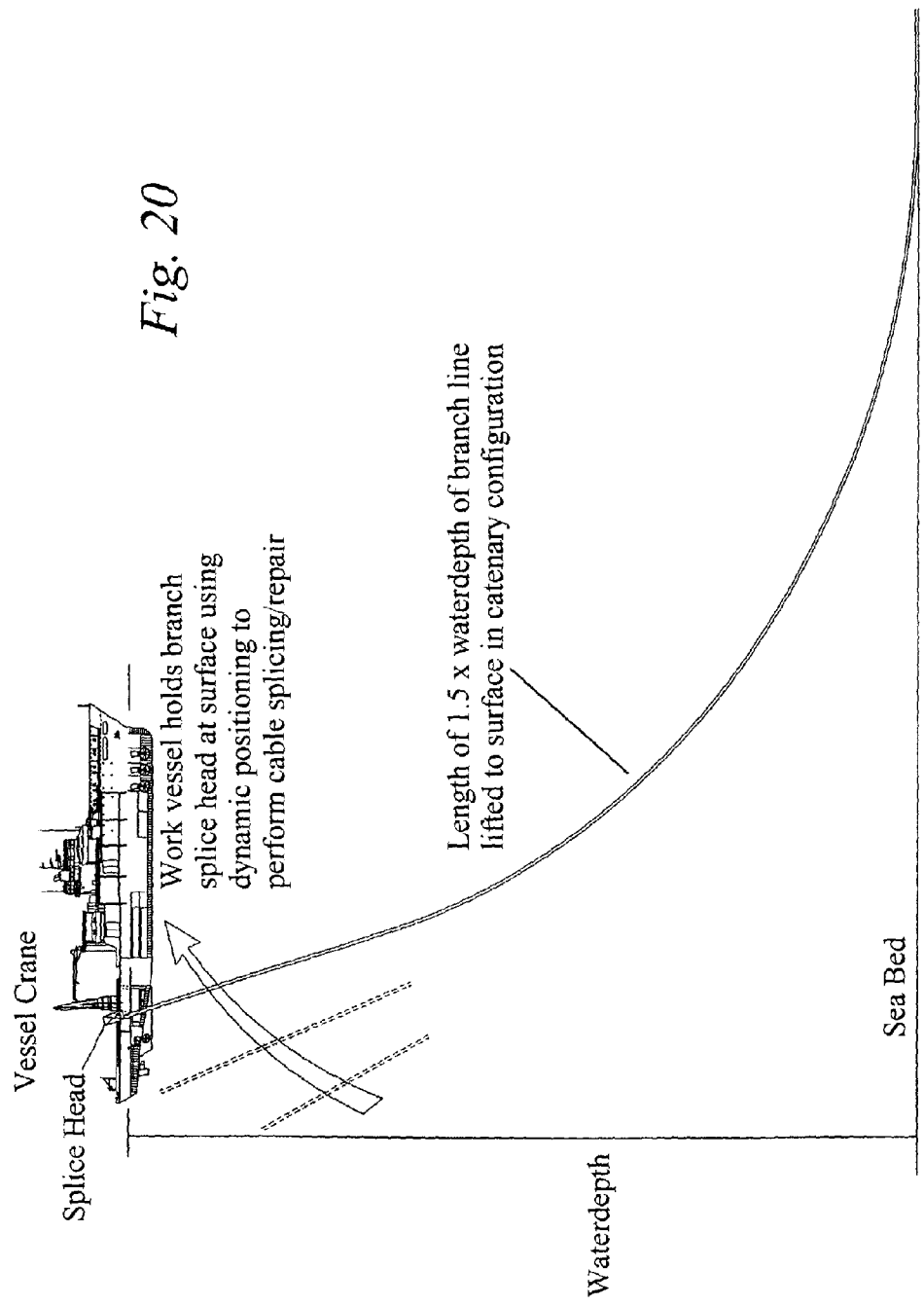
FIG. 20 is a diagram illustrating a typical vessel for use in retrieving a termination point.

A typical lifting vessel employed in these embodiments is illustrated in FIG. 20.

Figure 21:
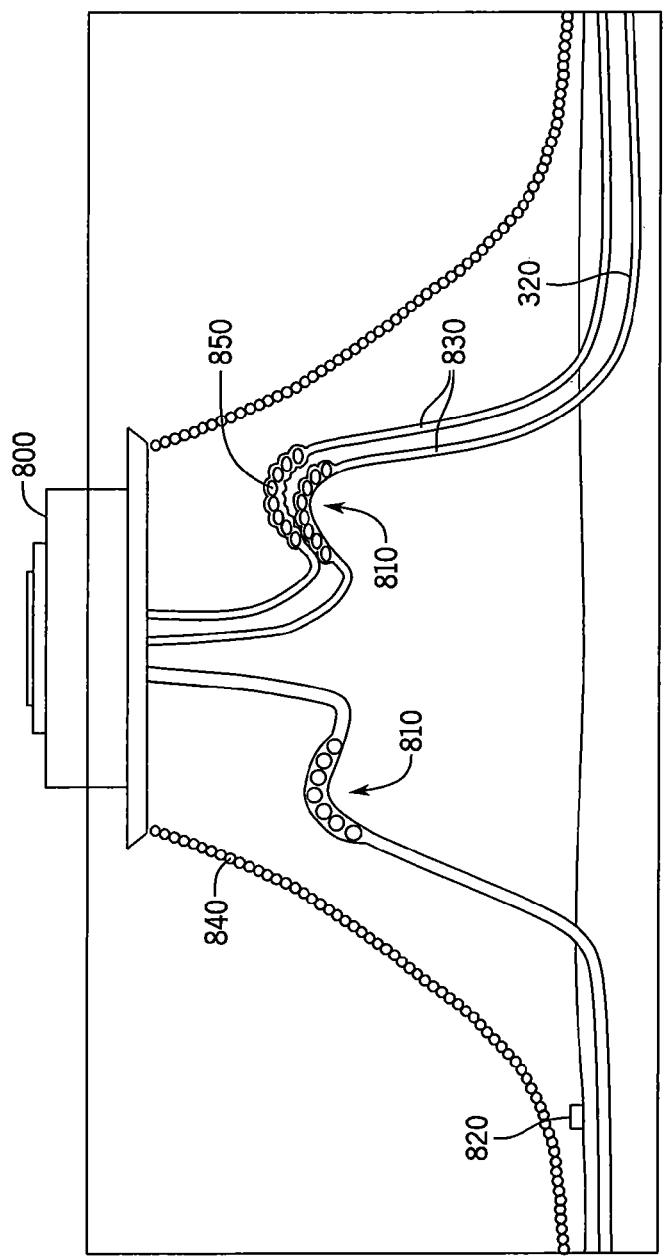
FIG. 21 is a diagram illustrating a termination point according to an embodiment of the invention.

An alternative form of termination point is illustrated in FIG. 21. A Single Buoy Mooring (SBM 800), may be anchored in place with flexible risers 810 with distributed buoyancy 850 between the end of the multiple ducting 820 and the surface buoy 800, with one riser for each conduit. Dynamic armoured cable risers 830, designed for fatigue resistance under wave loading, are pulled-in to the SBM and surface-connected. The buoy 800 would be anchored to the sea bed using cables or chains 840, which also serve as protection for the enclosed cables and risers 320. This type of installation may be significantly cheaper than other types.

Figure 22:
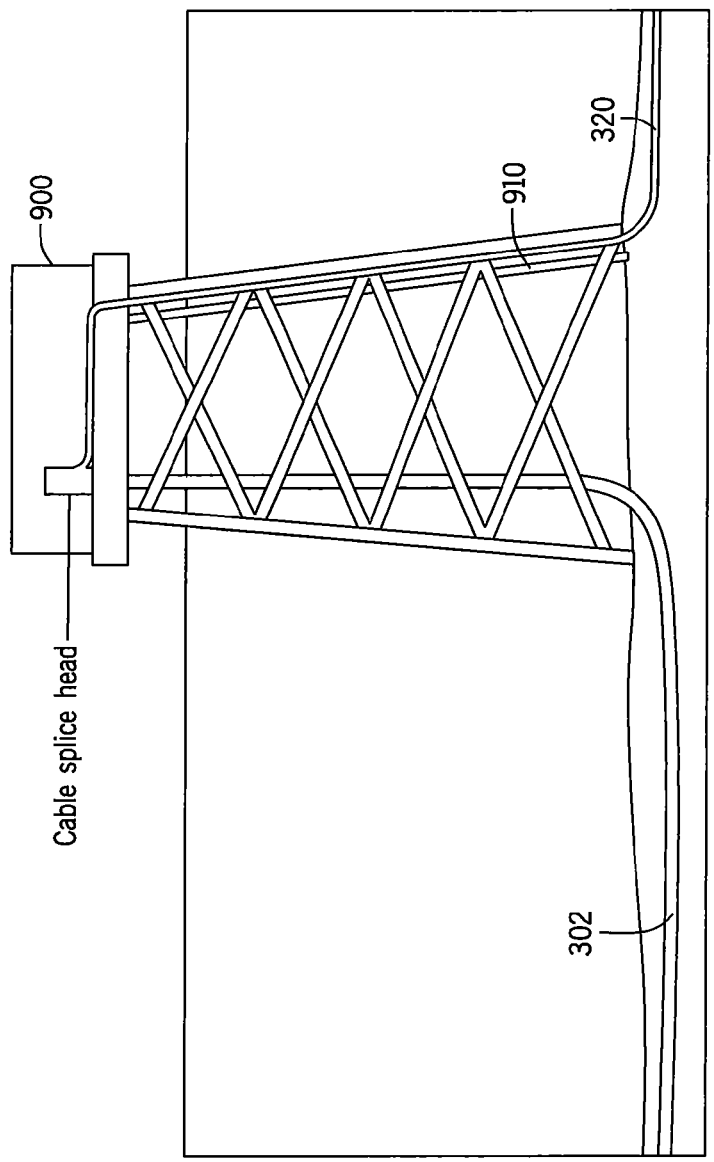
FIG. 22 is a diagram illustrating another termination point according to an embodiment of the invention.

Another alternative would be to have a fixed surface termination point, as shown in FIG. 22. Here, either a temporary or permanent platform 900 could be constructed, or an existing platform could be used. The cables 320 would be connected at the surface, again saving on complication and expense. For a permanent platform, the termination point may include a bundled conduit riser and J-tubes 910 for future pull-in of the armoured cables 320 for surface-connection. J-tubes 910 are commonly used for pull-in of power cables or control umbilicals. These could be retrofitted to an existing oil or gas platform. Retrofit risers are commonly installed offshore, sometimes as pre-fabricated bundles. The latter option would save on the cost of a new facility but capacity for additional risers and deck-space may be an issue, depending on the chosen platform. The conduits and cables could also be installed in empty well space.

For each of these fixed surface options, the conduits and cables may be protected by the structure of the platform itself, and exclusion zones could also be set up around the platform.

In all cases it is preferable to provide protection for the armoured cables from the termination point out to where the cable is fully buried, or to a point far enough away to prevent common failure through external aggression of several cables tied-in to the same termination. This is provided typically by the described concrete mattresses, though other forms of protection are of course possible.

Certain advantageous features of termination points mentioned above are listed below:—

Providing a plurality of branch conduits each having at least two cable directing sub-ducts defined therein facilitates spreading out of cables.

Providing a mating face at the connection point and the branch conduit, the faces having complementary alignment components adapted to guide the sub-ducts of the conduit into connection with the sub-ducts of the multiple ducting may facilitate installation.

Splicing or connecting the cables on board a vessel, facilitated by a recoverable or buoyant termination point may simplify installation.

Providing the surface termination point at a substantially rigid platform secured to the underwater bed permits splicing the cables on board the platform.

Passing the long distance (armoured) cable to the splice point in substantially the same orientation as the duct, and splicing the cables, whereby for a distance comparable to the water depth at the termination point the cables are substantially parallel to each other and preferably securing the long distance cable to the ducted cable for at least a portion of the distance during which the cables are substantially parallel to each other may reduce disturbance to cables when access is required.

Providing multiple connection points at the termination point, the connection points being spaced apart along the length of ducting, preferably at least 100 m apart, more preferably at least 300 m apart, ideally so that the long distance cables are at least 50 m (ideally at least 250 m apart) apart in a region at least 300 m from the ducting can reduce the risk of multiple cable damage.

Protecting termination points with one or more resistant structures greatly increases reliability without inhibiting maintenance (discussed below).

Insertion of Cables into Ducts

The installation of cables into the conduits laid can be undertaken by several methods.

Figure 23:
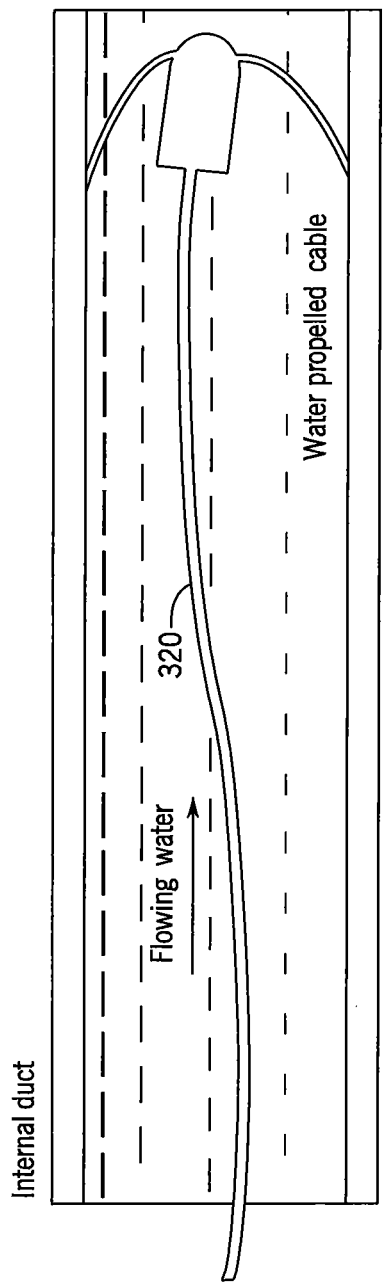
FIG. 23 is a diagram illustrating a method of deployment of a cable inside a duct according to an embodiment of the invention.

FIG. 23 illustrates one of these methods, according to an embodiment. The cable 320 is propelled along the duct by flowing fluid, typically water, rather than simply being pulled through. This may allows it to negotiate curves and imperfections in the duct without getting jammed.

Figure 24:
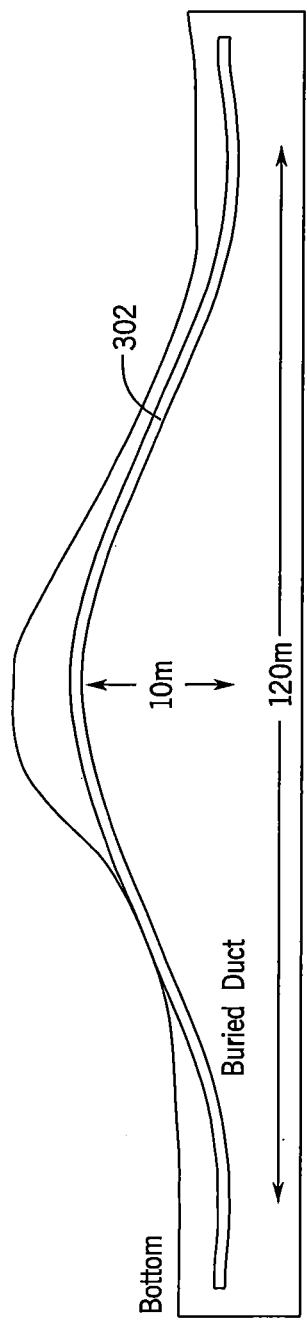
FIG. 24 is a diagram illustrating typical duct curvature in the region of an obstacle.

It is of course possible simply to pull a cable through an existing duct. The problem usually encountered here is that the cable may get jammed inside the duct with no means for freeing it other than cutting the duct open. Pulling methods are essentially dependent on the tensile strength of the cable and the friction of the cable jacket; the effective distance for such a method may be increased by incorporating a reinforcement in the cable, such as a steel wire and by providing a low friction, for example PTFE jacket. Friction is often caused by curves in the duct, due to being laid on uneven ground, but can also be caused simply by excessive friction between the cable and the duct walls. FIG. 24 illustrates the curvature which can arise in ducts 302 laid on the sea floor. Known flow methods may suffer less from excessive wall friction and allow a quicker and more efficient installation by preventing the cable from jamming.

Figure 26:
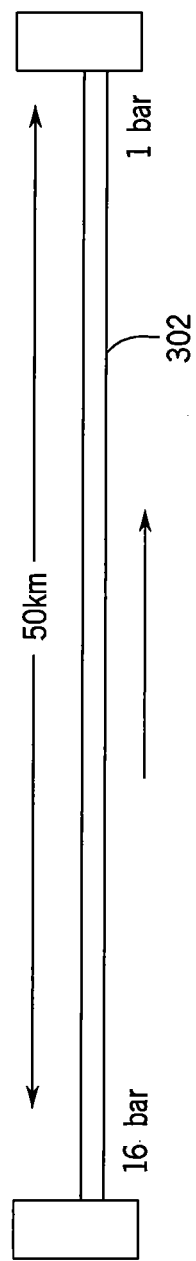
FIG. 26 is a diagram illustrating typical pressures associated with the installation of a cable into a duct according to an embodiment of the invention.

To effectively pass the cable through the duct using a known flow method, a high pressure is applied at the beginning of the duct, and the cable is carried through by the force of the water passing over it. FIG. 26 shows the typical pressures which may be employed using water with known flow methods. In this embodiment, taking typical maximum internal pressure of industrial water pipes to be 10 bar, the diameter of the duct 302 is preferably at least 0.25 m. In other embodiments, the pipes used may be able to withstand greater pressures, allowing a faster jetting of the cable. In further embodiments, the cable is fitted with a head which provides a near seal with the walls of the duct, again allowing greater pressure to build, and pass the cable faster. In an alternative, the cable allows significant volumes of water to pass over it during transit, aiding the flow, and enabling an easier transit.

Flow methods have been successfully used to insert cables into ducts up to about 10 to 20 kilometers in length but longer may be possible with suitable duct sizing and conditions. It becomes much easier to pass the cable with a flow method as the duct internal diameter increases as (1) the area and hence force available for a given pressure drop increases with the square of the duct diameter (2) the cable can be made larger and hence have a greater tensile strength (3) friction between the cable and duct wall may be reduced (3) leakage past the side of the drogue makes a relatively smaller difference to the working area so larger gaps and lower friction can be employed (4) flow losses in the pipe are reduced (this is more significant for high transit speeds). U.S. Pat. No. 4,756,510 discloses a method for installing a cable in a fluid transmission pipeline using a pig; such a method may be adapted to install a cable in the ducts provided by embodiments of the invention. In the limiting case, as the head and duct become large in comparison to the cable diameter and the flow velocity decreases, the flow method becomes effectively a pulling method as the majority of the force is applied by the head and little is applied to the cable jacket.

In general, according to embodiments in which flow methods are employed, the duct is continually treated or flushed with water. This maintains clean conditions inside the duct, and allows for easier replacement of cables. If the duct is not straight, the friction may increase. The friction may also increase if impurities are present in the duct. The duct may be cleaned before introduction of a new cable by passing a cleaning head through the conduit, by similar flow methods. This may employ scraping or brushing action on the duct walls, and may be passed by any of the methods described, though particularly by pulling or by flow methods.

There are other possible methods for cable installation. For example, if the duct is large enough, the cable may be unreeled within the duct. Where it is necessary to pass a cable through an extended length of duct and if problems are encountered, sections of multiple ducting separated by intermediate access points, which may advantageously comprise repeater stations may be provided. Thus, for example to span a 100 km stretch, if the cable and duct properties are such that reliable insertion of the cable up to about 15 km is possible using a conventional flow method, repeater or splicing stations may be provided at, for example, 12.5 km spacing, giving a total of 8 sections and the cable inserted in stages. Whilst provision of such stages may add to cost, it facilitates repair for example in the event of damage to a section and even in the (rare) event of catastrophic damage to a section it may only be necessary to replace a single section between splicing or repeater stations.

Repeater Options

It is possible with existing available technology to transmit signals through fibre up to 50-150 km without undue difficulty without using repeaters. Experimental techniques have transmitted signals much further, and such techniques can be used practically, albeit at a greater cost than with off-the shelf equipment. If the termination point is at the surface within a suitable distance from the shore, for example on an offshore platform, it may be straightforward to have a run from the shore without any repeaters in the multiple ducting. It may even be possible to provide co-location facilities on the offshore platform (or at the termination point), provided a suitable power source is available. For the deep sea crossing, which may be a few thousand kilometers, conventional repeater technology may be used, inserted into lengths of armoured deep water cable which carries power for the repeater.

Figure 25:
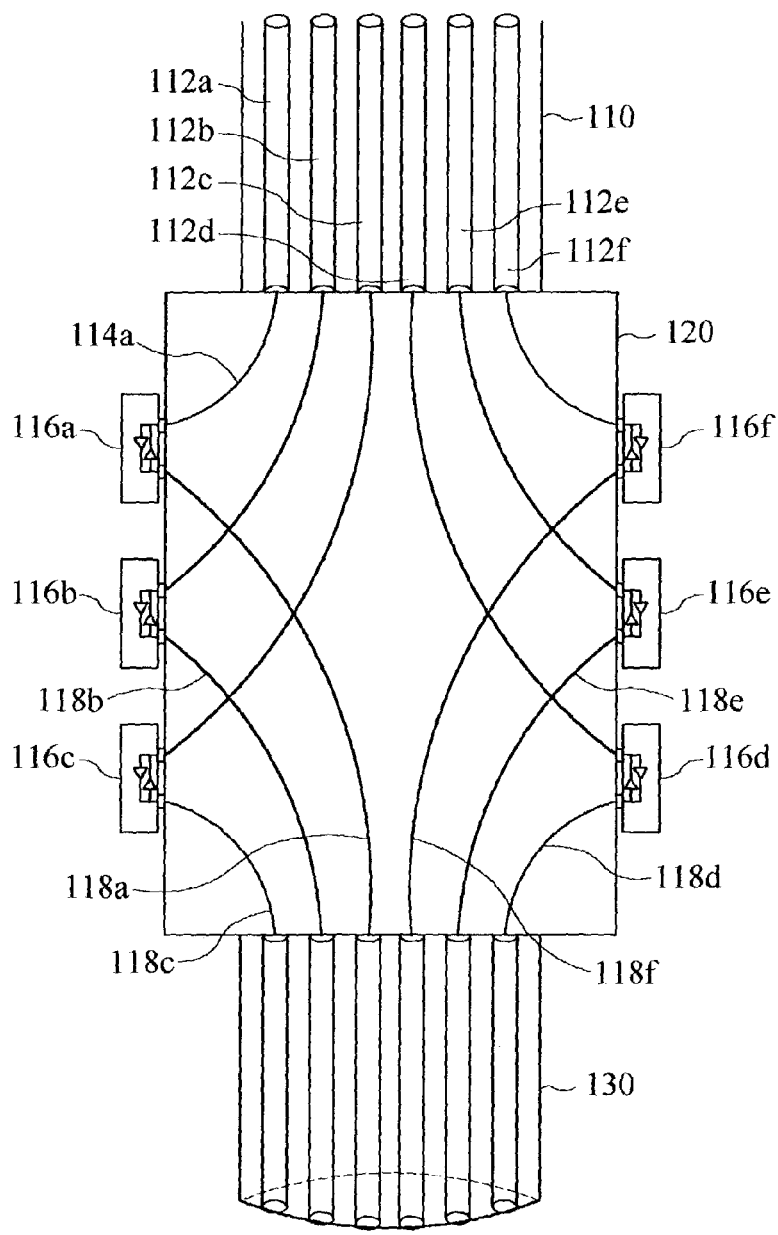
FIG. 25 is a diagram illustrating an upgradeable repeater arrangement.

FIG. 25 shows a first embodiment of an upgradeable repeater. This may be provided independently and used in other applications, including single cable applications. In the embodiment shown, an outer conduit 110 containing multiple (here 6 are shown but more or fewer may be employed) sub-ducts 112a . . . 112f is coupled to one end of a repeater housing 120. Cables 114a . . . 114f (preferably fibre-optic, but similar principles may be employed for co-axial or other electrical cables) are passed through the sub-ducts to connectors (not shown) on the outer wall of the housing 120. Each connector may couple multiple fibres. Not all cables need be present at the same time. Directing ducts (not shown) may be provided within the housing to direct an incoming cable to the connection point on the wall of the housing. Similarly, continuation cables 118a . . . 118f enter from respective sub-ducts in an opposed duct 130. Each set of cables 114a . . 114f and 118a . . . 118f is coupled to a respective repeater 116a . . . 116f mounted on the exterior of the housing by optical connectors and water-tight (at least for sub-sea applications; the embodiment is not so limited) fixings and contains repeater circuitry. The repeater circuitry will normally contain electronics which demodulate, shape, and re-form the signals carried optically and receive power via a water-tight connector (not shown) from the housing 120 which will normally receive power from a power cable contained within the duct 110. Alternatively or in addition, each fibre-optic cable 114a . . . 114f may contain integrated power connections, for example carried in a shielding or reinforcing braid. The repeater may comprise an optical amplifier or optical circuitry which boosts the signal without converting it to electronic signals. In place of connectors, the cables may be directly spliced onto the repeaters; this may be suitable for single deployment but may complicate or prevent replacement of repeaters. An advantageous feature, which may be provided independently, is the facility to upgrade repeaters, for example to increase bandwidth or signal quality or reduce power requirements as improved repeaters become commercially available.

The embodiment of FIG. 25, which will typically be relatively small and may be arranged for the repeaters to be installed or replaced by a diver or a remote operated vehicle (ROV) and in the case of splicing rather than using connectors, hyperbaric splicing equipment may be provided (in a sub-sea application). The apparatus may be arranged so that the repeaters can be accessed, added or replaced underwater or may be arranged to be recovered to the surface for the installation of new cables or the replacement or addition of a repeater. Where conduits with push-fit connectors are employed, for example as described with reference to FIG. 11, the repeater housing may push-fit onto such a conduit.

Figure 27:
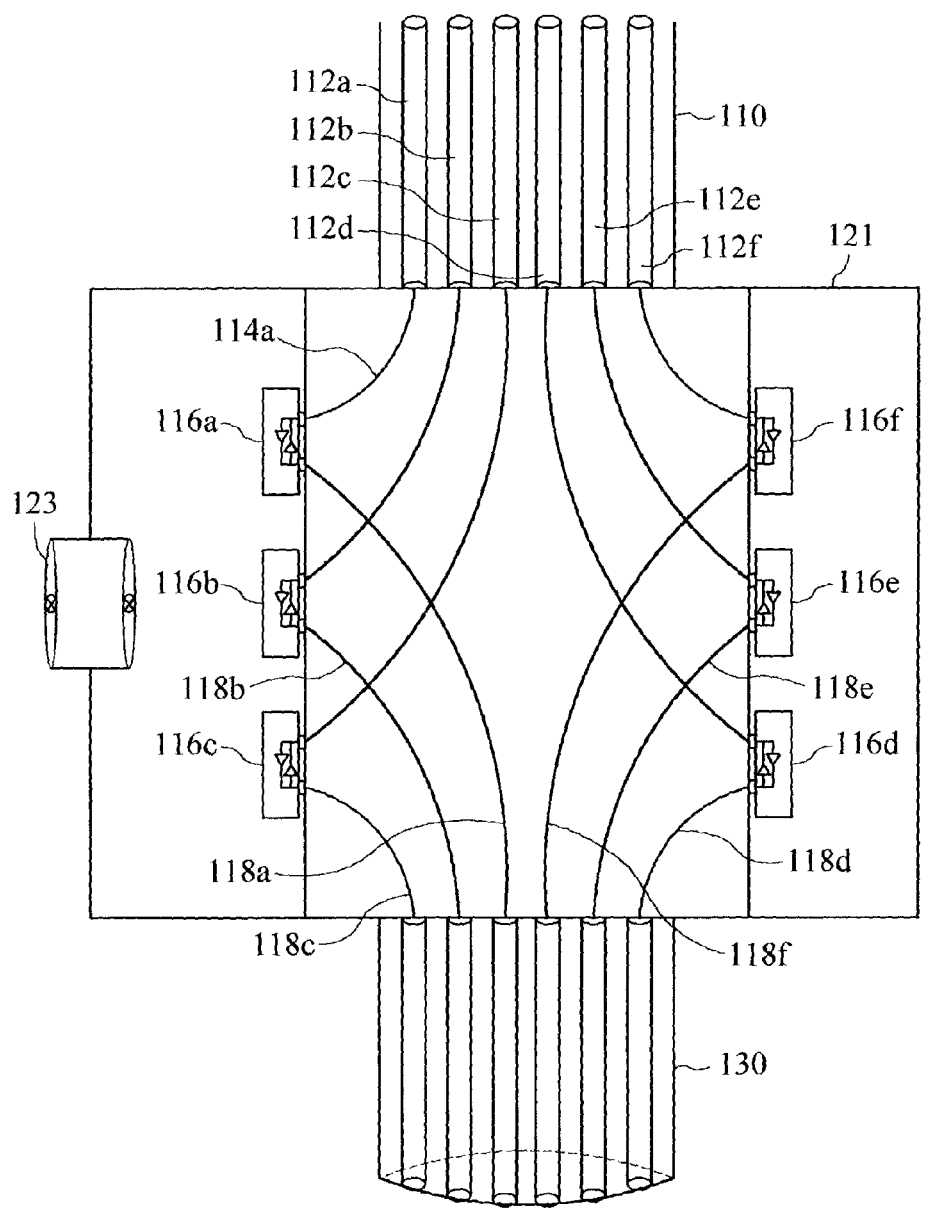
FIG. 27 is a diagram illustrating a further upgradeable repeater arrangement.

As an alternative, the repeaters may be installed in a sealed chamber. FIG. 27 depicts schematically and not to scale such an arrangement in which a sealed chamber 121 large enough for work to be performed within it and having an access airlock 123 is provided and the ducts 110, 130 coupled to the walls of the chamber. The chamber may be similar in construction to the PLEM of FIG. 13.

Chain-Pipe Embodiment

This embodiment, to be described with reference to FIGS. 51-53, may provide the following advantages in deployment of a long distance protected conduit fibre-optic system:— to allow uninterrupted offshore installation of an unlimited length of a bundle comprising: empty conduits, fibre-optic cables and associated power cables within a protective steel pipe envelope.

to allow for installation from any suitable vessel of opportunity in any water depth.

to allow for future extension or connections for expansion of the bundle system.

Offshore Termination of Chain-Pipe

The embodiment provides for offshore termination of the conduit/fibre-optics and transitions or connections to traditional armoured cable by:

simple exiting and tie-in of individual fibre-optic cables which can either be preinstalled during the laying operation or post-installed using future flowing/pigging techniques.

the ability to be configured for distance-separated, or "daisy-chained" tie-in connections to deep water trans-ocean armoured cables, fanned-out connections to the trans-ocean armoured cables at a single offshore location, including an fixed offshore surface, or subsea structure.

Features of Chain-Pipe

All of the features to be described may be provided independently of other features unless otherwise stated. The key feature of the chain-pipe embodiment is to split the protective outer steel pipe envelope into discrete half shell units and install these over the internal conduit/cable bundle during the offshore lay operation. Although half shells are most convenient, it will be appreciated that the halves need not be exactly evenly sized nor symmetrical (and the shells may comprise complementary mating "halves"). More than two partial shells, for example three or even more may be used. However, two is preferable and use of larger numbers of partial shells, whilst reducing the size of the individual components and thereby offering some advantage, is likely to complicate installation significantly. When two shells are used, it is preferable that these are at least similarly sized so that each "half" has an opening at least about 90% of the internal diameter or subtends an angle in the range about 120 degrees to 240 degrees, preferably 150-210 degrees (or equivalent if the shells are not circular—polygonal (e.g. hexagonal) or irregular shapes are possible). Outside these limits installation will be hampered by the larger "half" having an unduly small opening to accommodate a bundle. The shells are preferably shipped as individual pieces to the offshore lay vessel and subsequently assembled in a continuous lay operation which may be performed relatively rapidly.

The half shell design preferably incorporates pin-jointed hinges 610 alternating by 90° at each joint between lengths of chain-pipe. These hinges inhibit bending moments developing during the laying process. The pin connections 620 effectively introduce continuous articulated "universal joints" along the length of pipe, with sufficient flexibility to allow the assembly to follow (approximately) the shape of a natural catenary by small angular displacements at each hinge.

The shells may be assembled using a hydraulically operated handling cradle. Clamping of the half shells together may be performed using a metallic banding system, which will typically be hydraulically tensioned. Alternatively, the shells may be clamped using bolting. In certain cases, the shells may be welded; however that may introduce complications protecting the contents of the shells and also complicates repair.

In the embodiment shown, each half shell unit is identical and is fabricated from the following parts:

A length of tubular half shell 630. The length of this may be selected as appropriate for the handling equipment and factors such as water depth, buoyancy from the internal conduits, lay tension, may be taken into account but is preferably at least 3 m and preferably no more than 25 m, typically in the range 5 m to 15 m. About 6 m or 12 m are convenient sizes for fabrication, handling and deployment in most conditions. At one end of the shell a hole 640 for a locating pin, to be described, is cut. This hole is ideally located half-way around the semi-circular section of the shell, and set back sufficiently to provide adequate pull-out strength when assembled with the following shells. At the opposite end is:

An internal split sleeve connector 610. This is rolled to an external diameter which is about 10-12 mm less than that of the internal diameter of the half shells. An alternative configuration is also possible, with the internal diameter of the external sleeve about 10-12 mm larger than the outside diameter of the half shells. The connector is profiled to have an extension tab, here semi-circular but other appropriate shapes may be used, and matching recess 612. These engage with the opposite half shell sleeve connector. In the extension tab is a hole with a protruding pin 620 welded into it. When assembled with the opposite shell the two pins align to form an articulating axle, or hinge. The connector is bonded, preferably welded to the half shell preferably using continuous fillet welds.

Internal alignment split sleeves 640. These are spaced along the length of the half shells to provide longitudinal and transverse shearing resistance to the assembled pipe shells and maintain a circular cross-section. The number and location of these will depend on the length, thickness, material and deployment conditions of the pipe. The embodiment shown has three, one of which is near the "open" joining end and the others of which are spaced approximately evenly between this and the end split sleeve connector. It will be appreciated that any problems with integrity of the assembly can be alleviated by including more of these connectors, but at a cost. Again, the alignment sleeves are profiled to have semi-circular extension tabs 622 and matching recesses 624 (or other appropriate shape). These engage with the opposite half shell alignment sleeves. The alignment sleeves are bonded, preferably welded to the half shell, preferably using discontinuous fillet welds.

The assembled shell pairs are held together using a clamping system. This is either in the form of a hydraulically tensioned metallic banding system or by bolting. The bolting may be recessed through the half shells and into the internal tabs of the alignment sleeves.

The duct should be suitable to protect the cables from sub-sea aggression, for example to provide a degree of protection from loose rocks, dragging anchor chains, marine life and the like. However it is not expected that the duct will provide complete protection and is unlikely to be sufficiently robust to withstand a direct impact from a ship's anchor. The duct shells may be arranged to form a substantially watertight seal but normally a degree of water flow will be permitted through the joins, particularly where the duct is hinged between shells. Normally the duct shells will be formed from steel, preferably having a thickness of at least about 2 mm, more preferably at least about 5 mm, sometimes at least about 10 mm.

Installation Method for Chain-Pipe

The preferred method for offshore installation of the chain-pipe bundle is as follows:

1. All internal materials (conduits, fibre-optic and power cables) are shipped to the lay vessel in predetermined coiled lengths on carousels and readied for un-spooling and assembling into a bundle. Preinstalled fibre-optic cables can be shipped separately and fed into designated conduits having continuous longitudinal splits prior to assembly with the remaining empty conduits. Alternatively pre-assembled, protected, fibre-optic cables can be installed into the bundle individually. Power cables can be assembled and strapped together before assembly with the conduits or alternatively run individually, as required.
2. The assembled conduit bundle is then fed over an assembly cradle bed where the half shells are readied.
3. The half shell pairs are alternately split horizontally and vertically. For a horizontally split pair the lower shell is placed on a mobile cradle located adjacent to the conduit bundle and the shell slid sideways and underneath the conduit bundle. The shell is then lifted up so that its pinhole locates onto the lower pin of the preceding shell pair. The upper shell is lowered over the conduit bundle to seat onto the lower shell, engaging its pinhole over the upper pin of the preceding shell pair. During seating of the upper shell alignment aids are made to engage and align the two half shells together to form a circular cross-section.
4. The clamping system is then installed. This can be either a tensioned band system or hand (or machine) installed bolting.
5. The completed shell pair is paid out so that the next section of exposed conduit bundle comes over the cradle bed. The next shell pair will be split vertically. Both side shells are placed onto the mobile cradles. The cradles are then rotated through 90° and then slid sideways towards the conduit bundle. Both shells are manoeuvred so that their pinholes locate onto the horizontally orientated pins of the preceding shell pair.
6. Again the Clamping System is then Installed.

Alternative assembly methods are equally feasible including assembling four (or more) adjacent shells in one production step. Assembling two (or larger even number) adjacent pairs including both horizontally and vertically split shells has the advantage that the shells are aligned the same way each time—that is one assembly station will always receive horizontally split shells and the other will always receive vertically split shells.

The chain pipe half shells (or other portions) may be modified to provide branches at the termination point. For example, a half shell may have an opening through which one or more sub conduits may pass and onto which a riser duct may be attached. The riser duct may be relatively more flexible than the chain pipe. The opening may be angled to form a branch for example in an analogous manner to FIG. 19. The invention extends to a duct half shell (or component) including an opening through which a conduit can pass to a branch duct or riser. Alternatively, branches may be inserted at joins between pairs of half shells, although this may compromise integrity of the join. A branch coupling may be provided at such joins.

Burial of Cables

As explained previously, cables buried on the ocean floor and in shallower areas are susceptible to damage, which can disrupt communications networks and introduce large repair expenses. However, the exact problems associated with the damage caused have remained largely unknown. Investigations pursuant to the invention have found that there are a number of different types of hazard which predominantly occur at different water depths. In contrast to the usual strategy of burying at an economically viable depth along the route, typically about 2 feet, it is considered preferable to employ a variable burial depth.

Figure 28:
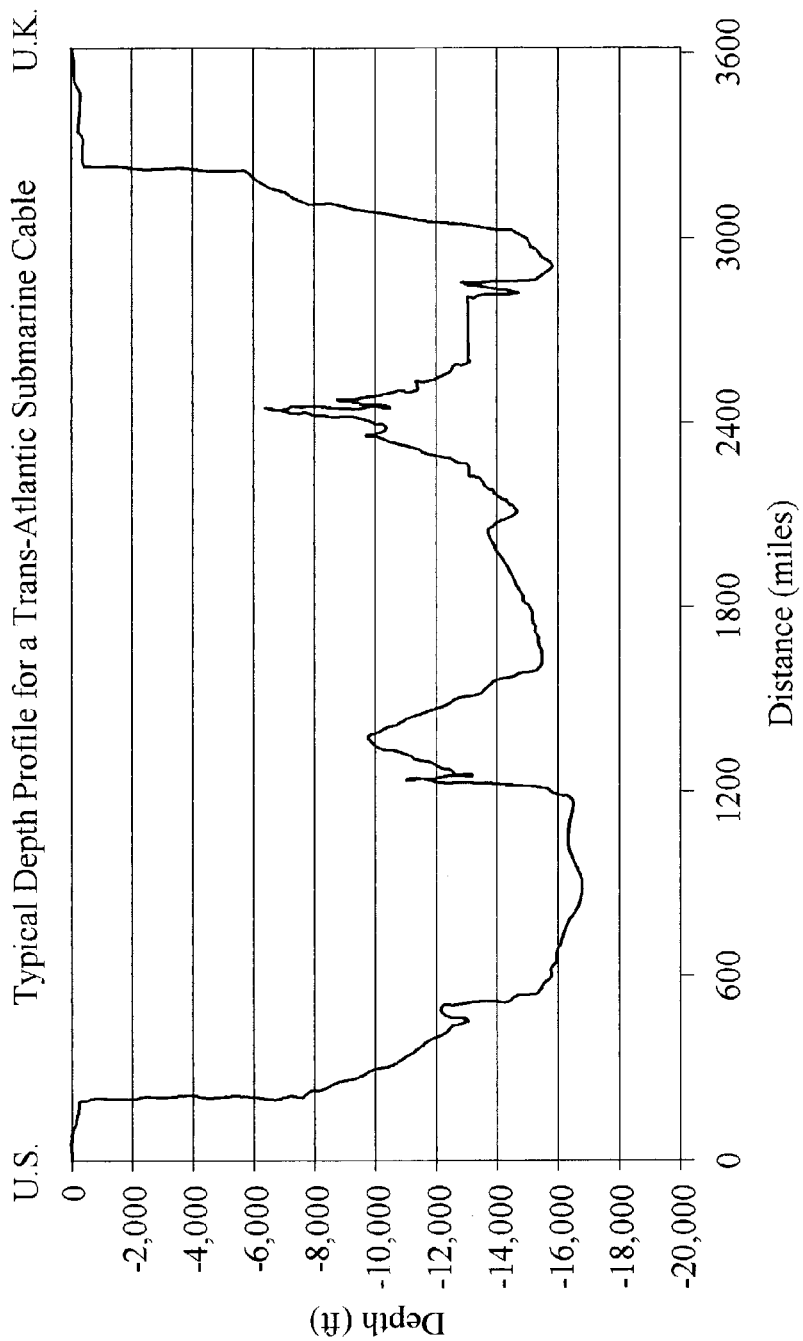
FIG. 28 is a graph illustrating a typical depth profile which would be encountered by a transatlantic cable.
Figure 29:
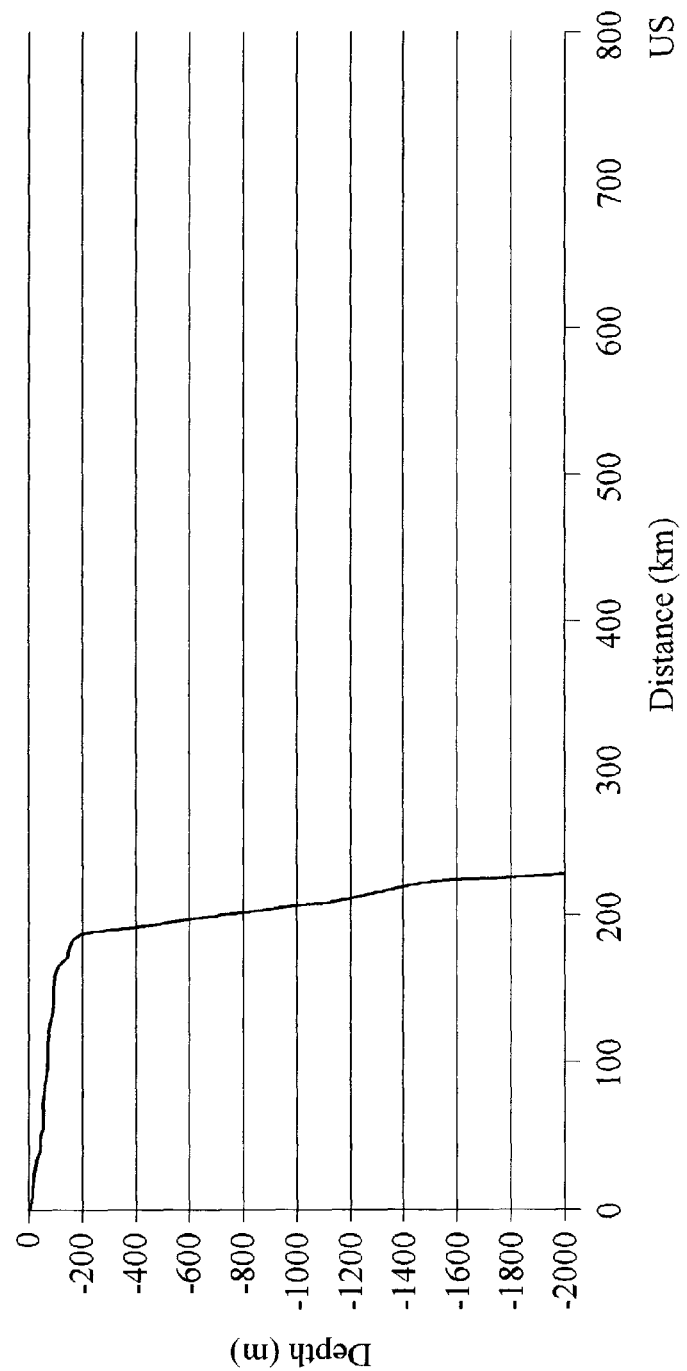
FIG. 29 is a graph illustrating a typical depth profile of the US continental shelf.
Figure 30:
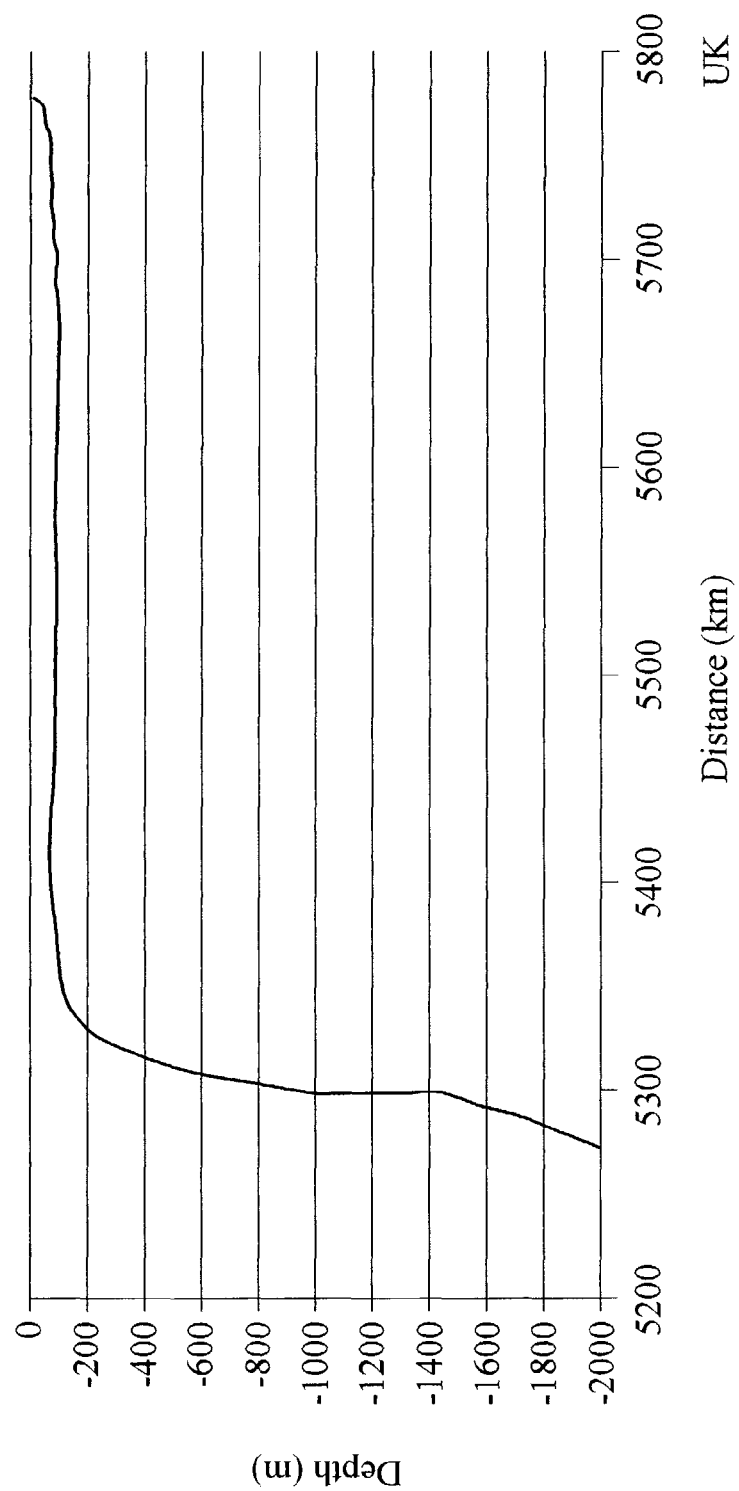
FIG. 30 is a graph illustrating a typical depth profile of the UK continental shelf.
Figure 31:
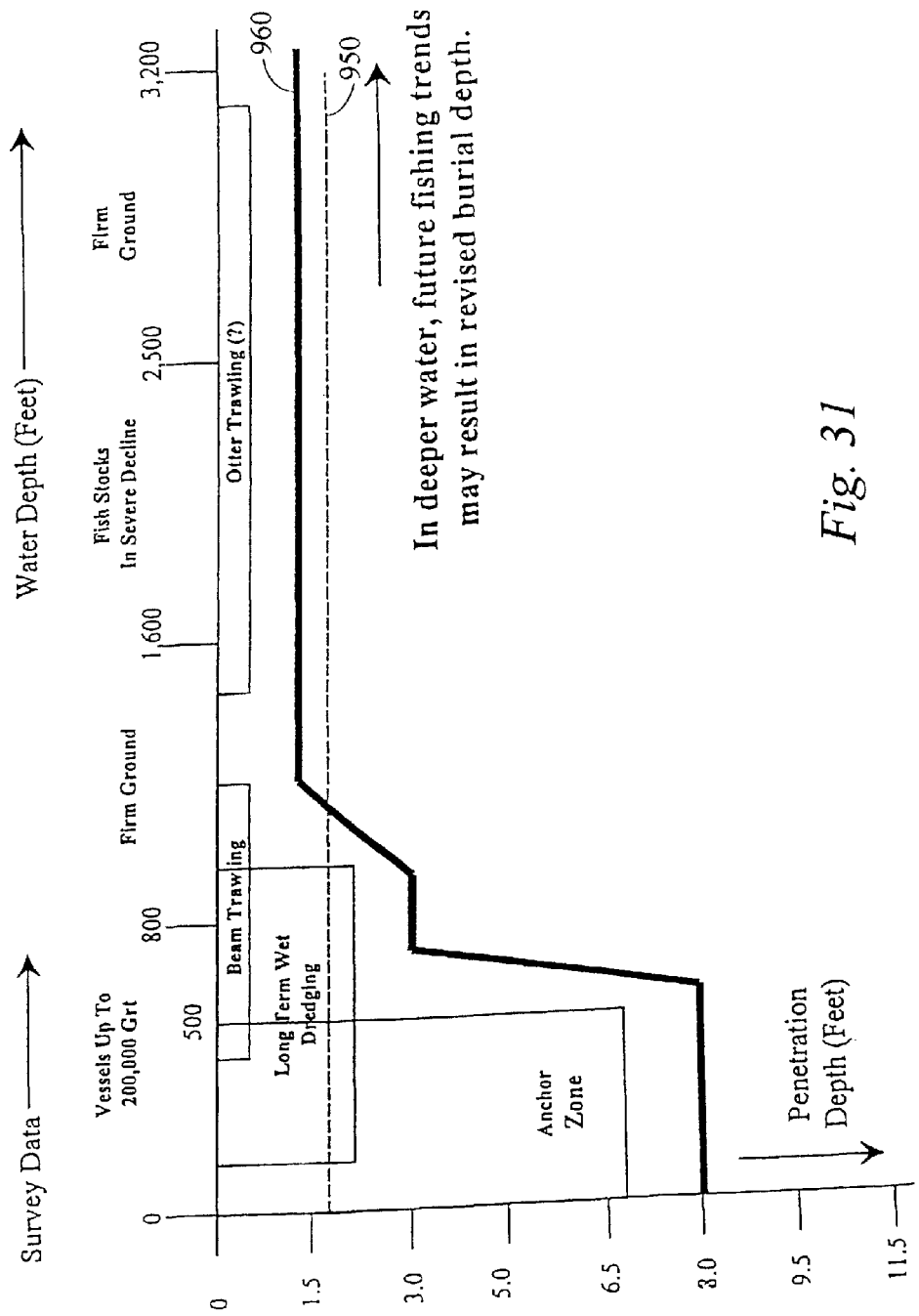
FIG. 31 is a diagram illustrating the typical depths of penetration of various shipping activities, along with the usual burial depth of cables, and the burial depth according to an embodiment of the invention.
Figure 32:
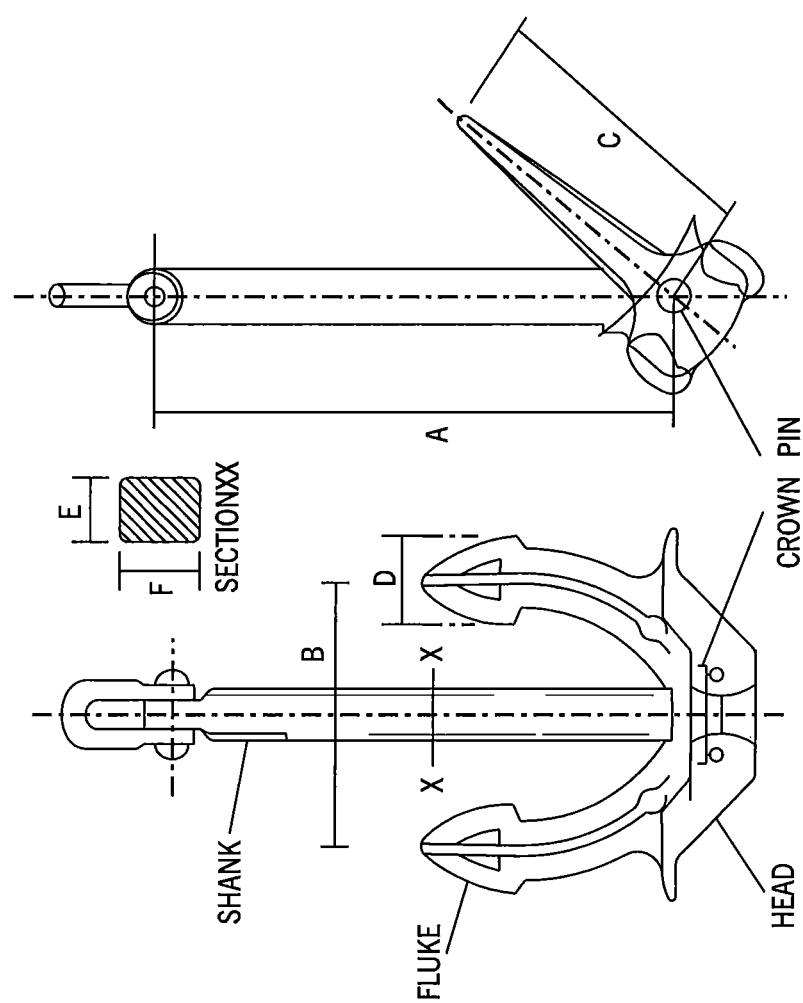
FIG. 32 is a diagram illustrating a typical stockless type anchor.
Figure 33:
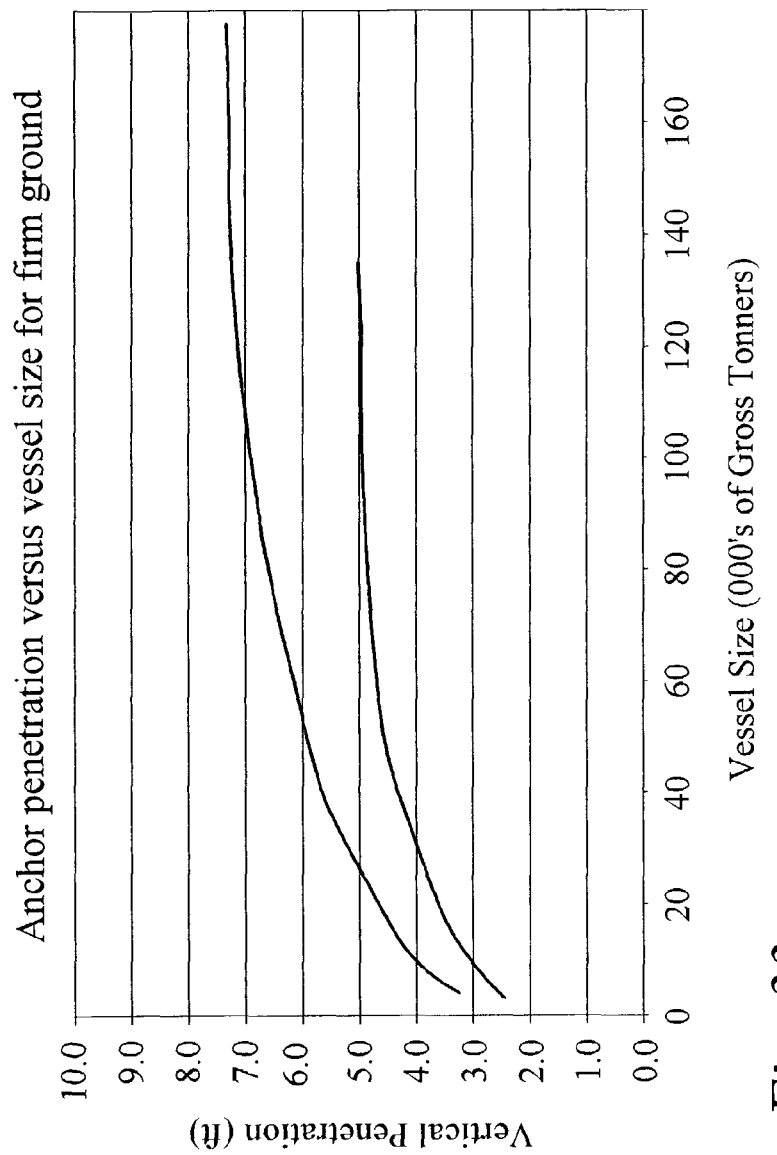
FIG. 33 is a graph illustrating typical anchor penetration for various vessel sizes.

FIG. 28 illustrates the typical depth of the sea bed for a transatlantic submarine cable. FIGS. 29 and 30 illustrate typical depth profiles in the region of the US and UK continental shelves respectively. FIG. 31 illustrates the typical depths of penetration of various shipping activities, along with the usual burial depths 950, and the burial depth according to an embodiment of the invention 960. Previous installations have tended to choose a constant burial depth of approximately two feet below the ocean floor. However, as can be seen from FIGS. 28 to 31, this is usually inappropriate. In shallow waters such as those on the continental shelves, it is insufficient to avoid anchor damage, which is the most significant factor in submarine cable faults. FIG. 32 illustrates the stockless type anchor employed by most modern vessels. This type of anchor has greater sea-bed penetration characteristics than other types, as can be seen from FIG. 33, a graph illustrating anchor penetration relative to vessel size. Cables which are buried at the usual depths are often unearthed eventually by tidal and storm waters, and when exposed, the cables can be cut despite the traditional armour plating employed.

Damage is usually caused by shipping, for example, by dredging, trawler fishing, and, most commonly, ships' anchors. The subsequent losses of transmission can cause major disruption in communications networks which rely on the cables, and repairs are usually highly expensive and time-consuming. For these reasons, sub-sea cables are usually armour plated, and are also buried in shallow waters. The present invention prevents damage to the cable from the various hazards at the various different depths and sea areas, thus allowing a more reliable cable network.

The traditional burial depth chosen, as shown in FIG. 31, is also excessive in the much deeper waters between the continental shelves, where fishing activity penetrates to a much more shallow extent. The arrangement in FIG. 31 according to an embodiment of the invention allows for the different penetration depths of different hazards, burying the conduit or cable on a variable depth trajectory, as shown. This is sufficient to avoid damage in shallow waters, where cables are particularly susceptible to anchor damage, as described. This trajectory also only requires relatively shallow burial in deeper waters, saving time and expense in the trenching process. Other hazards, such as dredging, which take place on the continental shelf but which penetrate the ocean floor to a lesser extent, are also avoided by this arrangement. In one embodiment, the armour on the cables or conduits buried on the continental shelf is increased, so as to prevent damage should they be unearthed by, for example, freak storm waters.

As may be seen from FIG. 31, it is preferred that conduits or cables are buried to a depth of about 8 feet (typically at least about 2 m, preferably about 2.5 m, usually between 2-3 m), in an anchor zone (typically in water up to a depth of about 500 ft or in water up to a depth of at least about 100 m, typically up to about 150 m water depth) and to a shallower depth in water outside the anchor zone. The depth is preferably about 3 feet (at least about ¾ m, typically about 1m, usually between ¾ and 1.5 m or 2 m) in a dredging zone (but outside the anchor zone), usually up to a water depth of about 1000 feet (typically in the region from the anchor zone to about 400 m or 500 m). Outside the anchor zone, and preferably outside the dredging zone, the burial depth may be much less, for example about 1 to 2 feet or about 1.5 feet in deep water. More particularly, the burial depth may be, for example, less than 2 m where the water depth is about 300 m or more, typically less than 1 m where the water depth is about 400 m or more, often about 0.5 m where the depth is 400 m or 500 m or more.

The burial for the embodiments employing the variable depth trajectory is implemented in the various ways outlined previously. In other embodiments, where trenching is used, the trench digging is supplemented by a second vessel which draws a tool to fill in the trench. This is implemented in one embodiment by a second plough, which simply churns the soil which was removed back into the trench.

Figure 34:
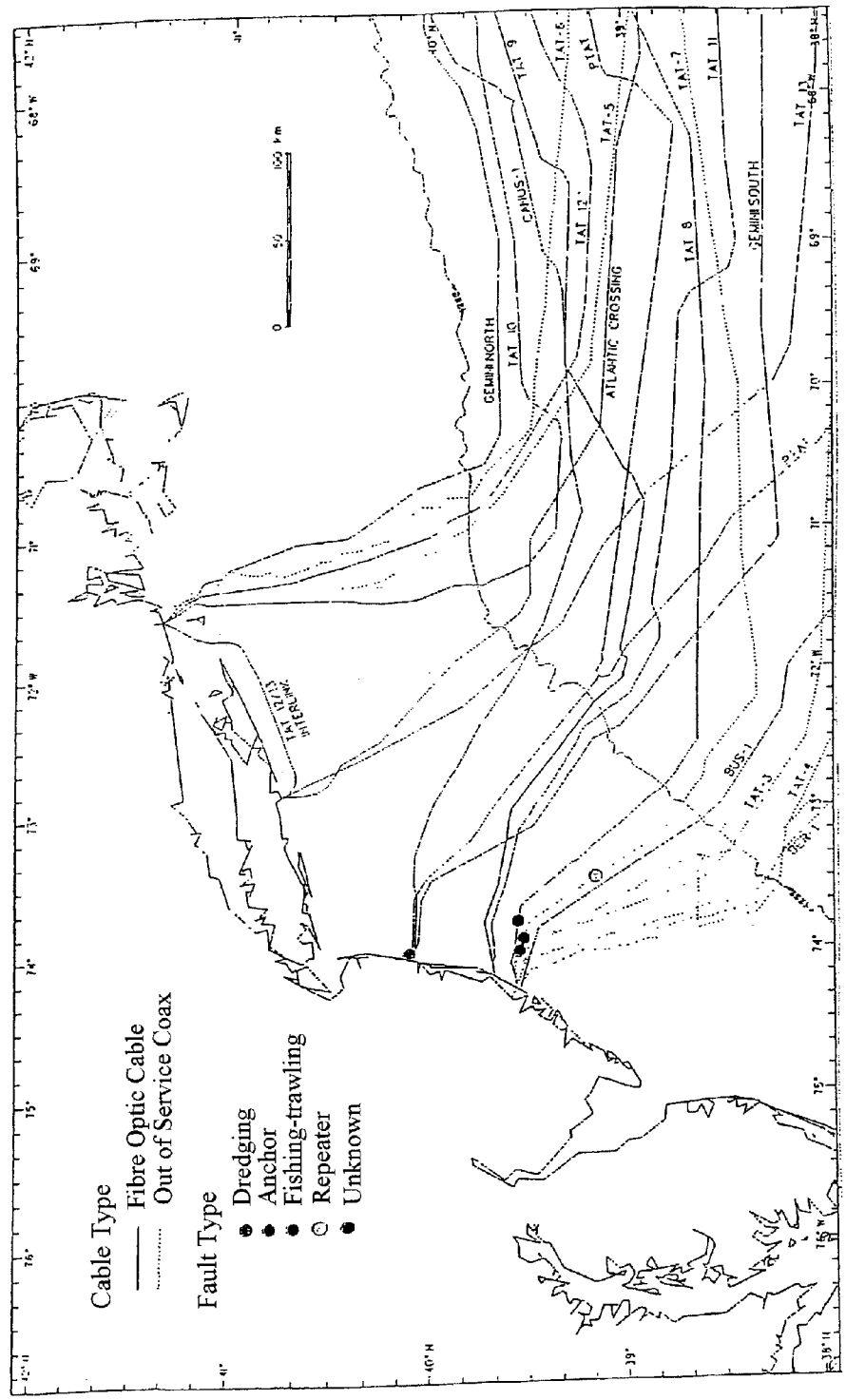
FIG. 34 is a diagram illustrating recent fault locations of existing sub-sea cables.
Figure 36:
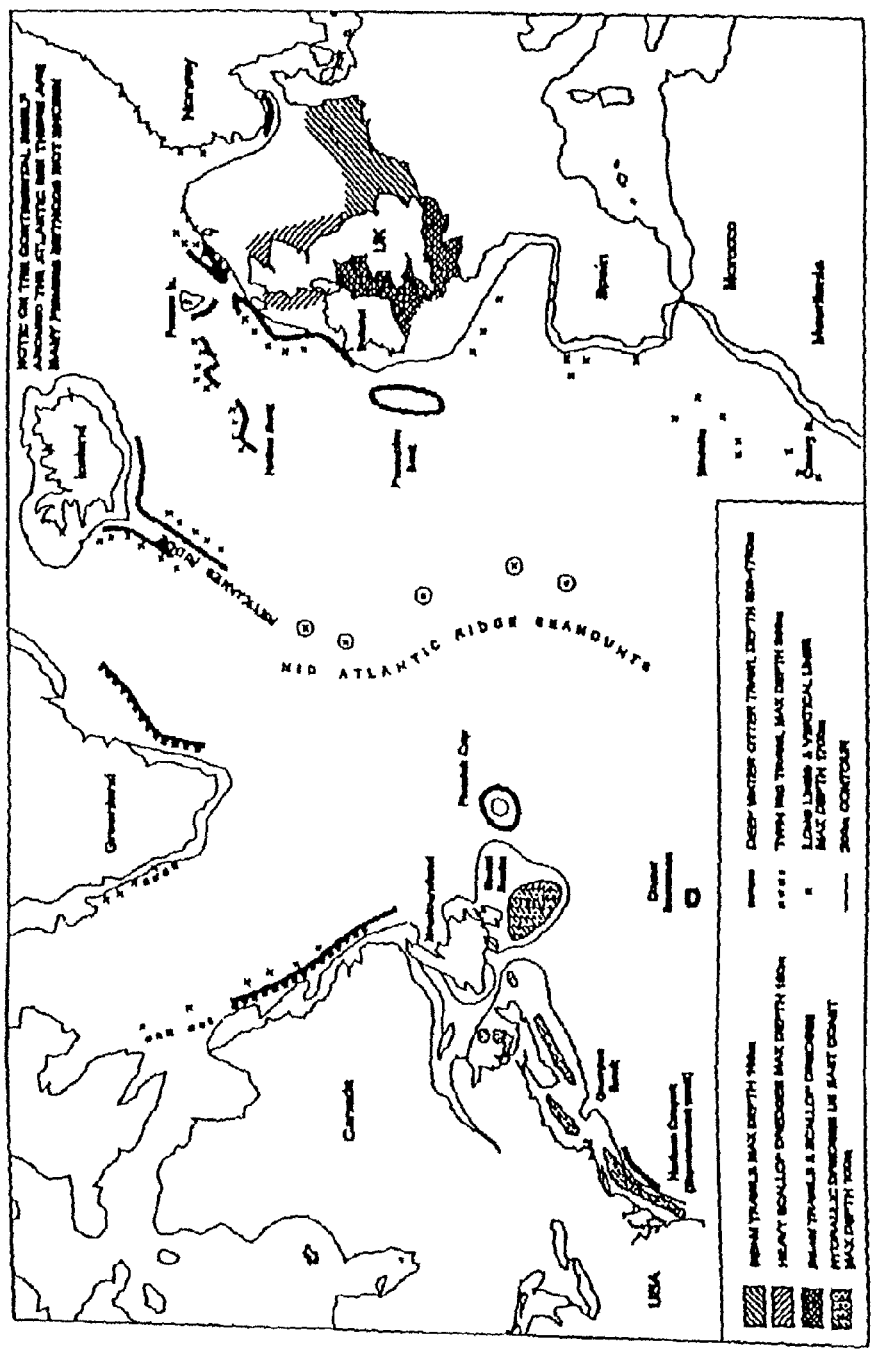
FIG. 36 is a diagram illustrating the different types of fault typically encountered by transatlantic cables.

As mentioned earlier, there are a number of alternatives available according to the invention when locating the splice box and other components of the system of FIG. 2 on the continental shelf. A deciding factor for how far along the shelf to lay the conduits is the depth of water at the burial point. In particular, it is unlikely that cables laid on the continental shelf at depths greater than around 200 feet will be cut, according to current cable fault records (see FIGS. 34, 35, and 36). This may also dictate the plotting of the variable burial depth trajectory shown in one arrangement in FIG. 31.

Repair Techniques

There are various potential sources of damage or external aggression for a pipeline including corrosion or material defect, dropped objects, fishing activities, shipping and scour.

Corrosion or Material Defect

Damage due to corrosion or material defect could occur in operation causing loss of integrity to the pipeline, resulting in a leak or mechanical weakness. Normally this type of damage would be prevented by quality control of materials, installation and operational maintenance. Nevertheless shortcomings in these areas could lead to corrosion due to sea water seepage, loss of integrity, and the compromising of installation activities, such as passing pigs through the pipeline. This type of damage may be repaired by fitting clamps to seal leaks, and by providing structural reinforcement where required.

Dropped Objects

Dropped objects could cause impact damage such as dents or crushing of a pipeline. Dropped objects are normally associated with locations near to existing offshore platforms. Although there is potential for objects to be dropped in open water, from any passing vessel, exposure to dropped objects is principally limited to vessels in transit in the vicinity of the pipeline. As heavy loads are not handled in transit it is highly unlikely for this type of incident to occur. Storm conditions may lead to vessel sinking or loss of cargo that could drop onto a pipeline. While this type of event has occurred in the past, the probability of such an occurrence is incredibly small, and thus could not be predicted with any degree of accuracy.

Fishing Activities

The main hazards from fishing activities are from direct impact by trawling gear or snagging of nets and associated equipment. Fishing activity takes place principally in the near-shore regions, out of the shipping lanes. Trenching of the pipeline(s) may provide a high degree of protection from fishing activities. For pipelines trenched in sand, natural backfill is anticipated, and for pipelines trenched in clay the trench would generally be steep sided. Trenching may thus provide an efficient form of protection for the pipeline(s).

Shipping Activities

The main concern with shipping is the possibility of anchors being dropped or dragged across the pipeline. For example, The Channel has two busy shipping lanes passing across possible pipeline(s) routes. Unplanned or accidental incidents with anchors cannot be ruled out. It is impractical to protect a pipeline from direct impact of a dropped ships' anchor, in view of the high degree of seabed penetration that can occur and the relative infrequency of such an event. Trenching has been shown to provide reasonable protection from dragging anchors and chains, though there are shortcomings, which are examined in more detail is later sections. However, trenching to at least 0.5 m below seabed should provide reasonable protection from dragging anchors and chains.

Scour

Intermittent exposure and re-burial of the subsea pipeline(s) is possible in sections where there is loosely compacted sand back-fill. However in certain areas fast flowing water entail that deep, loose soil deposits are unlikely. A programme for monitoring the pipeline through regular inspections during the operational life may allow identification and remedial action in exposed areas, should they occur, prior to any adverse consequences, such as fishing equipment impact. For sections where the soils are predominantly clay, scour is not expected to occur.

Such hazards may cause various types of damage which would typically be repaired in different ways. Medium sized dents in pipes may compromise pigging and therefore the installation of further cables, for example, unless the pig can be modified. With more major dents, cables may be crushed. Dents may be repaired by pulling them out, or in severe cases or even ruptures of the pipe, by cutting out the dent or rupture, repairing the cables if need be, and fitting a repair clamp. Snagging of the pipe can cause buckling, which impairs pigging and damages cables. For severe cases, the pipe would be cut back to either side of the buckle, the cables repaired, and a protective casing for the exposed cables fitted.

SUMMARY

The following table summarises possible types of damage and repair. The problems mentioned below are particularly concerned with deployment of a cable using a pig, for example based on the technique disclosed in U.S. Pat. No. 4,756,510 but apply similarly in the case of other cable deployment methods as obstructions will affect most methods similarly.

| Type of damage | Classification | Implication | Repair |
| --- | --- | --- | --- |
| Corrosion or materials failure | Loss of pressure containment | Compromise pigging. Ingress of untreated seawater, causing internal corrosion | Fit clamp to seal leak and possibly provide structural reinforcement |
| Minor Dent | <5% of diameter | None | None |
| Medium Dent | Approximately 10% diameter | Unable to pig line, Ability to install additional cables may be compromised | May not be necessary if pig can be modified. If required treat as major dent |
| Major Dent | Dent larger than annulus around cables | Damage to some cables due to crushing | Pull-out dent or cut-out dent, repair cables and fit repair clamp |
| Minor Rupture | Loss of pressure containment | Compromise pigging. Ingress of untreated seawater, causing internal corrosion | Fit clamp or strap to seal leak |
| Major Rupture | Loss of pressure containment and impact on cables | Ingress of untreated seawater and damage to cables | Cut-out damaged pipe, repair cables and fit repair clamp |
| Minor Snagging | Buckle in pipe | Unable to pig line, Ability to install additional cables may be compromised | May not be necessary if pig can be modified for the diameter reduction. Alternatively treat as major snagging |
| Major Snagging | Buckle in pipe and cables | Damage to most of cables | Cut back pipe to each side of repair, repair cables and fit a replacement section or special protection for cables |

Figure 37:
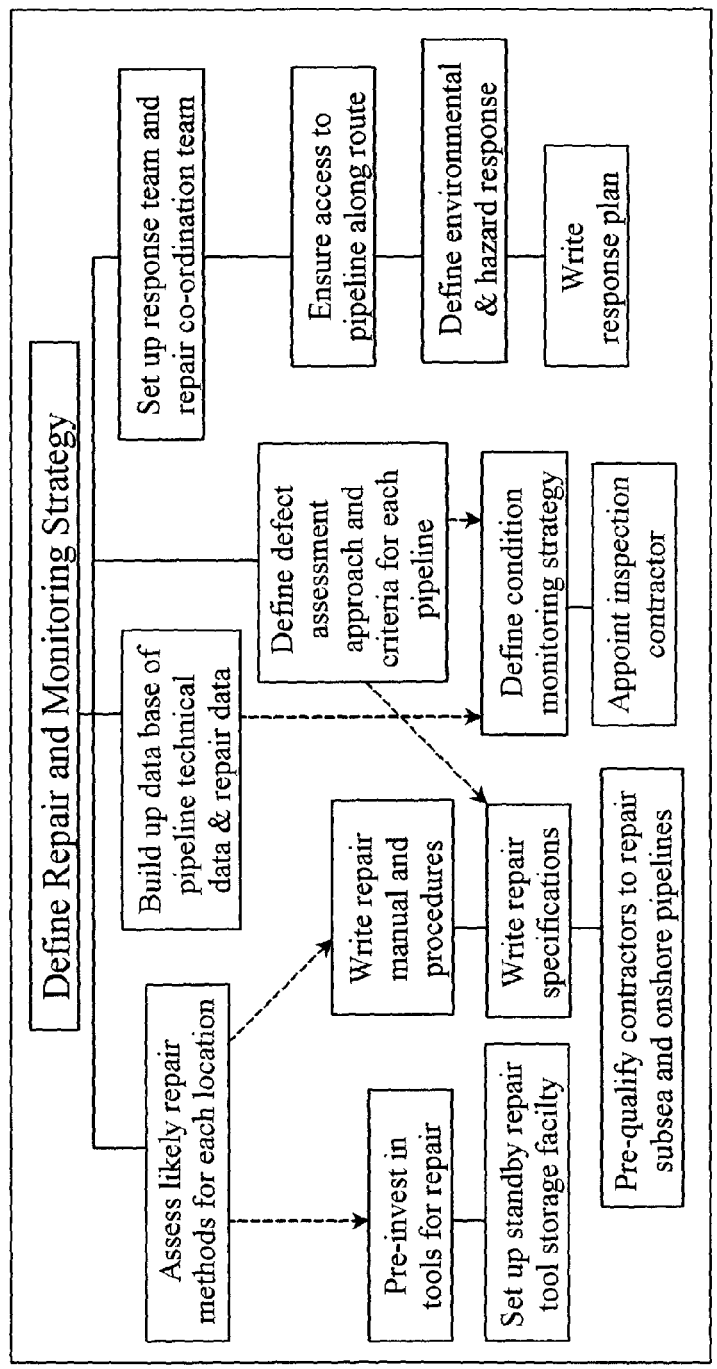
FIG. 37 is a diagram illustrating a repair strategy according to an embodiment of the invention.

With the embodiments of the invention described and the possibilities for damage it is preferable that a repair system is implemented. FIG. 37 illustrates a Repair Strategy. Repair procedures and standby repair equipment are also preferred as part of the contingency package. The repair system implemented in accordance with the invention may have an emergency response plan, maintain stocks of spare pipe, have to hand ancillary equipment such as clamps, and have pre-prepared procedures for commonly applied techniques such as concrete weight coating removal, pipe cutting, and hyperbaric welding. It is noted that repair may be greatly simplified in the case of a modular outer pipe such as the "chain pipe" mentioned above; in such a case repair may often involve replacing the damaged pipe segment with a new segment and repair clamps may not be required.

Figure 38:
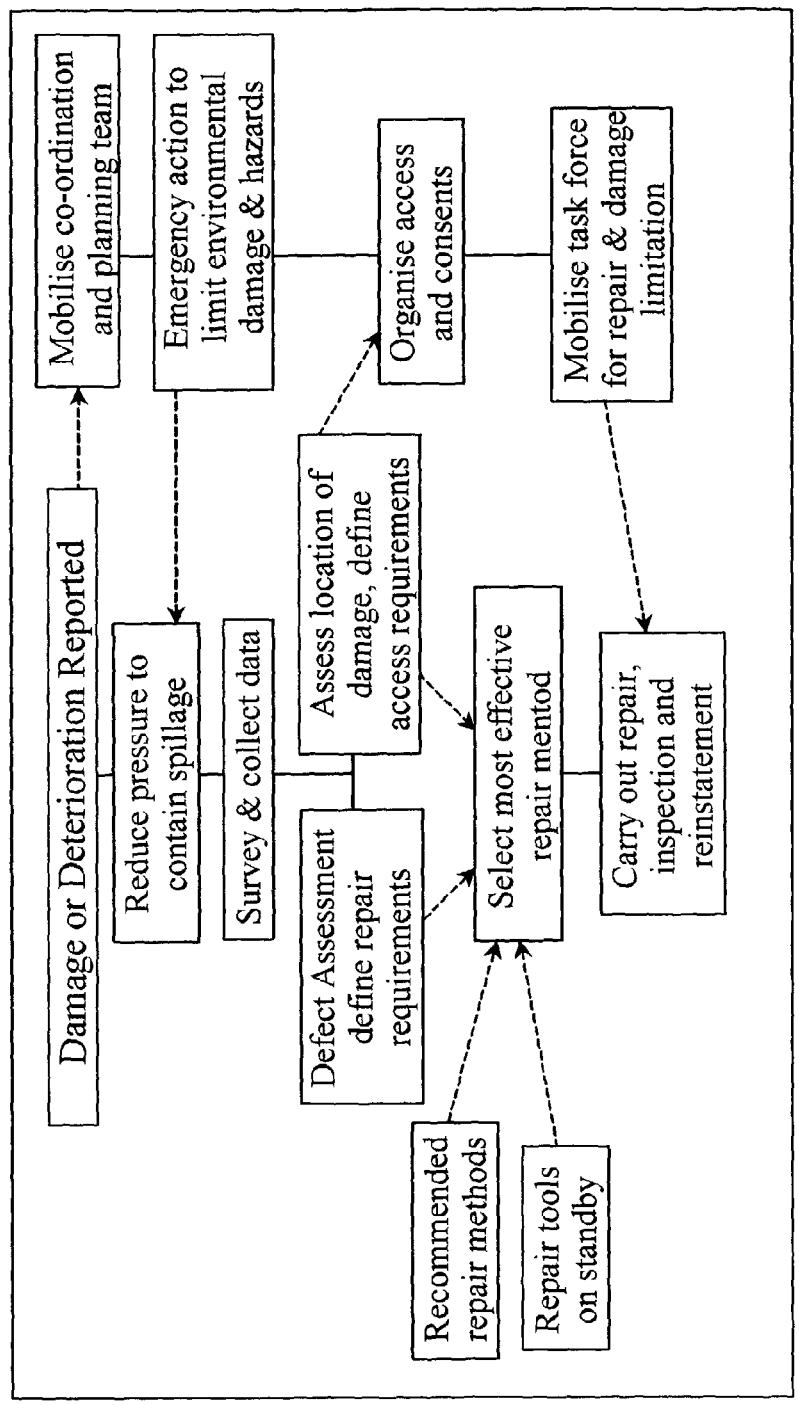
FIG. 38 is a diagram illustrating repair procedures according to an embodiment of the invention.

This combined with a complete database of operational and physical data for the pipeline system allows the emergency response team to be fully informed and able to make effective decisions. Once the location of the damage is confirmed the emergency response team would typically initiate the following course of action:

1. Limit or contain the pipeline leak, or potential leak, by reducing system pressure and containing any spillage.
2. Survey and assess damage and make engineering criticality assessment.
3. Select most appropriate repair method from those described
4. Mobilise repair team with repair equipment to carry out the repair
5. Repair, inspect and record the operation These procedures, and variations, are illustrated in FIG. 38. This would be the typical scenario for an emergency repair but in some cases a repair may be planned well in advance. For example, if inspection reveals unexpected levels of corrosion or anode wastage that may compromise the design life of the pipeline but is not critical in the short term, a maintenance repair may be planned.

Certain key long-delivery equipment, described in the preceding sections, are kept on standby for possible repairs. This equipment could be pooled by a number of pipeline operators to share the cost. Such emergency repair clubs may have standing emergency contracts with vessel operators to provide emergency repair vessels and tools.

Figure 39:
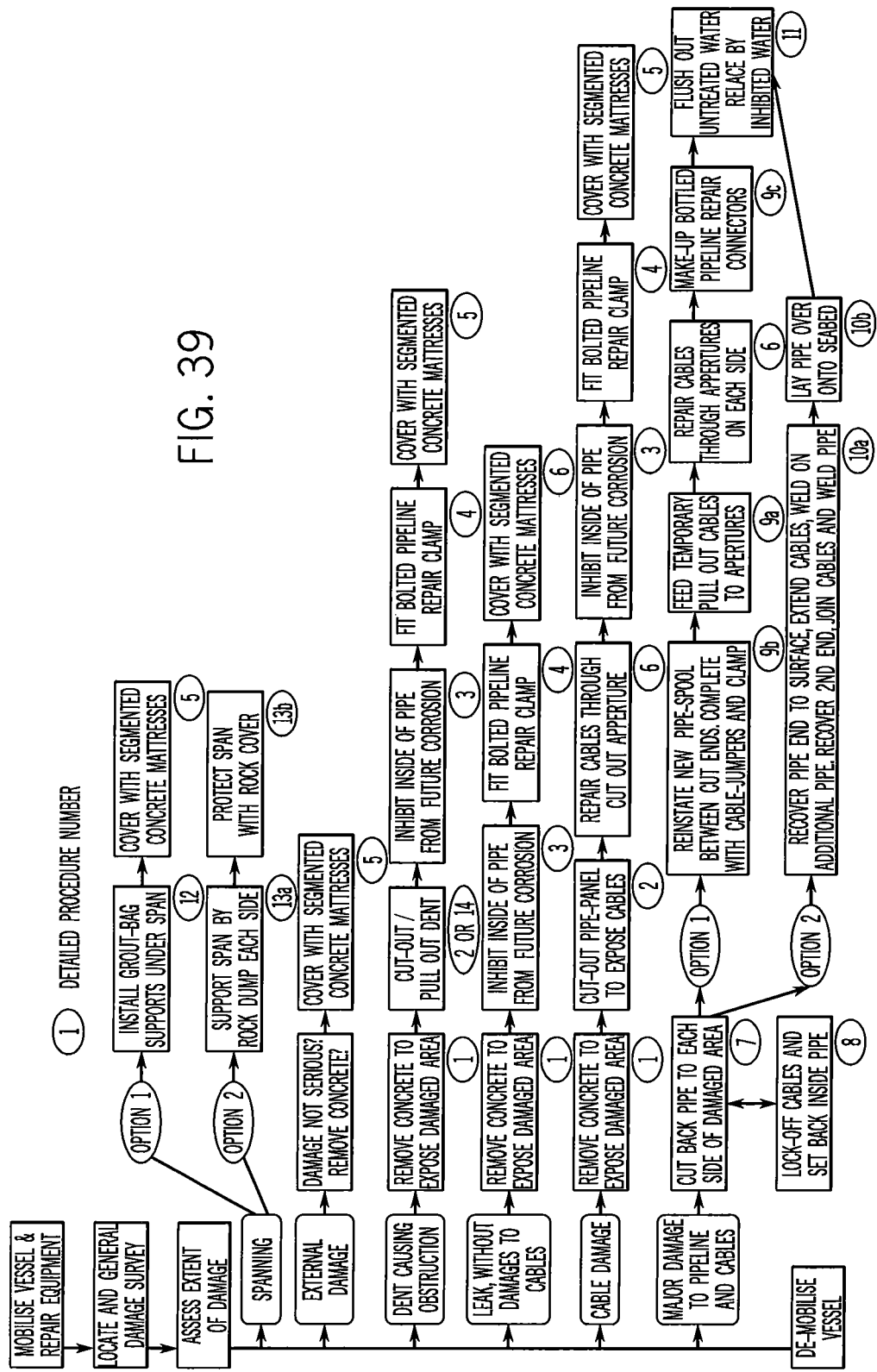
FIG. 39 is a diagram illustrating a set of repair procedures according to an embodiment of the invention and including details of FIGS. 37 and 38.
Figure 40:
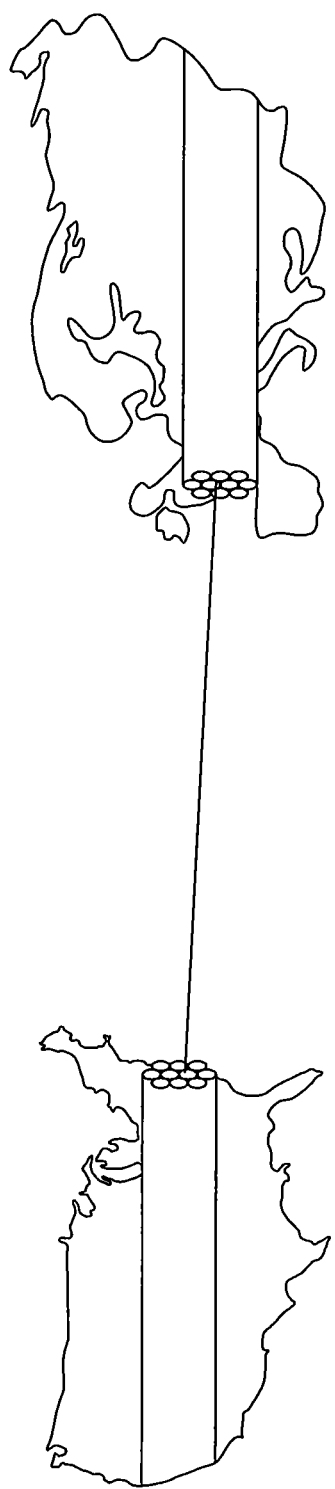
FIG. 40 is a schematic overview of a transatlantic sub-sea cable system according to an embodiment of the invention.
Figure 41:
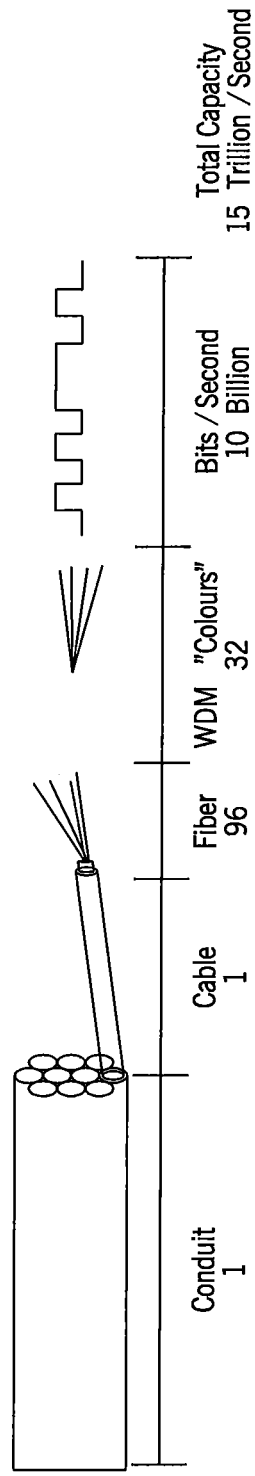
FIG. 41 is a diagram illustrating the typical make up and data capacity of the conduit according to an embodiment of the invention.

An outline of all procedures or MOPS is shown in FIG. 39. Certain of these steps will now be described in greater detail.

Figure 51:
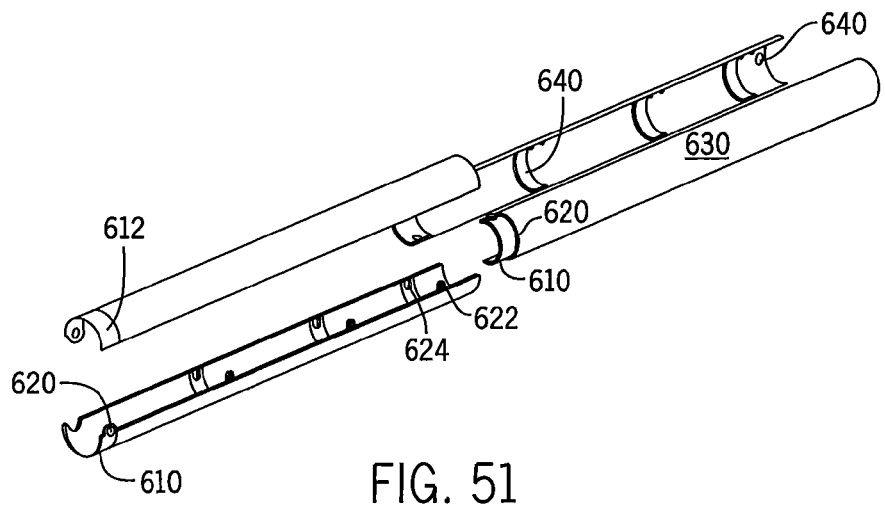
FIG. 51 is a line diagram isometric of the "chain pipe" showing exploded view of horizontally and vertically split shells.
Figure 52:
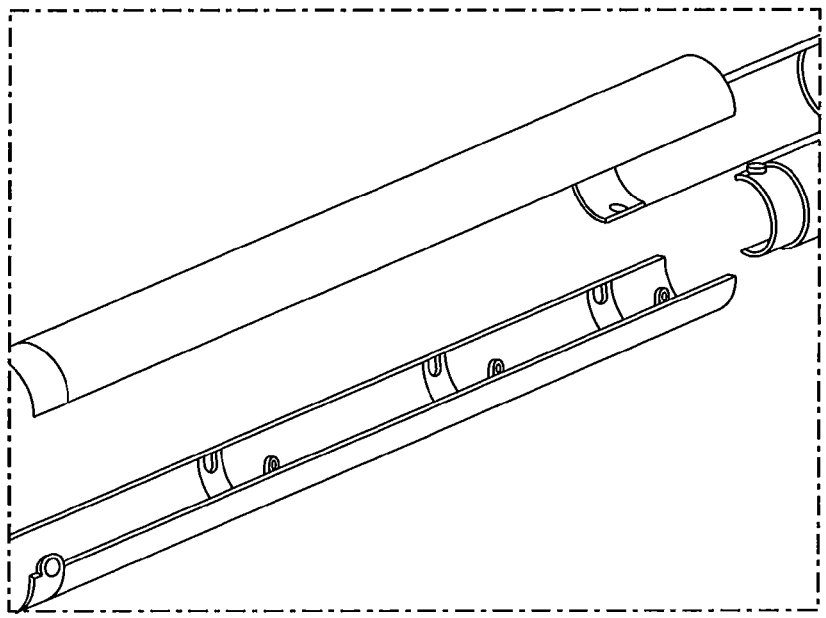
FIG. 52 is an image of the "chain pipe" showing exploded view of horizontally and vertically split shells.
Figure 53:
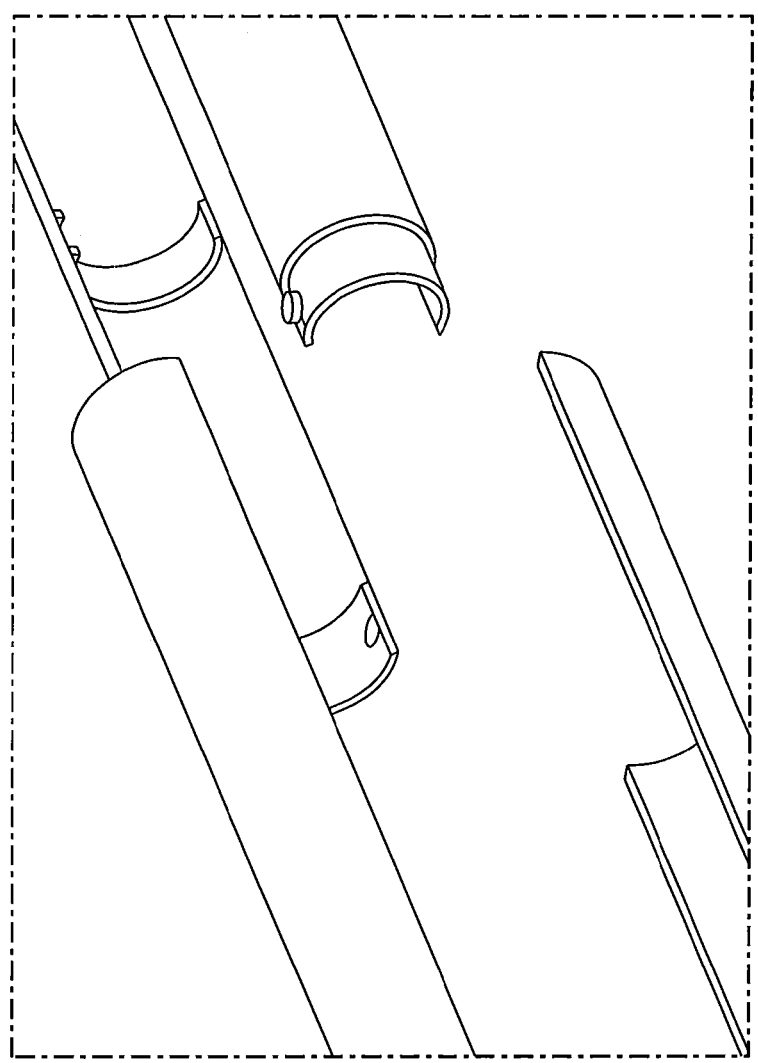
FIG. 53 is an image of the "chain pipe" showing exploded details of the connection.

It is to be noted that certain of these methods may be modified and in many cases simplified if the outer duct is constructed from partial (half) shells, for example as in the chain-pipe embodiment depicted in FIGS. 51-53. In such a case, in many cases, it may be possible simply to remove the damaged half shell, or adjacent shells and replace them.

Span Correction [MOP 12 & 13]

There are various methods, according to embodiments, which may be employed for correcting spans:

1. Installation of grout bags, built up by divers under the pipe to form a secure support for the pipe. The pipe would then be protected by flexible concrete mattresses,
2. Installation of adjustable steel supports (possibly only effective if they cannot be undermined by scour);
3. Rock dumping, either over the entire span or in a heap close to the centre. The rock would be dumped to each side of the pipe to form a support and then over the top to provide protection.
4. Trenching, or jetting, to lower the ends of the span and partially shelter it within a trench. This may require large equipment to be mobilised.

Where there is a risk of snagging due to fishing activity, methods such as rock-dumping or mattresses covering a supported span, are preferred.

Pull-Out a Dent [MOP 14]

If the serviceability of the cable duct pipeline is compromised by a dent, it may be possible to pull-out such a dent mechanically, particularly if it is in a relatively thin wall pipe. This procedure would preferably employ a specialist subsea tool to drill into the pipe and then insert a pulling tool to pull out the dent, without damaging the cables within. After pulling-out the dent a repair a clamp would be fitted to seal the drilled hole. If such a method could not be implemented then the cut-out method would typically be used.

A preferable complete sequence of operations is as follows:

Remove Concrete and coating [MOP 1]:
   a) Excavate around pipe
   b) Attach concrete disc cutter to cut circumferential slots
   c) Attach concrete disc cutter to cut longitudinal slots
   d) Use hydraulic tool to lever off concrete
   e) Use wire brushing tool to remove coating locally Pull out dent [MOP 2]:
  a) Deploy tooling onto pipe
  b) Drill hole just through pipe wall
  c) Insert hydraulic-puller through hole and engage internal grips
  d) Pull out dent to provide sufficient internal clearance for cables
  e) Disconnect and recover tool Inhibit inside pipe [MOP 3]:
  a) Depending on size of hole either insert bag, or inject gel, containing slow-dissolving biocide into the pipeline, prior to sealing-up the hole.

Fit Repair Clamp [MOP 4] and protect [MOP 5]:
Repair Clamps [MOP 4]

For small apertures less than 1.5 diameters a standard mechanical repair clamp would preferably be used. Where, as will be typical, the cable duct pipeline is a low-pressure system, simple low-pressure clamps may be used for this type of repair.

Various types of clamps are available, from, for example, PLIDCO, for repair of minor leaks in pipelines using gaskets to retain the fluid. These clamps re-establish the pressure holding capability of the pipeline. The simplest type uses a fully encircling bracelet to secure a cone-shaped seal over a small hole. Typically, once a bracelet is secure the sealing cone is tightened into the defect, providing an effective seal.

Figure 42:
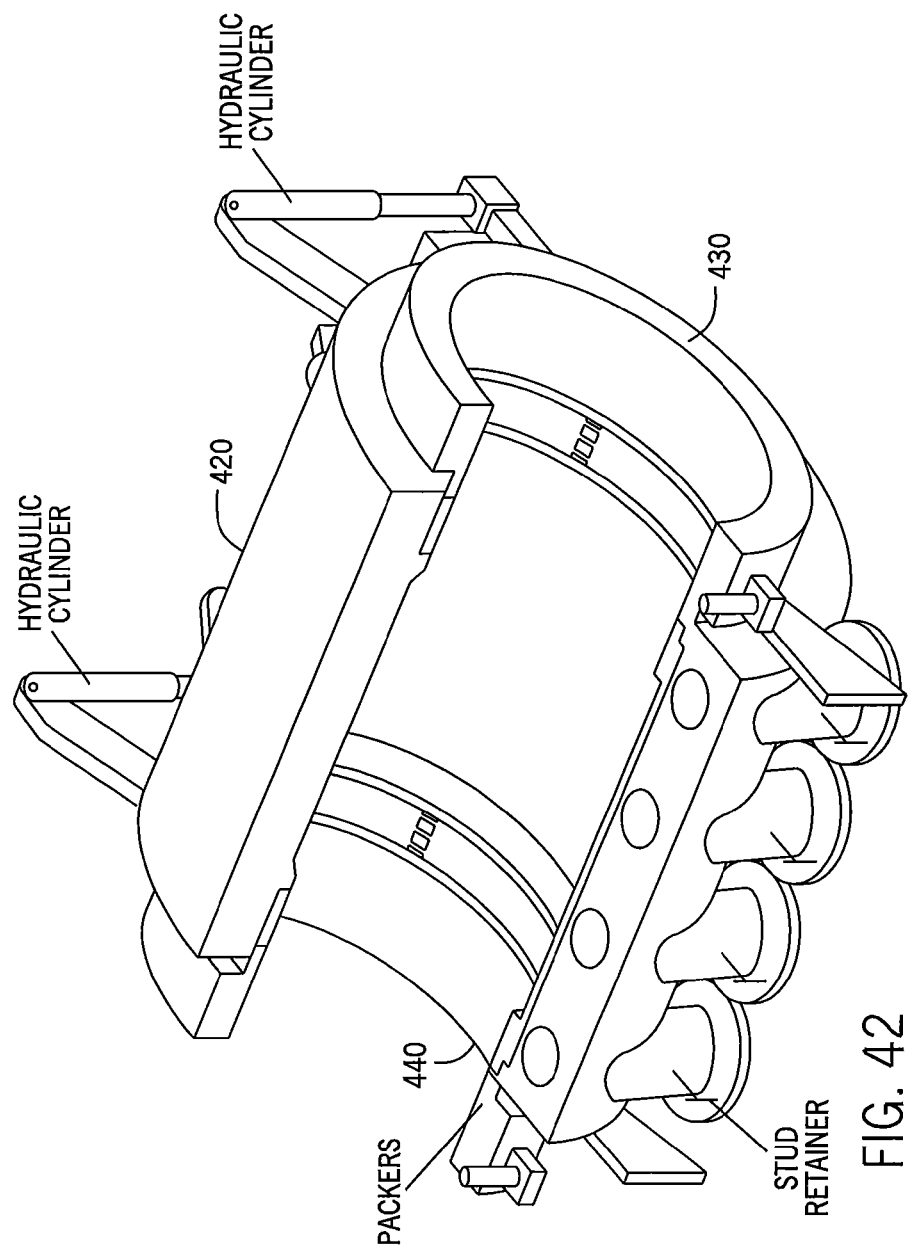
FIG. 42 shows a pipeline repair clamp.
Figure 43:
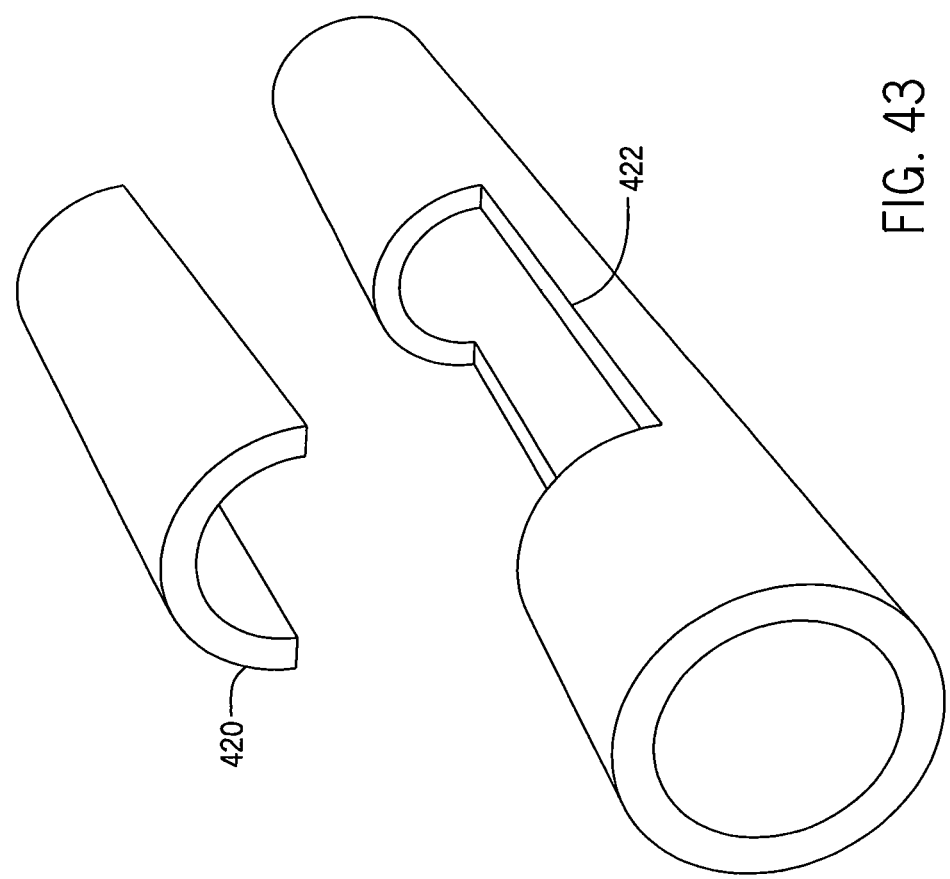
FIG. 43 shows cutting out of a half shell.

Larger mechanical clamps may comprise a flanged 430 and bolted pair of half shells 420, with sealing gaskets 440. The seal arrangement will typically vary from simple clamps with a single seal, to high integrity clamps with twin seals, complete with packing bolts to energise the seals, and an annulus test port to allow the clamp seal integrity to be checked after installation. FIGS. 42 and 43 show suitable clamps.

Preferably, to install such a clamp, the soil around the pipe would be excavated to provide clearance for fitting the clamp, which would be bolted up around the pipe to make a seal. If the pipeline is experiencing high bending, or a large section of pipe wall has been cut away, it may be necessary to use a structural clamp that has the capability to transmit forces adequately, for example, the structural clamps currently produced by Hydrotech and Technomarine.

Preferable implementation of Install Repair Clamp [MOP 4]:
  a) Soil should already have been excavated from beneath the pipe to allow clamp to be fitted around the pipe
  b) Deploy clamp and centralise over pipe aperture
  c) Lower over pipe and close around pipe (hydraulic actuation or flange-pullers)
  d) Insert stud-bolts, nuts and fit bolt-tensioners
  e) Tension studs and tighten nuts
  f) Tighten end-studs by tension/torque to actuate seals
  g) Test seals using hot-stab Cut-Out Panel Cable Repair This requires appropriate selection of tools to ensure that the pipe can be cut without damaging the cables within. Existing cold-cutting machines should be capable, preferably using shallow setting for the cut to minimise penetration into the pipeline. An additional low-pressure water jet may be employed to push cables clear of the cutting blade. The aim is to cut out a half shell aperture 422 to gain access to the cables within, as shown in FIG. 43.

Preferably, the aperture in the pipe provides access for cable inspection and repair.

The aperture cut-out is preferably covered and sealed by a repair clamp. This may avoid the need for welding which saves time and reduces the risk of cable damage during reassembly.

For a typical cut-out panel repair:
1. Cut-out Pipe Dent:
  a) Deploy hydraulic cutting tool guides and clamp around pipe
  b) Deploy hydraulic cutting tool (Wachs type) and fit to guides
  c) Cut shallow circumferential slot through pipe wall, to about 2 way down pipe
  d) Apply restraining clamps to >half-shell=pipe-panel
  e) Cut shallow axial slot in pipe between circumferential slots
  f) Remove>half-shell=pipe-panel leaving aperture in the top half of the pipe.
2. Cut back pipe and repair cables
3. Install Repair Clamp Pipe Aperture Cable Repair [MOP 6]

This procedure will be simplified by the use of pre fabricated customised tooling, to simplify and speed up the repair of fibre optic cables and it is preferred that tooling is prepared in advance of a repair. Such tooling should be straightforward to construct for a particular application based on the explanation presented below as to the function of the tooling. A consideration is also to minimise the size (diameter) of the repaired section.

The procedure takes place after an aperture has been cut in the pipe, through which the cable-ends can be accessed for repair.

The method should will be applicable to three potential scenarios:
  Surface repair by trained technicians. Technicians would be trained in cable repair tooling and equipment
  Subsea hyperbaric repair by trained divers. Hyperbaric repair requires a dry pressurised chamber around the pipe and saturation-divers. Air-divers could only be used in shallow water (under 50 m). Divers would be trained in cable repair tooling and equipment
  Deep water repair by ROV using specially developed cable repair tooling In all cases it is assumed that the repair is carried out in the dry. For a subsea repair this will require a hyperbaric habitat that can be located over the pipe aperture to carry out the repair. These habitats are large and expensive to deploy and operate. Purpose built tooling could employ a small dry chamber to carry out a repair, operated by a diver or semi-skilled technician. A compact cable-splicing tool that could automatically align and join individual fibres in a cable would be a significant advantage; such a tool can be based on existing fibre joining tools. Such a tool would greatly facilitate the deployment of a deepwater remotely operated tool. It is desirable to employ a cable joining method that results in a low profile junction, with a diameter not much larger than that of the parent cable. It is noted that a full hyperbaric chamber may be used in the procedures, if suitable compact cable-splicing tools are not readily available.

Major Repair [MOP 9 or 10]

Figure 44:
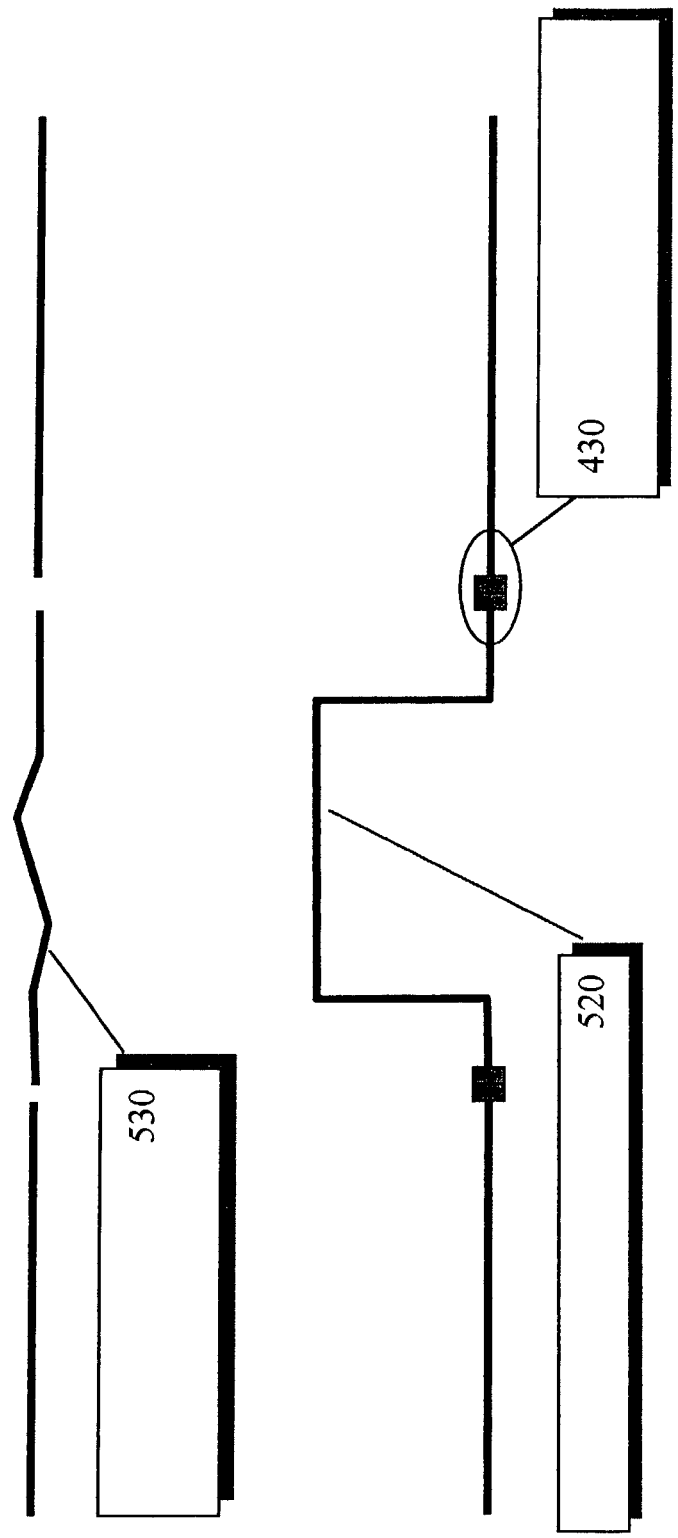
FIG. 44 illustrates traditional pipeline repair.

For major petrochemical pipelines, where damage is too severe for an external clamp, there are a number of existing methods for a cut-out type repair, however these may not be appropriate to a cable-duct pipe repair, where the damaged end of the pipe may still carry intact operating cables:
1) Surface repair by cutting out the damaged part of pipe 530 sub-sea, recovering ends to the surface, attaching flanges 430 (connectors) and assembling sub-sea using a flanged-end pipe-spool 520. FIG. 44 illustrates traditional pipeline repair.

Figure 45:
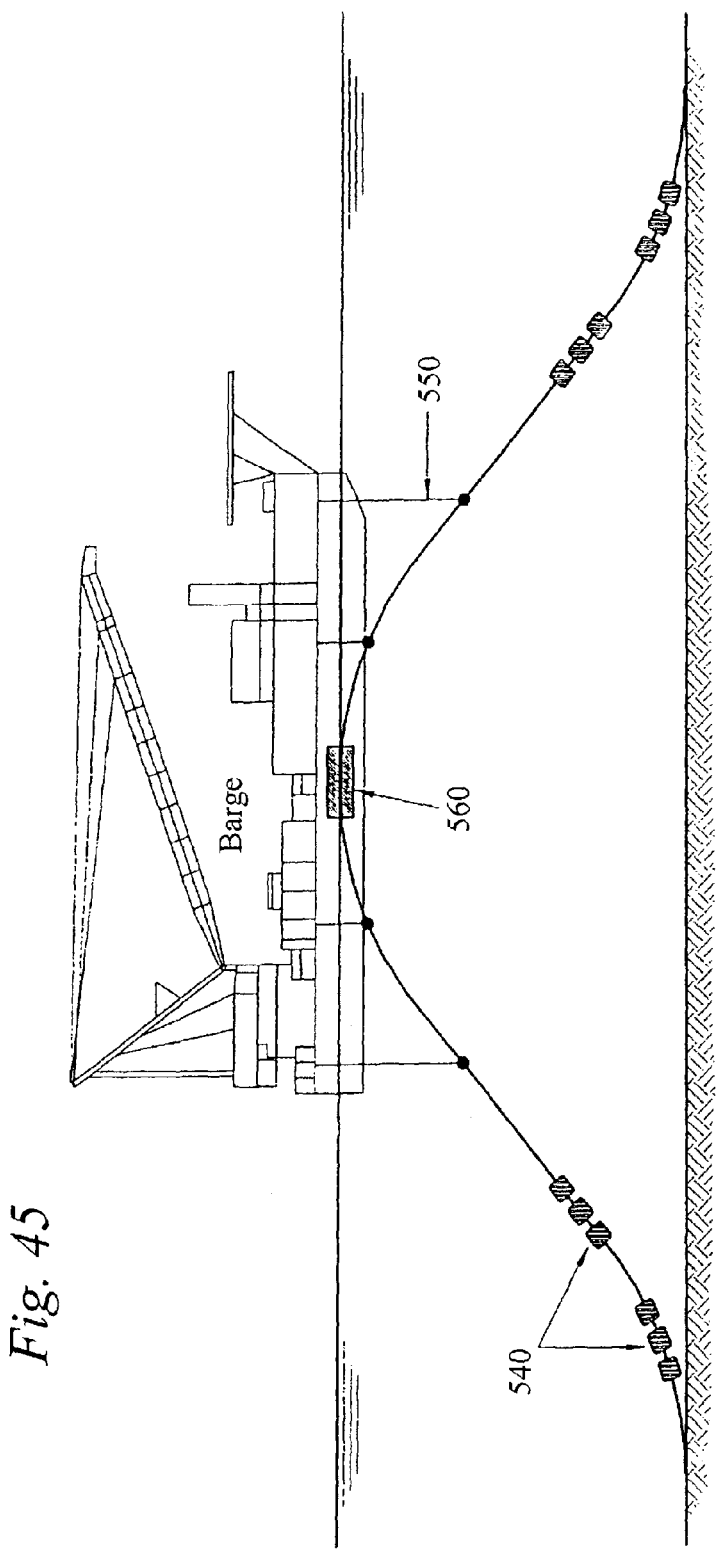
FIG. 45 illustrates repair by bringing a damaged section to the surface.
Figure 46:
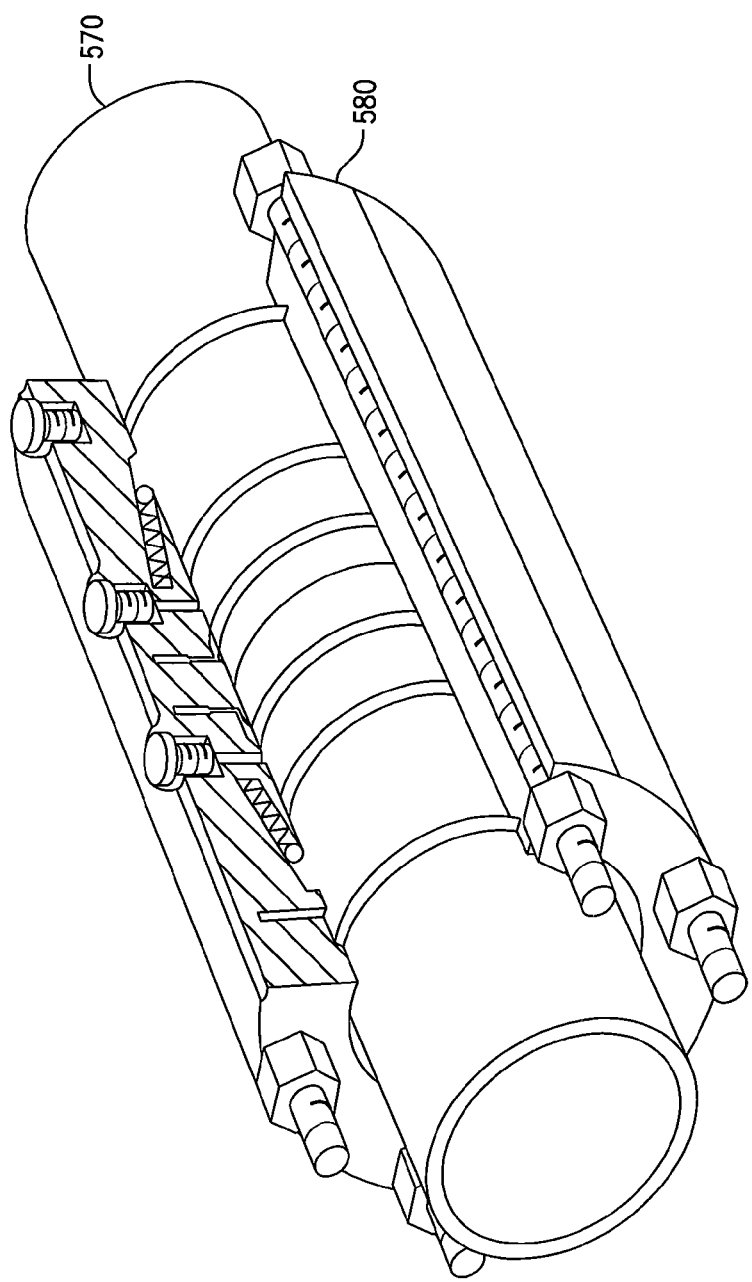
FIG. 46 shows a mechanical connector used for subsea repair.

2) Surface repair by cutting the pipe sub-sea, recovering ends to the surface, welding the two ends together before laying over to one side. This will require an additional length of pipe welded in line for the ends to meet at the surface. Buoyancy aids 540 and Davit lines 550 keep the pipe from sinking, and the pipeline is clamped 560 to the barge prior to cutting. FIG. 45 shows surface mid-line repair.
3) Sub-sea repair using mechanical connectors attached to the pipe ends 570. Pipe-end connectors 580 are considerably more expensive but can save considerably on vessel time. FIG. 46 shows mechanical pipe end connectors 580.
4) Repair by sub-sea hyperbaric welding. This takes longer and requires considerably more equipment, including diving spread, welding habitat and pipe handling frames. This method is only used if mechanical connectors are not technically acceptable.

All these techniques involve cutting the pipe, which is a major challenge for pipe containing multiple cables, as the subsequent individual cable repairs will take a considerable time to perform. If at all possible the aim should be to repair the pipe without cutting it or the cables, unless the damage is such that all the cables are severed.

Two potential options are proposed: sub-sea repair and surface repair. For both types of repair the concrete coating is removed locally preferably using a commercially available concrete removal tool. The pipe is cut-back away from the damaged area while the cables are cut with extra length. The cable-ends are then pushed back and locked-off inside the end of the pipe. This lock-off arrangement requires tool development.

A replacement pipe-spool will be prepared to fit between the severed ends. This spool will include cable jumpers with sufficient slack for a repair at each end. The spool will also include apertures close to each end. These apertures are used for access, to join the jumpers within the spool to the severed cables, using the cable repair method (above). The aperture is then closed by a half-shell clamp. For the subsea repair a special 'pipe-end connector 580' and 'half-shell clamped aperture 420' would preferably be combined into one repair tool that is kept on standby to effect such a repair.

Figure 47:
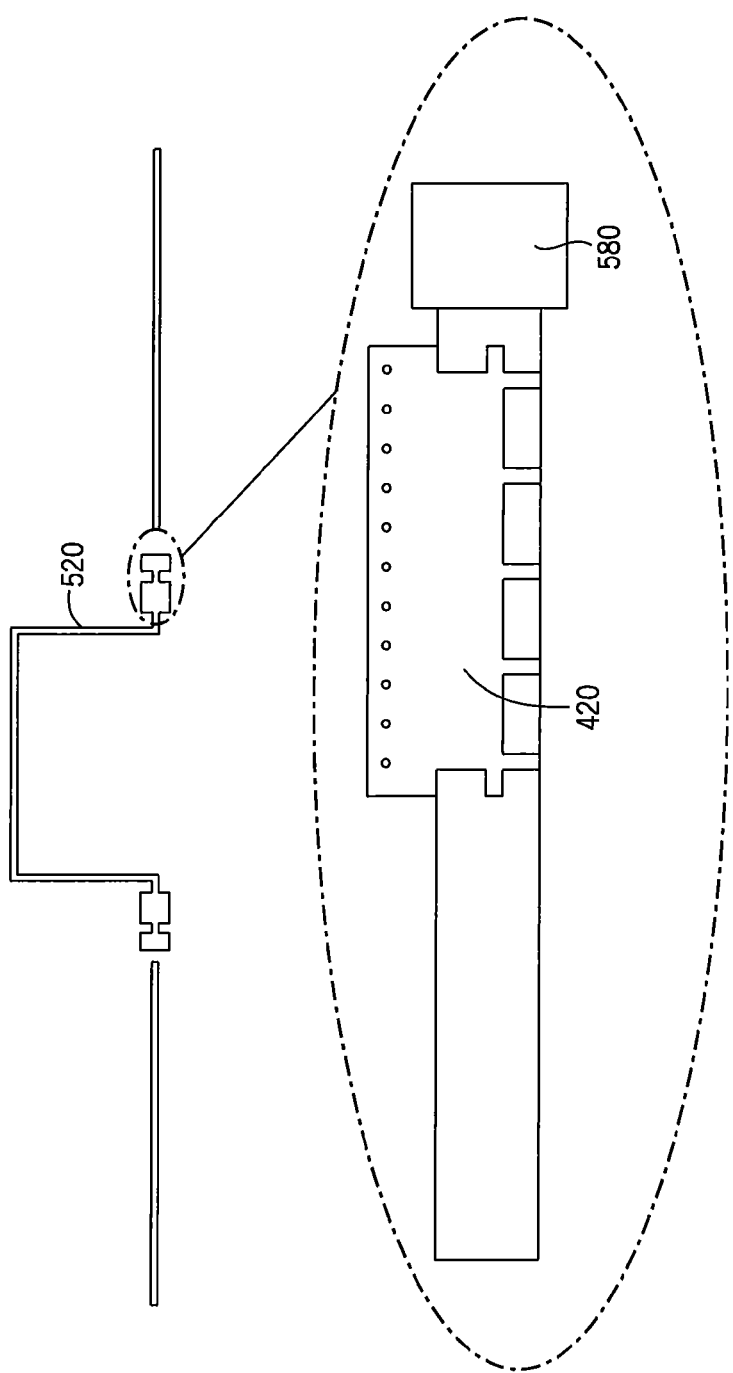
FIG. 47 shows schematically a combined tool including a pipe-end connector and a half-shell clamped aperture.

FIG. 47 shows such a combined tool. This important construction which facilitates repair may be provided independently in accordance with a further aspect of the invention which provides a spool for use in repairing or replacing a length of cable-carrying duct, the spool comprising a length of duct having at each end thereof means for mating with a cable-carrying duct to be repaired, the duct further having at least one opening or removable and resealable access panel providing access to the interior of the duct. In this way, the spool can be inserted in a duct in place of a damaged length of duct and cables can be spliced using the opening or removable access panel to gain access to the interior after the duct of the spool has been joined to the duct. The dimensions of the duct of the spool will generally correspond to the dimensions of the duct to be repaired, typically at least 30 cm diameter. The means for mating may advantageously comprise a pipe end connector, particularly a sleeve arranged to slide over the duct to be joined. The opening may be arranged to receive a half shell clamp. The duct section will typically be at least 2 meters long, typically at least 10 meters long.

Method of repair may also be provided independently as independent aspects. For example, this aspect may provide a method of repairing a sub-sea duct carrying a plurality of cables comprising removing a damaged section of duct, inserting a repair spool comprising a length of duct (preferably having similar dimensions to the duct to be repaired) in place of the removed section, joining the repair spool to the sub-sea duct, preferably by means of connectors pre-installed on the repair spool; accessing cables within the repair spool through an aperture in the repair spool to splice (or connect) the cables; and sealing the aperture. Preferably the cables are spliced using a hyperbaric splicing method, for example by enclosing the repair site in a hyperbaric chamber and/or by providing a hyperbaric splicing tool to create a hyperbaric region around the cables and splice the cables. This method may be modified to incorporate alternative features of the other repair methods disclosed herein and any such modified method may be provided independently. The invention further provides a sub-sea cable splicing tool comprising means for creating a hyperbaric or water-free region around at least one cable to be spliced and means for splicing the or each cable within said region. The cables may be formed to facilitate repair or splicing, for example as ribbon cables.

For a subsea repair final welding of the spool will be carried out on the surface achieve the correct dimensions for the gap between the pipe ends. The spool will also be sufficiently flexible to allow the ends to be stabbed onto the pipe ends. This would be require bends within the spool to make a U configuration. Outline procedure for a subsea repair is given in section 4.3

Figure 48:
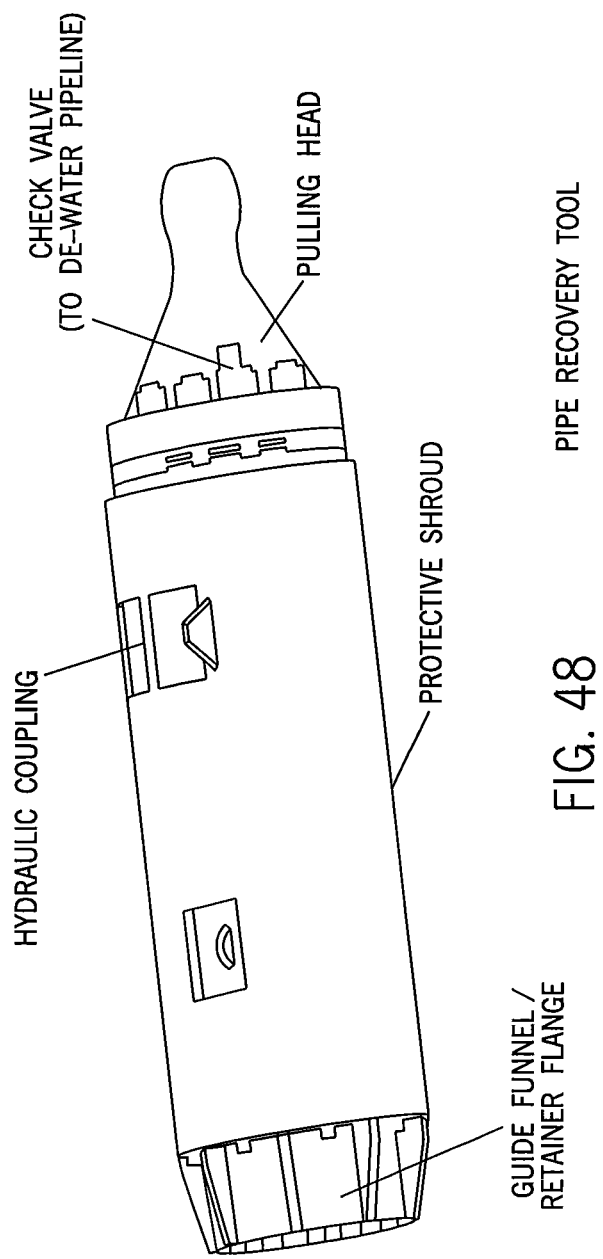
FIG. 48 shows a pipe recovery tool.

For a surface repair the pipe is recovered to the surface using a pipe recovery tool (FIG. 48). The spool is attached to this end of the pipe to extend it. Then, when the other pipe end is recovered to the surface there is sufficient length overall for the ends of the pipe to be suspended in a gentle catenary while they are joined together. This is a straight in-line connection as shown in FIG. 45. Outline procedure for a subsea repair is given below Major Subsea Repair to Pipe With Individual Conduits For a duct-pipe which contains a number of HDPE conduits, that might contain a cable, the repair methodology is quite different from the case of a duct that contains individual cables. Principally the integrity of the outer pipe is not as critical. The outer duct pipe is there for protection, not as a piggable, pressure-containing pipe. In this case it is important to repair the conduits, maintaining the internal bore diameter constant as far as possible. While external protection does not have to be pressure containing, it must be reinstated.

Once again it will be necessary to cut the outer duct pipe back to an undamaged section. The subsequent individual conduit repairs will provide a path for new conduits to be run. If a cable is present in the conduit, then such a repair might take some time to perform. If at all possible the aim should be to repair the conduit without cutting the cable. If the cable is damaged, an in-situ repair may be necessary; unless the broken cable can be removed and reinstalled from scratch. The following procedure is proposed to carry out a subsea repair of the conduits.

First the pipe is cut-back away from the damaged area while the conduits are cut with extra length. If cables are present, the ends are also cut with additional extra length and tied-back, temporarily.

Figure 49:
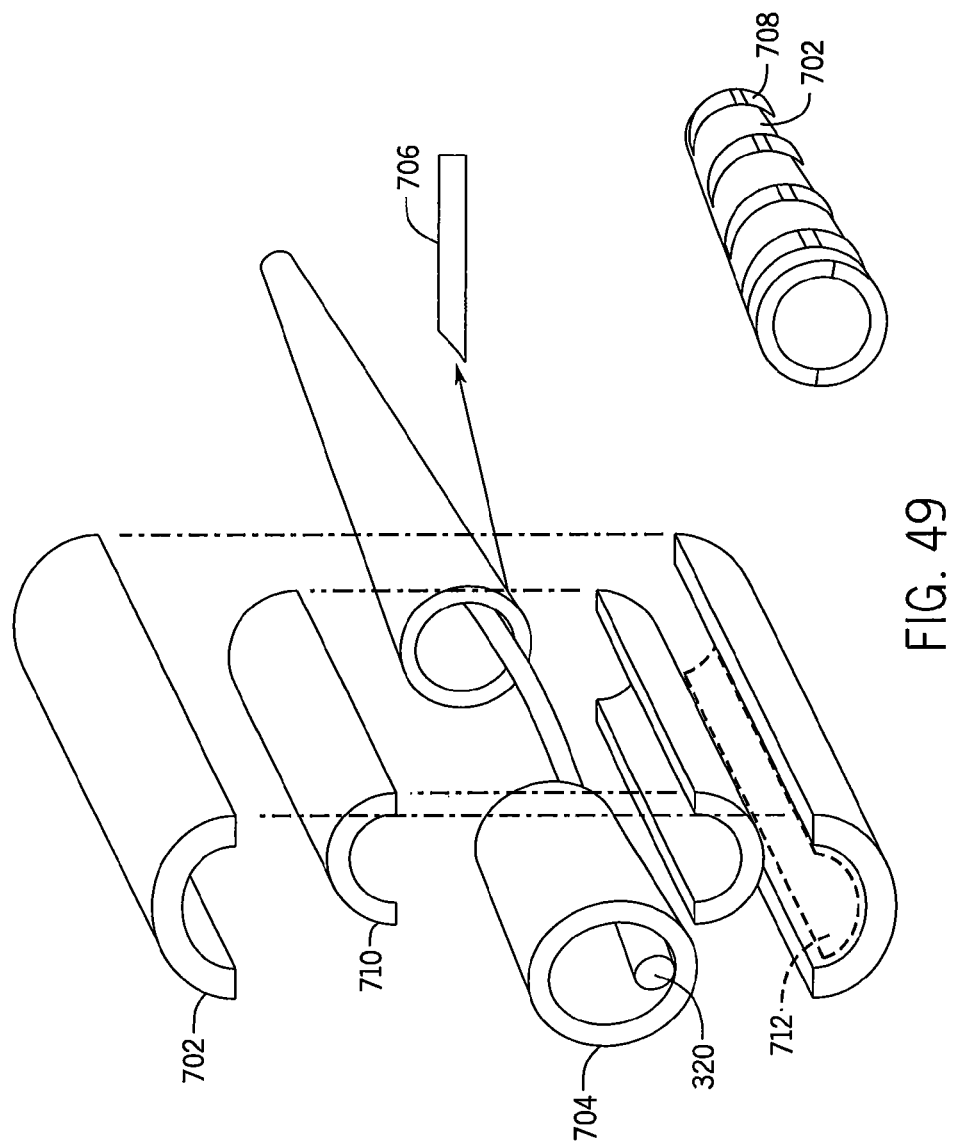
FIG. 49 illustrates repair of an HDPE conduit.

Replacement lengths of conduit are prepared to fill the gap between the cut ends. These conduit-spools will include cable jumpers with sufficient slack for a cable repair at each end. If there is a cable, it is repaired using the cable repair method, described earlier. The conduit-spool is then joined to the conduit at each end using an HPDE repair sleeve FIG. 49 schematically illustrates HDPE conduit 704 repair. These half-shell sleeves 702 are closed around half-shell packs 710 which are closed around each conduit 704 joint and held in place using high-tension straps 708. The outer shells include seals 712 to keep the conduits pressure tight. If necessary the ends to be joined can be chamfered 706 to provide a smoother bore for future cable installation.

Figure 50:
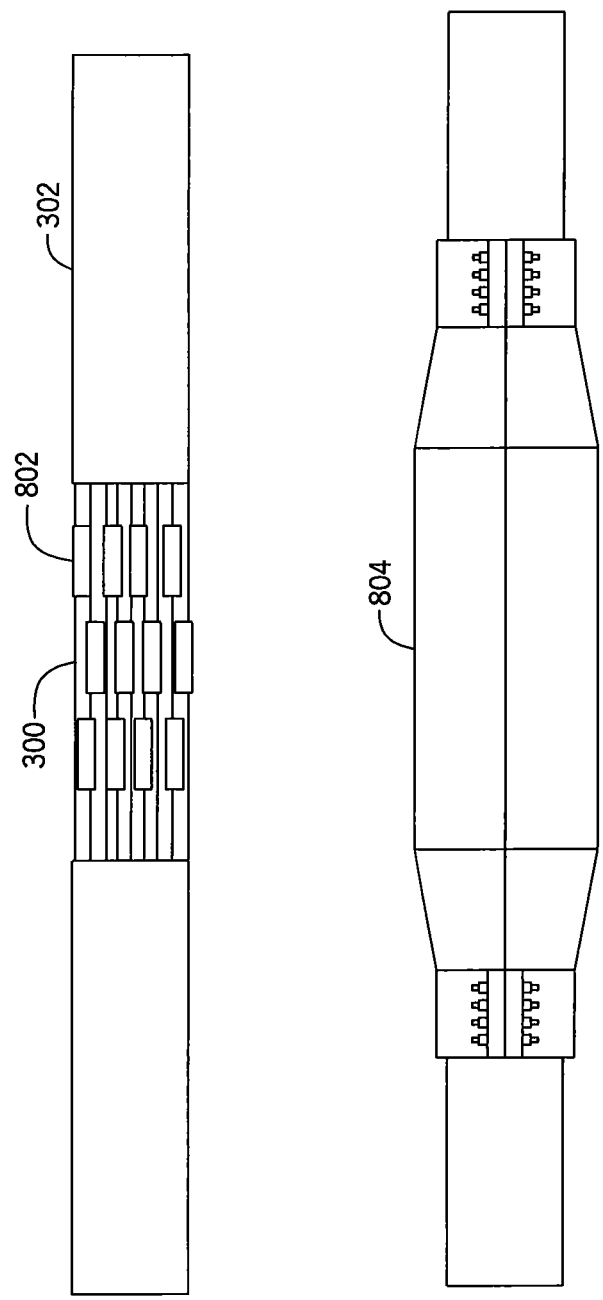
FIG. 50 illustrates repair of an HDPE conduit outer duct.

The outer duct-pipe can be repaired using an oversize sleeve to provide mechanical protection only. FIG. 50 illustrates outer duct repair. This oversize sleeve will allow space for the conduit repair sleeves 802 to fit within the protection offered by this outer duct sleeve 804. The outline procedure for this repair is given below.

This section goes through selected repair procedures using individual MOPS. Where MOPS are repeated a second time they are in italics.

Sequence of Operations for Cut-Out Panel Cable Repair (Local Cable Damage)

(1) Survey pipe damage and select extent of damage to be cut-out
(2) Remove Concrete and coating [MOP 1]
   a) Excavate around pipe
   b) Attach concrete disc cutter to cut circumferential slots
   c) Attach concrete disc cutter to cut longitudinal slots
   d) Use hydraulic tool to lever off concrete
   e) Use wire brushing tool to remove coating locally
      Use high pressure jet to clean off surface coating
(3) Cut-out damaged pipe section [MOP 2]
   a) Deploy hydraulic cutting tool guides and clamp around pipe
   b) Deploy hydraulic cutting tool (Wachs type) and fit to guides
   c) Cut shallow circumferential slot through pipe wall, to about ½ way down pipe
   a) Apply restraining clamps to 'half-shell' pipe-panel
   b) Cut shallow axial slot in pipe between circumferential slots
   c) Remove 'half-shell' pipe-panel leaving aperture in the top half of the pipe. (FIG. 3)
(4) Subsea cable repair [MOP 6]
   a) Identify damaged cables for repair.
   b) Position test and splice tool equipment on the cable repair working platform
   c) Deploy working platform into the pipe-aperture.
   d) Pull the cable-ends into the aperture.
   e) Install hyperbaric chamber
   f) Deploy diver-technicians
   g) Cable-ends are locked-off or held in temporary restraints.
   h) Strip back cable to sound fibre and prepare
   i) Conduct OTDR and any other tests prior to splice
   j) Perform splicing operation
   k) Conduct OTDR and any other tests
   l) Seal joints with low profile shrink sleeve/other
   m) Conduct final integrity test
   n) Lower cable back into pipe
   o) Repeat procedure on each severed cable.
   p) Remove working platform
   q) Remove habitat
(5) Inhibit inside pipe [MOP 3]
   Depending on size of hole either insert bag, or inject gel, containing slow-dissolving biocide into the pipeline, prior to sealing-up the hole.
(6) Fit Repair Clamp [MOP 4]
   Soil should already have been excavated from beneath the pipe to allow clamp to befitted around the pipe
   Deploy clamp and centralise over pipe aperture
   Lower over pipe and close around pipe (using hydraulic actuators, or flange-pullers)
   Insert stud-bolts, nuts and fit bolt-tensioners
   Tension studs and tighten nuts
   Tighten end-studs by tension/torque to actuate seals
   Test seals using hot-stab connection (7) Protect [MOP 5]
   Deploy concrete protection mattresses over repair area and pipe to each side.
   Butt each mattress against the last to leave no area exposed to impact or snagging.

Sequence of Operations for Major Subsea Repair (Cut Pipe and Repair Cables)

(8) Survey damage and select best location to cut-away pipe to each side of damage. Cut ends must be suitable for pipe end repair.
(9) Remove Concrete and coating [MOP 1]
   a) Excavate around pipe
   b) Attach concrete disc cutter to cut circumferential slots
   c) Attach concrete disc cutter to cut longitudinal slots
   d) Use hydraulic tool to lever off concrete
      Use wire brushing tool to remove coating locally
      Use high pressure jet to clean off surface coating
(10) Cut back pipe [MOP 7]
   a) Deploy and attach guides for hydraulic cutting tool around pipe
   b) Deploy hydraulic cutting tool and cut though pipe to gain access to cables within.
   c) Cut around full circumference of pipe while protecting cables.
   d) Cut away damaged cables leaving sufficient extra length for subsequent repair.
   e) Undamaged cables should remain un-cut, if at all possible.
   f) If cable ends are not long enough then pipe should be cut back further.
   g) Cable-ends are locked-off or clamped in a temporary restraint that is pushed back inside the end of the pipe and fastened in position.
(11) Insert new pipe-spool [MOP 9]
   a) Replacement pipe-spool (a short length of replacement pipe with connection fittings at each end and aperture for cable repair) is prepared at surface to fit between the severed ends,
   b) Cable 'jumpers' slightly longer than the spool are placed within the pipe-spool with sufficient slack at each end,
   c) Pipe-spool will also include apertures for repair access, closed by a half-shell clamp, close to each end of the spool. Apertures will be closed by temporary straps, with cables prepared for joining inside.
   d) 'Pipe-end connector' at each end of the pipe-spool is prepared for activation with hydraulic tools or diver tools
   e) Deploy the prepared pipe-spool and line up with the existing pipeline at each end.
   f) Pull ends of pipe-spool onto pipe ends
   g) Activate the pipe-end connectors.
   h) Open up the half-shell clamps to expose apertures at each end
   i) Pull cable ends into apertures at each end of pipe-spool.
(12) Subsea cable repair at each end [MOP 6]:
   a) Identify damaged cables for repair.
   b) Position test and splice tool equipment on the cable repair working platform
   c) Deploy working platform into the pipe-aperture.
   d) Pull the cable-ends into the aperture.
   e) Install hyperbaric chamber
   f) Deploy diver-technicians
   g) Cable-ends are locked-off or held in temporary restraints.
   h) Strip back cable to sound fibre and prepare i) Conduct OTDR and any other tests prior to splice
j) Perform splicing operation
k) Conduct OTDR and any other tests
l) Seal joints with low profile shrink sleeve/other
m) Conduct final integrity test
n) Lower cable back into pipe
o) Repeat procedure on each severed cable.
p) Remove working platform
q) Remove habitat
(13) Seal Apertures [MOP 4]
  a) Close the aperture half-shell clamps and bolt up to seal
  b) Test seals
(14) Protect [MOP 5]
  Deploy concrete protection mattresses over repair area and pipe to each side.
  Butt each mattress against the last to leave no area exposed to impact or snagging.
(15) Inhibit inside pipe [MOP 11]
  Flush out uninhibited water by pumping in inhibited water from end of the pipeline or, depending on size of repair insert bag, or inject gel, containing slow-dissolving biocide, prior to sealing-up the hole.

Sequence of Operations—Surface Repair [MOP 10]
(1) Survey damage and select best location to cut-away pipe to each side of damage.
(2) Remove Concrete and coating [MOP 1]
  a) Excavate around pipe
  b) Attach concrete disc cutter to cut circumferential slots
  c) Attach concrete disc cutter to cut longitudinal slots
  d) Use hydraulic tool to lever off concrete
  e) Use wire brushing tool to remove coating locally
  Use high pressure jet to clean off surface coating
(3) Cut back pipe [MOP 7]
  a) Deploy and attach guides for hydraulic cutting tool around pipe
  b) Deploy hydraulic cutting tool and cut though pipe to gain access to cables within.
  c) Cut around full circumference of pipe while protecting cables.
  d) Cut away damaged cables leaving sufficient extra length for subsequent repair.
  e) Undamaged cables should remain un-cut, if at all possible.
  f) If cable ends are not long enough then pipe should be cut back further.
  g) Cable-ends are locked-off or clamped in a temporary restraint that is pushed back inside the end of the pipe and fastened in position.
(4) Recover pipe ends and join [MOP 10]
  a) Deploy hydraulic recovery tool and locate inside end of pipe.
  b) Recover one pipe end to the surface using buoyancy and davits on the vessel to support the pipe in a suitable configuration.
  c) Lock-off on side of vessel
  d) Align pipeline end with the prepared pipe-spool and line up
  e) Connect end of pipe-spool to pipeline using welding or pipe-end connectors.
  f) Open up the half-shell clamps to expose apertures at each end
  g) Pull cable ends into apertures at the end of the pipe-spool.
(5) Surface cable repair at each end [MOP 6]:
  a) Identify damaged cables for repair.
  b) Position test and splice tool equipment on the cable repair working platform in the pipe-aperture.
  c) Pull the cable-ends into the aperture.
  d) Cable-ends are locked-off or held in temporary restraints.
  e) Strip back cable to sound fibre and prepare
  f) Conduct OTDR and any other tests prior to splice
  g) Perform splicing operation
  h) Conduct OTDR and any other tests
  I) Seal joints with low profile shrink sleeve/other
  j) Conduct final integrity test
  k) Lower cable back into pipe
  l) Repeat procedure on each severed cable . . .
(6) Seal Apertures [MOP 4]
  a) Close the aperture half-shell clamps and bolt-up to seal.
  b) Test seals
(7) Lower and recover other pipe end and join [MOP 10]
  a) Lay down, the pipeline end with additional (extension) pipe-spool now attached.
  b) Reconfigure the buoyancy and davit lift attachments
  c) Recover the other severed end of the pipe and the end of the pipe-spool using buoyancy and davits on the vessel to support the pipe in a suitable configuration.
  d) Align with the ends of pipeline and pipe-spool.
  e) Connect ends using welding or pipe-end connectors.
  f) Open the aperture clamp at the end of the pipe-spool
  g) Pull cable ends into apertures.
(8) Join cables to the cable jumpers, using the cable repair method [MOP 6] (above)
(9) Seal Apertures [MOP 4] (above)
(10) Lay down the completed pipe in a smooth wave off the route centre-line.

Sequence of Operations for Major Subsea Repair to Pipe With Individual HDPE Conduits for Each Cable
(1) Survey damage and select best location to cut-away pipe to each side of damage. Cut ends must be suitable for pipe end repair.
(2) Remove Concrete and coating [MOP 1]
  a) Excavate around pipe
  b) Attach concrete disc cutter to cut circumferential slots
  c) Attach concrete disc cutter to cut longitudinal slots
  d) Use hydraulic tool to lever off concrete
  e) Use wire brushing tool to remove coating locally
  Use high pressure jet to clean off surface coating
(3) Cut back pipe [MOP 7]
  a) Deploy and attach guides for hydraulic cutting tool around pipe
  b) Deploy hydraulic cutting tool and cut though pipe to gain access to cables within.
  c) Cut around full circumference of pipe while protecting conduits and cables within.
  d) Cut back damaged conduits and damaged cables within, leaving sufficient extra length for subsequent repair.
  e) Undamaged cables should remain un-cut, if at all possible.
  f) If cable ends are not long enough then outer pipe and conduits should be cut back further.
(4) Insert new conduit sections
  a) Replacement conduit-spools are prepared, comprising a short length of conduit pipe, cut to fit.
  b) If appropriate cable 'jumpers' are threaded into conduit-spools with sufficient slack at each end to join to existing cables,
  c) For each end of each conduit-spool an HDPE half-sleeve repair clamp is prepared to join to the existing conduit d) Deploy the prepared conduit-spools and repair clamps.
e) For each conduit (FIG. 11):
  I) Fit the lower half of the repair half-shell and strap in place
  ii) Repair the cable, if present (as below)
  iii) Fit the upper half-shell
  iv) Tighten straps around repair to seal the conduit
(5) Subsea cable repair at each end [MOP 6]:
  a) Identify damaged cables for repair.
  b) Position test and splice tool equipment on the cable repair working platform
  c) Deploy working platform onto the pipe.
  d) Pull the cable-ends into the aperture.
  e) Install hyperbaric chamber
  f) Deploy diver-technicians
  g) Cable-ends are locked-off or held in temporary restraints.
  h) Strip back cable to sound fibre and prepare
  I) Conduct OTDR and any other tests prior to splice
  j) Perform splicing operation
  k) Conduct OTDR and any other tests
  l) Seal joints with low profile shrink sleeve/other
  m) Conduct final integrity test
  n) Lower cable back into pipe
  o) Repeat procedure on each severed cable . . .
  p) Remove working platform
  q) Remove habitat
(6) Fit outer protection sleeve [MOP 21]
  a) After all the conduits and cables are repaired the conduits are strapped together
  b) A large diameter outer protection sleeve is fitted to protect the repair area and contain the conduit repairs (FIG. 12)
  c) Protection sleeve flanges are bolted together.
(7) Inhibit inside pipe [MOP 11]
  Protect against uninhibited water by inserting bags, or injecting gel, containing slow-dissolving biocide, prior to sealing-up the hole.
(8) Protect [MOP 5]
  Deploy concrete protection mattresses over repair area and pipe to each side.
  Butt each mattress against the last to leave no area exposed to impact or snagging.

The embodiments described above are most advantageous for providing long distance deep-sea crossings. However, it will be appreciated that the techniques described may be applied to other applications. An alternative embodiment provides a festoon architecture on a coast or in a river. In such an embodiment, an alternative aspect of the invention provides a method of providing a plurality of spaced apart cable connection points on a shore adjacent a body of water, the method comprising providing a plurality of sections of multiple ducting extending from each cable connection point on the shore into the body of water, passing a plurality of cables through each section of multiple ducting and connecting the cable connection points by means of the cables passed through each section of multiple ducting. Each section of multiple ducting preferably includes a termination point. The body of water may be a river or may be a sea and the shore may be an island or may border a relatively densely populated area; in such applications the technical problems associated with providing land based networks may be alleviated.

The various embodiments described may possess one or more advantages although not all embodiments will possess such advantages. For example, the cables may be laid and replaced quickly and efficiently; this will allow for faster upgrading of cable networks. The maintenance and upgrading costs may be low in comparison to known schemes. The cables laid may be more reliable, as they are less susceptible to damage from shipping and from maintenance and cable replacement. Any of the features described above which contribute to any advantages identified herein may be provided independently of other features and in other applications, unless otherwise stated.

All of the above embodiments of the invention have been described by way of example only, and modifications and similar arrangements may occur to those skilled in the art.

The applicant retains design right and copyright in all drawings and all material in this specification. Facsimile reproduction of the published version of this patent specification is permitted.

What is claimed is:

1. A method of facilitating provision of a point-to-point cable connection between first and second points separated by an extended span of water including a first region of shallow water and a second region of relatively deep water, the method comprising:
  providing a plurality of ducts from the first point through the first region of the extended span to an offshore termination point between the first and second points, wherein the plurality of ducts are combined to form a multiple duct conduit, and wherein one of the plurality of ducts is an outer duct that encompasses at least two others of the plurality of ducts, wherein the outer duct includes a water tight seal, wherein a region of trapped air is disposed between the outer duct and the at least two others of the plurality of ducts;
  installing the plurality of ducts, wherein installing the plurality of ducts includes eliminating the trapped air such that the plurality of ducts sinks in water;
  placing a first communication cable in one of said plurality of ducts to provide a connection between the first point and said offshore termination point;
  receiving at said offshore termination point, a second communication cable from the second point; and
  connecting said first communication cable to said second communication cable at said offshore termination point to create the point-to-point cable connection.

* * * * *